US012344142B2

(12) United States Patent
Tsurumi et al.

(10) Patent No.: US 12,344,142 B2
(45) Date of Patent: Jul. 1, 2025

(54) CUSHION SUPPORT MEMBER STRUCTURE AND VEHICLE SEAT

(71) Applicant: TS TECH CO., LTD., Asaka (JP)

(72) Inventors: Kazuhiro Tsurumi, Tochigi (JP); Yoichi Takahashi, Tochigi (JP); Kenshiro Wakao, Tochigi (JP)

(73) Assignee: TS TECH CO., LTD., Asaka (JP)

( * ) Notice: Subject to any disclaimer, the term of this patent is extended or adjusted under 35 U.S.C. 154(b) by 82 days.

(21) Appl. No.: 17/928,010

(22) PCT Filed: May 26, 2021

(86) PCT No.: PCT/JP2021/019960
§ 371 (c)(1),
(2) Date: Nov. 28, 2022

(87) PCT Pub. No.: WO2021/241625
PCT Pub. Date: Dec. 2, 2021

(65) Prior Publication Data
US 2023/0211712 A1 Jul. 6, 2023

Related U.S. Application Data

(60) Provisional application No. 62/704,768, filed on May 28, 2020.

(30) Foreign Application Priority Data

Nov. 26, 2020 (JP) .................................. 2020-195854
Mar. 2, 2021 (JP) .................................. 2021-032294

(51) Int. Cl.
*B62J 1/00* (2006.01)
*B60N 2/58* (2006.01)
*B60N 2/68* (2006.01)

(52) U.S. Cl.
CPC ............ *B60N 2/686* (2013.01); *B60N 2/5825* (2013.01); *B60N 2/682* (2013.01); *B62J 1/00* (2013.01)

(58) Field of Classification Search
CPC ...... B60N 2/686; B62J 1/08; B62J 1/12; B62J 1/00
See application file for complete search history.

(56) References Cited

U.S. PATENT DOCUMENTS 6,666,507 B1 12/2003 Ringgard
9,016,795 B2 * 4/2015 Nakagaki ............. B60N 2/2245
297/452.18

(Continued)

FOREIGN PATENT DOCUMENTS

CA 2727897 A1 * 8/2011 ......... B29C 44/1238
CN 106043510 A * 10/2016

(Continued)

OTHER PUBLICATIONS

Partial Supplementary European Search Report received in corresponding Application No. EP 21812158.0, dated Nov. 23, 2023.

(Continued)

*Primary Examiner* — Timothy J Brindley
(74) *Attorney, Agent, or Firm* — Dority & Manning, P.A.

(57) ABSTRACT

A structure of a cushion support member including reinforcements and a joint at which the reinforcements intersect and are joined together. The reinforcements include a first reinforcement, a second reinforcement and a third reinforcement extending respectively in a first direction, a second direction adjacent to the first direction, and a third direction adjacent to the second direction. The joint has a surface showing a first join line indicating a joined part of the first and second reinforcements and a second join line indicating a joined part of the second and third reinforcements. The first and second join lines are formed of curved lines curving (Continued)

from one side to the other side in a thickness direction of the cushion support member, and an end of the first join line and an end of the second join line meet at a same position on the one side.

5 Claims, 26 Drawing Sheets

(56) References Cited

U.S. PATENT DOCUMENTS

| | | | | |
|---|---|---|---|---|
| 9,421,890 | B2 * | 8/2016 | Akutsu | B60N 2/72 |
| 9,643,673 | B2 * | 5/2017 | Chiba | B60N 2/38 |
| 9,809,267 | B2 * | 11/2017 | Chiba | B62J 1/12 |
| 11,981,383 | B2 * | 5/2024 | Chiba | B62J 1/12 |
| 2011/0210597 | A1 * | 9/2011 | Takeuchi | B60N 2/7035 |
| | | | | 29/527.1 |
| 2015/0175230 | A1 * | 6/2015 | Baruzzo | B62J 1/28 |
| | | | | 297/214 |
| 2017/0233020 | A1 | 8/2017 | Goff | |
| 2019/0069679 | A1 | 3/2019 | Petty | |
| 2022/0410770 | A1 * | 12/2022 | Labbe | B60N 2/3097 |

FOREIGN PATENT DOCUMENTS

| | | | | | |
|---|---|---|---|---|---|
| CN | 110091943 | A | * | 8/2019 | B62J 1/00 |
| DE | 102010054185 | A1 | * | 6/2012 | B60N 2/36 |
| DE | 202012008120 | U1 | * | 1/2014 | B62J 1/00 |
| DE | 102018112643 | B3 | * | 8/2019 | B60N 2/42 |
| DE | 102022103908 | A1 | * | 8/2023 | B60N 2/686 |
| EP | 1092616 | A2 | * | 4/2001 | B62J 1/12 |
| EP | 1445181 | A2 | * | 8/2004 | B62J 1/12 |
| EP | 1783039 | A1 | * | 5/2007 | B62J 1/12 |
| FR | 3003211 | A | | 9/2014 | |
| GB | 637074 | A | * | 5/1950 | |
| JP | S 51-138307 | U | | 11/1976 | |
| JP | S6020898 | U | | 2/1985 | |
| JP | 2001087576 | A | | 4/2001 | |
| JP | 2003-127737 | | | 5/2003 | |
| JP | 3962618 | B | | 8/2007 | |
| JP | 4236983 | B | | 3/2009 | |
| JP | 2014-008807 | | | 1/2014 | |
| JP | 2014-46128 | | | 3/2014 | |
| JP | 2014-151789 | | | 8/2014 | |
| JP | 2017-197083 | | | 11/2017 | |
| KR | 20170018851 | A | * | 2/2017 | |
| WO | WO-2012024622 | A1 | * | 2/2012 | B60N 2/00 |
| WO | WO-2017090060 | A1 | * | 6/2017 | B29C 44/348 |
| WO | WO-2019098743 | A1 | * | 5/2019 | B60N 2/58 |
| WO | WO-2023039237 | A1 | * | 3/2023 | B60N 2/5621 |

OTHER PUBLICATIONS

Extended European Search Report for corresponding Application No. EP21812158, dated Mar. 18, 2024, 12 pages.
PCT International Search Report (w/ English translation) and Written Opinion for corresponding PCT Application No. PCT/JP2021/019960, mailed on Aug. 10, 2021, 9 pages.
International Preliminary Report on Patentability (w/English translation) for corresponding application No. PCT/JP2021/019960, dated Nov. 17, 2022, 8 pages.
Japanese Office Action (w/English translation) received in corresponding Application No. 2021-032294, dated Dec. 17, 2024, 11 pages.

* cited by examiner

FIG. 14
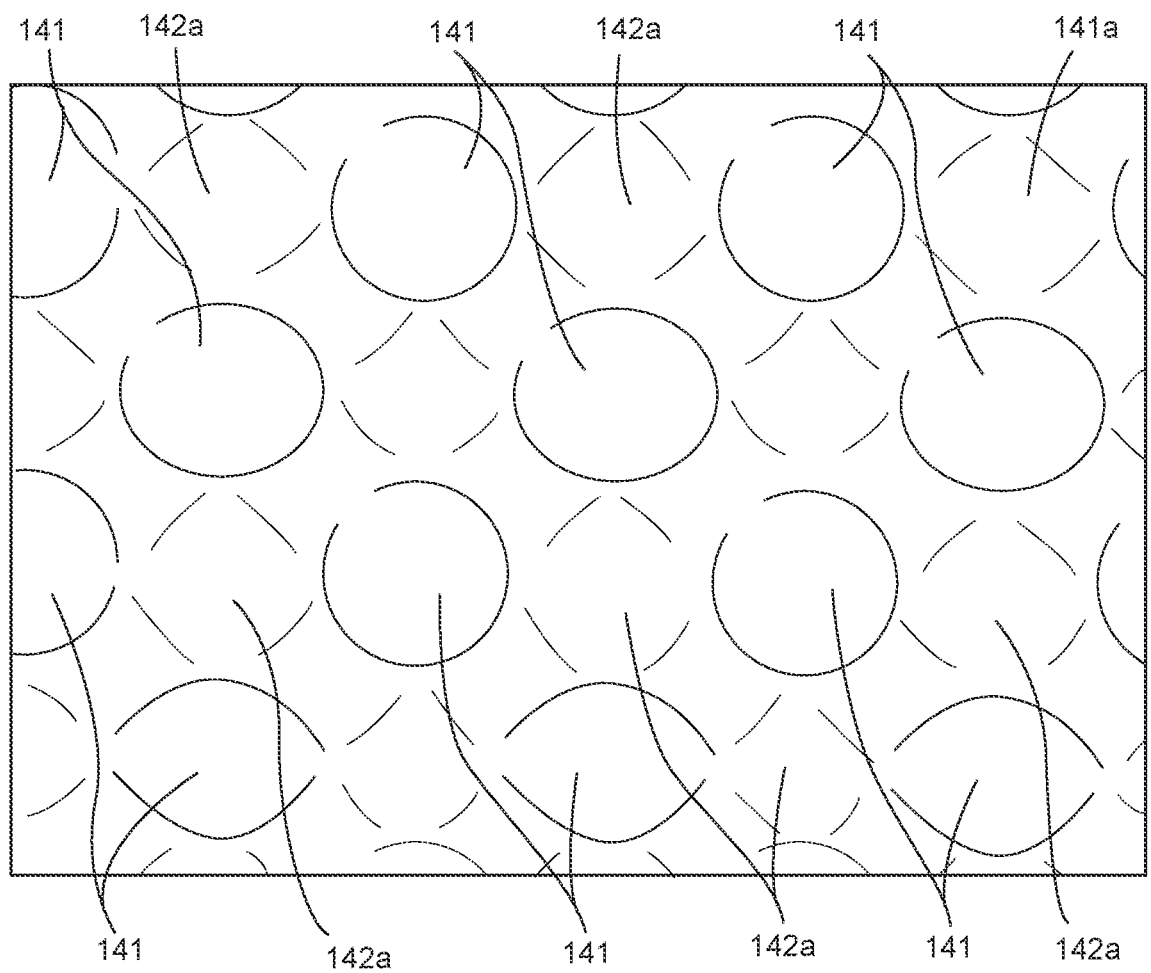
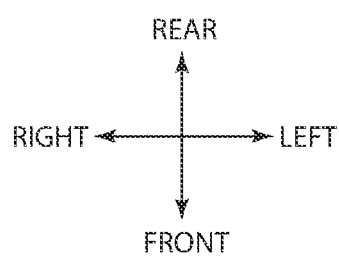

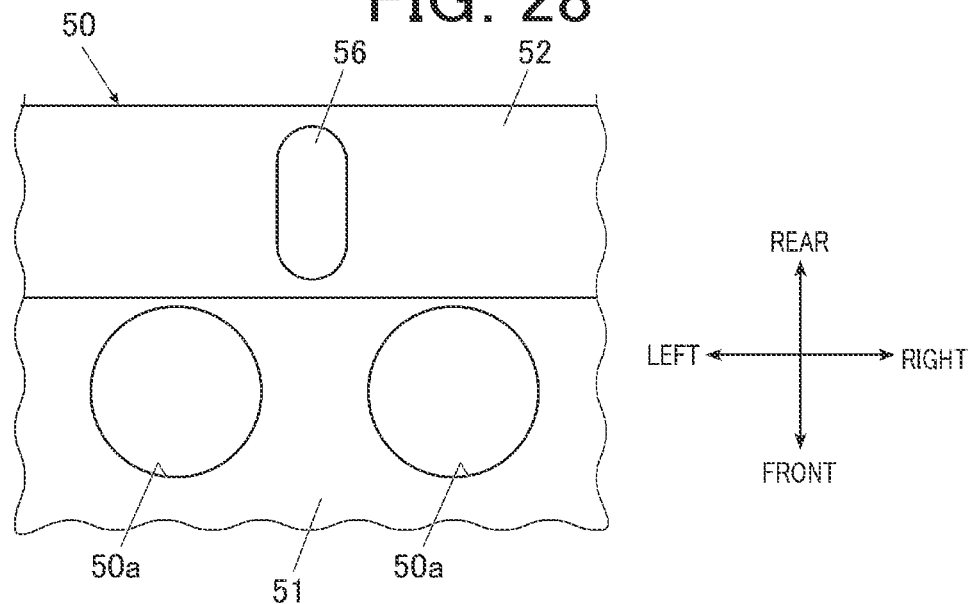
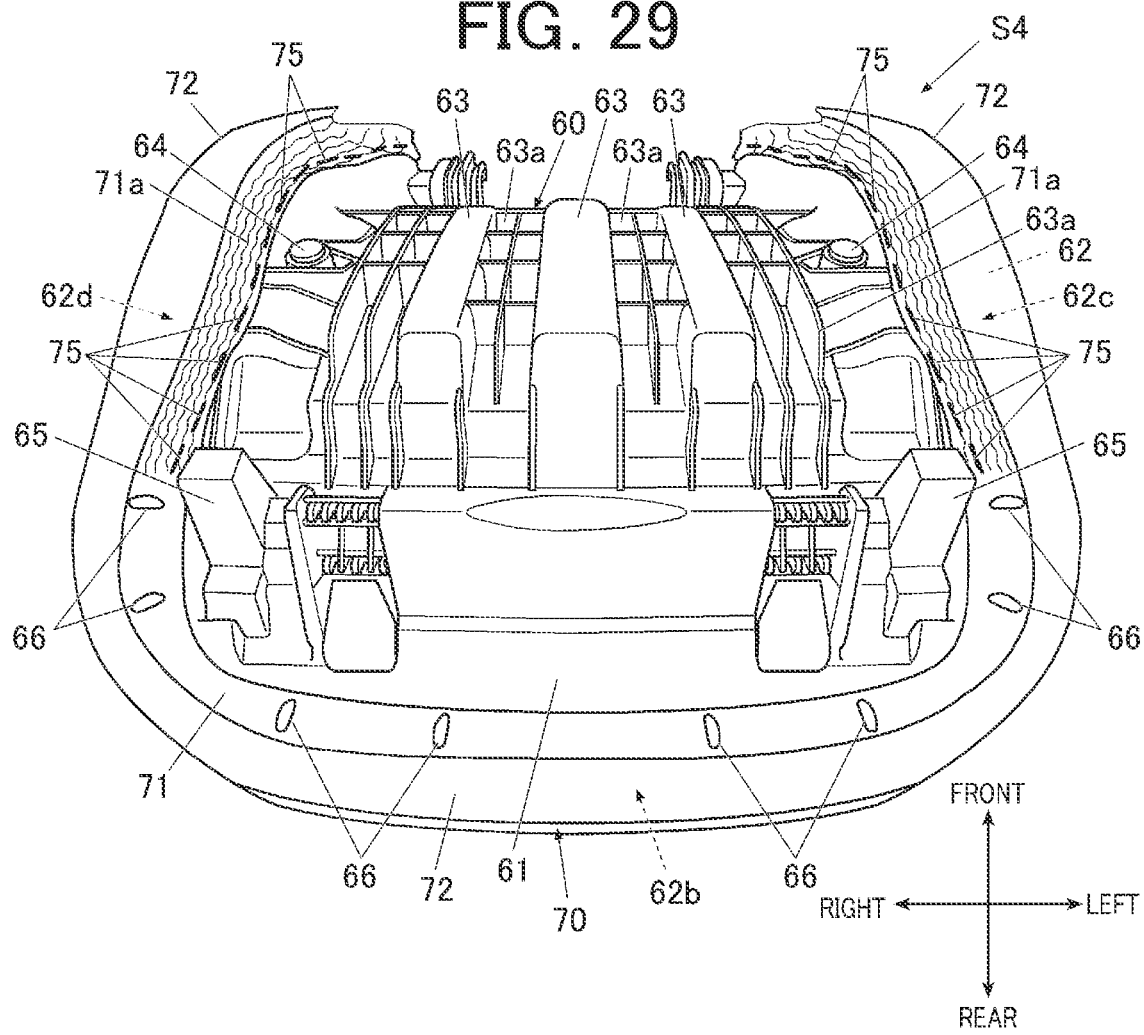

US 12,344,142 B2

CUSHION SUPPORT MEMBER STRUCTURE AND VEHICLE SEAT

CROSS REFERENCE TO RELATED APPLICATIONS

This application is the U.S. National Stage entry of International Application No. PCT/JP2021/019960 filed under the Patent Cooperation Treaty on May 26, 2021, which claims priority to U.S. Provisional Patent Application No. 62/704,768 filed on May 28, 2020, Japanese Patent Application No. 2020-195854 filed on Nov. 26, 2020, and Japanese Patent Application No. 2021-032294 filed on Mar. 2, 2021, all of which are incorporated herein by reference.

TECHNICAL FIELD

The present invention relates to a structure of a cushion support member for supporting a cushion of a seat and also relates to a vehicle seat.

BACKGROUND ART

Conventionally known cushion support members for supporting a cushion of a seat include a resin frame that partially uses a metal insert and that has a surface formed with a plurality of beads (refer to Patent Document 1). Each bead is formed into a ridge shape, which expands on an upper surface and is recessed on a back surface while having a curve surface. A plurality of such beads are arranged in a right-left direction so as to reinforce the resin frame.

On the other hand, Patent Document 2 discloses a cushion support member including a plurality of reinforcements. These reinforcements cross a width-direction center, and at least one or a plurality thereof are formed as oblique sides that are arranged obliquely to a front-rear direction of a seat. Each reinforcement is formed in such a manner as to protrude to a back surface side while being recessed on an upper surface. A plurality of such reinforcements are arranged along the front-rear direction of the seat and are arranged to cross each other, thereby reinforcing the cushion support member.

Patent Document 3 discloses a structure for fixing an end part of a cover material for covering a cushion material of, for example, a two-wheeled vehicle seat, to a flange of a base plate of the seat. In this structure, the end part of the cover material is temporarily attached to temporarily-fixing hooks that are formed on the flange of the base plate. Moreover, the end part of the cover material is permanently fixed at an outside of each of the hooks of the flange, with staples by using a tool such as a tacker. In short, a technique for fixing a cover material of a vehicle seat by using both hooks and staples is conventionally known.

CITATION LIST

Patent Literature

Patent Document 1: JP 51-138307U1
Patent Document 2: JP 2014-8807A
Patent Document 3: JP 2014-151789A

SUMMARY OF INVENTION

Technical Problem

In the case of using a plurality of reinforcements to reinforce a cushion support member, it is easy to reinforce the cushion support member by arranging the plurality of reinforcements so as to cross each other. Unfortunately, if a joint at which the plurality of reinforcements intersect with each other is angular, a load concentrates on the angular part and is difficult to distribute, in some cases.

In view of this, a first object of the present invention is to enable reducing concentration of load and easily reinforcing a cushion support member by using a plurality of reinforcements.

In a cover material of a vehicle seat, a cushion material is deformed at the time an occupant takes the seat or an occupant shifts the occupant's weight, and accordingly, an end part of the cover material is pulled toward an upper surface of the vehicle seat. In the technique of Patent Document 1, hooks and staples are arranged in a direction in which an end part of a cover material can be pulled toward an upper surface. Thus, spaces to be arranged with the hooks and the staples are required in the flange of the base plate, which can cause an increase in size of the structure.

From the point of view of avoiding an increase in size of the structure, for example, the hooks and the staples (fixing materials) may be arranged close to each other, but spaces for arranging the hooks and the staples may not be sufficiently obtained.

In view of this, a second object of the present invention is to obtain spaces for mounting both hooks and fixing materials while preventing an increase in size of a structure in a direction in which a cover material can be pulled toward an upper surface.

Solution to Problem

A first aspect of the invention provides a structure of a cushion support member that constitutes a seat on which an occupant is to sit, and supports a cushion material which is provided on an upper surface of the cushion support member, wherein
the cushion support member comprises:
a plurality of reinforcements for reinforcing the cushion support member; and
a joint at which the plurality of reinforcements intersect with each other and are joined together,
the plurality of reinforcements include a first reinforcement that extends in a first direction, a second reinforcement that extends in a second direction adjacent to the first direction, and a third reinforcement that extends in a third direction adjacent to the second direction,
the joint has a surface showing a first join line and a second join line, the first join line indicating a joined part of the first reinforcement and the second reinforcement, the second join line indicating a joined part of the second reinforcement and the third reinforcement,
the first join line and the second join line are formed of curved lines that curve from one side to the other side in a thickness direction of the cushion support member, and
an end of the first join line and an end of the second join line meet at a same position on the one side in the thickness direction.

A second aspect of the invention is the structure of the cushion support member according to the first aspect, wherein the joint has a back surface formed with a hole.

A third aspect of the invention is the structure of the cushion support member according to the second aspect, wherein the hole is formed into a perfect circle shape as well as a dome-like shape so as to not penetrate the joint.

A fourth aspect of the invention is the structure of the cushion support member according to any one of the first to the third aspects,
wherein the cushion support member further comprises a load-receiving part for receiving an occupant load,
a plurality of joints are provided in a front-rear direction of the seat, each of the joints being the joint, and
the load-receiving part is disposed on an outer side in a right-left direction of the seat, from the plurality of joints, while being disposed in a middle in the front-rear direction of the plurality of joints, in a projection view from a side surface of the cushion support member.

A fifth aspect of the invention is the structure of the cushion support member according to the fourth aspect,
wherein the cushion support member further comprises a bead for reinforcing the cushion support member, and
the bead is disposed on an outer side in the right-left direction of the seat, from the plurality of joints, while being disposed at an interval from the load-receiving part in the front-rear direction, in a projection view from the side surface of the cushion support member.

A sixth aspect of the invention is the structure of the cushion support member according to the fifth aspect,
wherein the cushion support member further comprises the plurality of reinforcements that extend in the right-left direction of the seat from each of the plurality of joints,
a plurality of beads are provided, each of the beads being the bead,
one bead that is one of the plurality of beads is disposed forward of and closest to the load-receiving part, the one bead is formed longer than the other beads, and
the one bead that is closest to the load-receiving part is disposed in a middle in the front-rear direction of the plurality of reinforcements that extend in the right-left direction of the seat from each of the plurality of joints, in a projection view from the side surface of the cushion support member.

A seventh aspect of the invention provides a structure of a cushion support member that constitutes a seat on which an occupant is to sit, and supports a cushion material which is provided on an upper surface of the cushion support member, wherein
the cushion support member comprises a plurality of reinforcements that are convex to an upper surface side so as to reinforce the cushion support member, each of the plurality of reinforcements having a curved surface at a part closest to the cushion material and being circularly shaped in a top view.

An eighth aspect of the invention is the structure of the cushion support member according to the seventh aspect,
wherein the cushion support member further comprises a plurality of reinforcements that are convex to a lower surface side so as to reinforce the cushion support member, each of the plurality of reinforcements having a curved surface at a part most distant from the cushion material and being circularly shaped in a bottom view, and
the plurality of reinforcements, which are convex to the upper surface side, and the plurality of reinforcements, which are convex to the lower surface side, are arranged at mutually different positions, in a projection view in an upper-lower direction.

A ninth aspect of the invention includes:
a base plate that supports a cushion material provided on an upper surface of the base plate; and
a cover material that covers the cushion material and is fixed to the base plate at an end part, wherein
the end part of the cover material is formed with a hole for use in fixing to the base plate,
the base plate has a hook that is protruded from a back surface of the base plate, the hook being passed through the hole of the cover material to hook the cover material,
the end part of the cover material is fixed to the base plate in a state in which the end part is hooked by passing the hook through the hole, while a fixing material is driven into the base plate via the end part, and
the hook and the fixing material are disposed so as to not overlap each other in a direction in which the end part of the cover material is pulled.

A tenth aspect of the invention is the vehicle seat according to the ninth aspect,
wherein a plurality of hooks are formed at each of a front part and a rear part of the base plate, each of the hooks being the hook, and
the end part of the cover material is fixed to the base plate in a state in which the end part is hooked by passing the hooks through the hole at the front part and the rear part of the base plate, while the fixing material is driven into the base plate at right and left side parts of the base plate via the end part.

An eleventh aspect of the invention is the vehicle seat according to the ninth or tenth aspect,
wherein the hook has a head that is positioned at an end in a direction protruding from the back surface of the base plate, and the head has a curved shape.

A twelfth aspect of the invention is the vehicle seat according to any one of the ninth to the eleventh aspects,
wherein the end part of the cover material is folded from the upper surface to the back surface of the base plate and is fixed, the cover material at a folded part that is folded from the upper surface to the back surface of the base plate is along an edge of the base plate,
the head of the hook, which is positioned at the end in the direction protruding from the back surface of the base plate, has a shape with a short side and a long side in a back view of the base plate, and
the head is disposed so that the direction of the long side is perpendicular to the folded part of the cover material in a back view of the base plate.

A thirteenth aspect of the invention is the vehicle seat according to any one of the ninth to the twelfth aspects,
wherein a part at which one hole that is one of holes adjacent to each other is positioned, and a part at which the other hole that is the other one of the holes adjacent to each other is positioned, overlap each other in the end part of the cover material, each of the holes being the hole, and
the one hole and the other hole are hooked by passing one of the hook of the base plate through the one hole and the other hole.

A fourteenth aspect of the invention is the vehicle seat according to any one of the ninth to the thirteenth aspects,
wherein the end part of the cover material at a part to be fixed by the fixing material is formed with a temporary fixing hole for use in temporary fixing to the base plate, and
the base plate includes a temporary fixing hook that protrudes from the back surface of the base plate, the temporary fixing hook is configured to be passed through the temporary fixing hole of the cover material, and a number of the formed temporary fixing hook corresponds to a number of the temporary fixing hole.

A fifteenth aspect of the invention is the vehicle seat according to any one of the ninth to the fourteenth aspects, wherein the base plate is formed with a plurality of through holes that penetrate through the base plate in a thickness direction, and the hook and the plurality of through holes are disposed so as to not overlap each other in a front-rear direction of the base plate.

Advantageous Effects of Invention

In the first aspect of the invention, it is easy to distribute a load along the first join line and the second join line that are formed of curved lines. This prevents concentration of load on the joint, at which the plurality of reinforcements intersect with each other, and makes it easy to reinforce the cushion support member by using the plurality of reinforcements.

In the second aspect of the invention, the hole is formed on the back surface of the joint. This prevents an increase in thickness of the joint and can contribute to reducing the weight of the cushion support member. If the joint is thick, heat is not easily dissipated at the manufacturing stage. On the other hand, such a low heat dissipation state is easily prevented by this structure.

The third aspect of the invention makes it easy to distribute pressure when it is applied to the joint.

In the fourth aspect of the invention, the plurality of joints are disposed in the front-rear direction of the load-receiving part, in a projection view from the side surface of the cushion support member. Thus, rigidity of the cushion support member can be improved.

In the fifth aspect of the invention, the bead is disposed at an interval from the load-receiving part in the front-rear direction, in a projection view from the side surface of the cushion support member. Thus, rigidity of the cushion support member can be improved.

In many cases, a flat part of a cushion support member is set to have an area larger on the front side of the load-receiving part in the seat than on the rear side of the load-receiving part in the seat. In such a state, the seat on the front side of the load-receiving part tends to be decreased in rigidity, in the cushion support member.

In consideration of this, in the sixth aspect of the invention, the one bead is formed longer than the other beads and is closest to the load-receiving part. In a projection view from the side surface of the cushion support member, the one bead is disposed in the middle in the front-rear direction of the plurality of reinforcements, which extend in the right-left direction of the seat from each of the plurality of joints. Thus, rigidity of the cushion support member can be improved.

In the seventh aspect of the invention, the cushion support member hardly has angular parts on the upper surface, whereby a load is easily distributed along the reinforcements, which are formed into curved surfaces. This prevents concentration of load and makes it easy to reinforce the cushion support member by using the plurality of reinforcements.

In the eighth aspect of the invention, the cushion support member hardly has angular parts on the lower surface, whereby a load is easily distributed along the reinforcements, which are formed into curved surfaces. This prevents concentration of load and makes it easy to reinforce the cushion support member by using the plurality of reinforcements.

In addition, the plurality of reinforcements, which are convex to the upper surface side, and the plurality of reinforcements, which are convex to the lower surface side, are arranged at mutually different positions, in a projection view in the upper-lower direction. This structure enables reducing the weight of the cushion support member.

In the ninth aspect of the invention, the hooks and the fixing materials are not arranged in line in the direction in which the end part of the cover material can be pulled toward the upper surface. Thus, it is possible to obtain spaces for mounting both of the hooks and the fixing materials while preventing an increase in size of the structure in the direction in which the cover material can be pulled toward the upper surface.

In the tenth aspect of the invention, the base plate at the part that is provided with the hook is increased in strength by the provided hook and can thereby be made thinner than the part into which the fixing materials are driven. That is, parts can be used in different manners as follows: A part that is required to have a high strength is increased in thickness, and the cover material is fixed by driving the fixing materials into this part. Another part in which a high strength is not relatively required, is decreased in thickness for the purpose of weight reduction, and the cover material is fixed to this part by the hooks. The right and left side parts of the base plate, with which the legs of an occupant who takes the seat may come into contact, are used as the parts into which the fixing materials are driven. Thus, the right and left side parts of the base plate can be improved in strength.

The eleventh aspect of the invention enables fixing the cover material more smoothly than, for example, a case in which the head has an angular shape, resulting in an improvement in workability.

In the twelfth aspect of the invention, although a force toward the folded part is applied to the cover material at the time the end part of the cover material is pulled toward the upper surface, the arrangement in which the direction of the long side of the head of the hook is perpendicular to the folded part of the cover material, makes the cover material hardly come off from the hook.

In the thirteenth aspect of the invention, in the end part of the cover material, the part at which the one of the adjacent holes is positioned, and the part at which the other one of the adjacent holes is positioned, are fixed by one hook, whereby it is possible to contribute to reduction in the number of parts.

In the fourteenth aspect of the invention, the temporary fixing hooks of the base plate are passed through the temporary fixing holes of the end part of the cover material in order to temporary fixing the end part. Thus, the end part of the cover material at the part to be fixed by the fixing materials is easily fixed by the fixing materials.

In the fifteenth aspect of the invention, forming the plurality of through holes in the base plate can contribute to reduction in weight of the whole seat and can also improve drain property and ventilation; in particular, it is possible to discharge heat by releasing air in the cushion material, whereby an uncomfortable feeling during seating can be reduced. The hooks, and the plurality of through holes having such effects, are disposed so as to not overlap each other in the front-rear direction of the base plate, and thus, the hooks can be disposed at positions having a relatively high strength. This enables maintaining the fixed state of the cover material by the hooks, in a good condition.

BRIEF DESCRIPTION OF DRAWINGS

FIG. 14 is an enlarged perspective view illustrating an important part of the cushion support member.

FIG. 28 illustrates the position of the hook.

FIG. 29 is a perspective view illustrating a back surface of the vehicle seat of a sixth embodiment.

DESCRIPTION OF EMBODIMENTS

Figure 1:
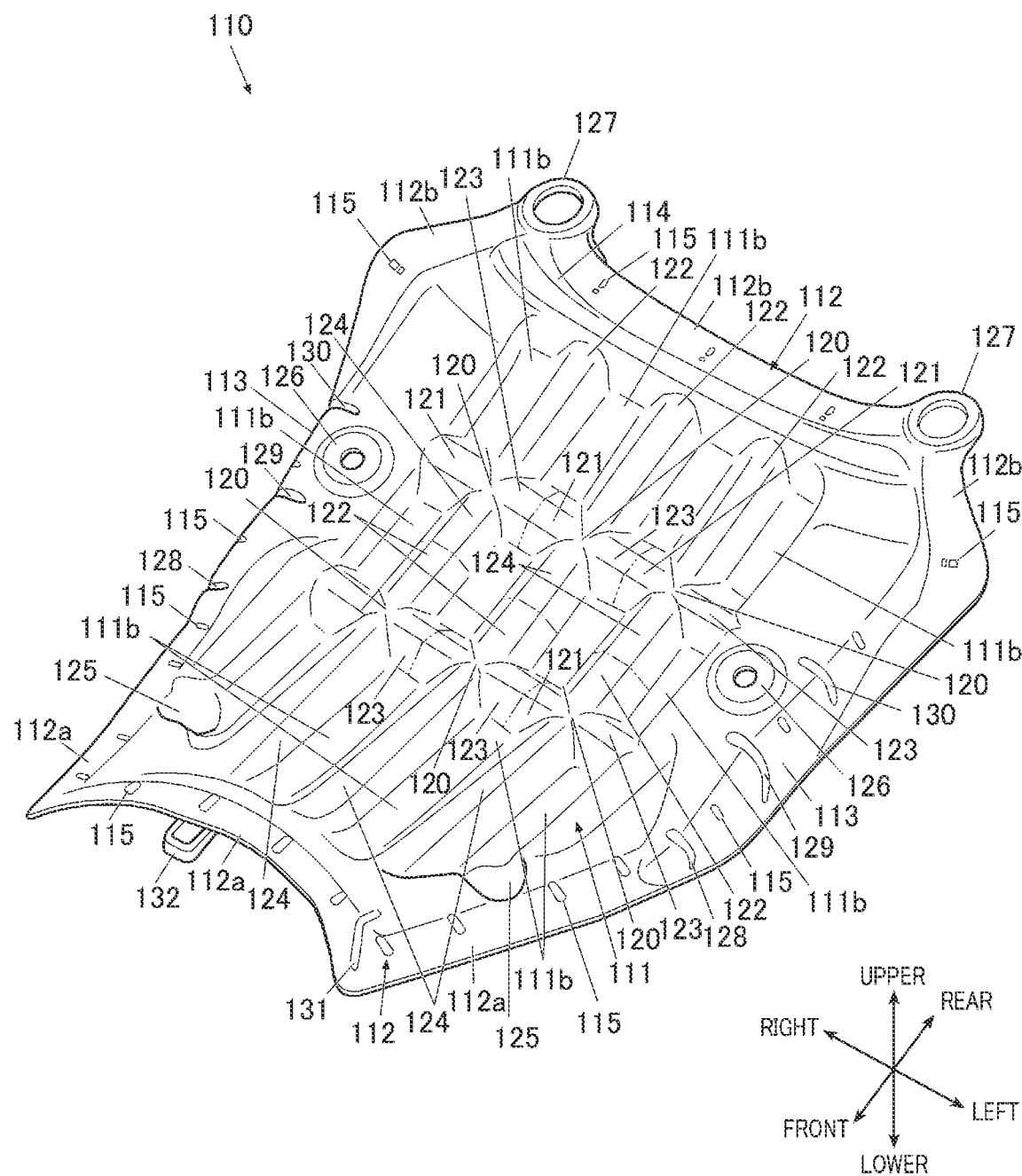
FIG. 1 is a perspective view illustrating a first embodiment of a cushion support member.

<Embodiments Related to Structure of Cushion Support Member>

Hereinafter, embodiments of the present invention will be described with reference to the drawings. Note that the embodiments described below are limited by various elements that are technically preferable for implementing the present invention, but the technical scope of the present invention should not be limited to the embodiments and the illustrated examples described below.

In addition, the seat that is described below includes furniture seats and seats of vehicles, such as ships, airplanes, snowmobiles, and personal watercrafts, but it is designed mainly to seats of wheeled vehicles. The wheeled vehicles include not only motorcycles and automobiles (passenger cars) but also bicycles, motorized bicycles, construction vehicles, military vehicles, industrial vehicles, and railway vehicles, and they moreover include agricultural vehicles, such as cultivators and tractors. The seat can be used by an occupant.

The seat includes a cushion support member to be fixed to a vehicle body, a cushion material provided to be supported on an upper surface of the cushion support member, and a cover material that covers the cushion support member and the cushion material. That is, the seat is constructed such that the cushion support member supports the cushion material and that the cover material covers them.

The cushion support member is a resin molded article that is formed of a resin material such as polypropylene or polyvinyl chloride. The cushion support member is formed into a shape corresponding to a vehicle body of a vehicle and is used by mounting it to the vehicle body. From this point of view, the cushion support member is made especially hard. The cushion support member may be attached with a metal fitting or the like that is necessary to fix it to a vehicle body. In addition, the cushion support member may be inserted with metal at the manufacturing stage.

The cushion material is formed of a soft foam material, for example, urethane foam, polypropylene foam, or polyethylene foam, and it is softer than the cushion support member.

The cushion material, which is supported on the upper surface of the cushion support member, has a lower surface with a shape that easily fits to the shape of the upper surface of the cushion support member. This shape facilitates stably supporting the cushion material by the upper surface of the cushion support member.

The facing surfaces of the cushion support member and the cushion material, that is, the upper surface of the cushion support member and the lower surface of the cushion material are defined as reference surfaces, respectively.

The cover material constitutes a seating surface of the seat and is to be used in contact with an occupant. A resin cover material, a synthetic leather cover material, a fabric cover material, a real leather cover material, or the like, is used as the cover material as appropriate.

An end of the cover material is folded under the back surface (lower surface) of the cushion support member and is fixed to the cushion support member. Note that the end of the cover material represents the entire periphery of the cover material. Thus, the end of the cover material is fixed over the entire periphery of the cushion support member.

First Embodiment

The following describes details of a first embodiment of a cushion support member 110.

The cushion support member 110 of this embodiment constitutes a seat of a motorcycle. The cushion support member 110, which constitutes a seat of a motorcycle, can also be called a "bottom plate."

The cushion support member 110 of this embodiment is a resin molded article, as described above. Thus, almost all parts are integrally formed into one body, and attachments are mounted as necessary. In other words, the cushion support member 110 is composed mainly of a body plate 111, and parts having respective functions are integrally formed to the body plate 111, as illustrated in FIGS. 1 to 8B.

Figure 2:
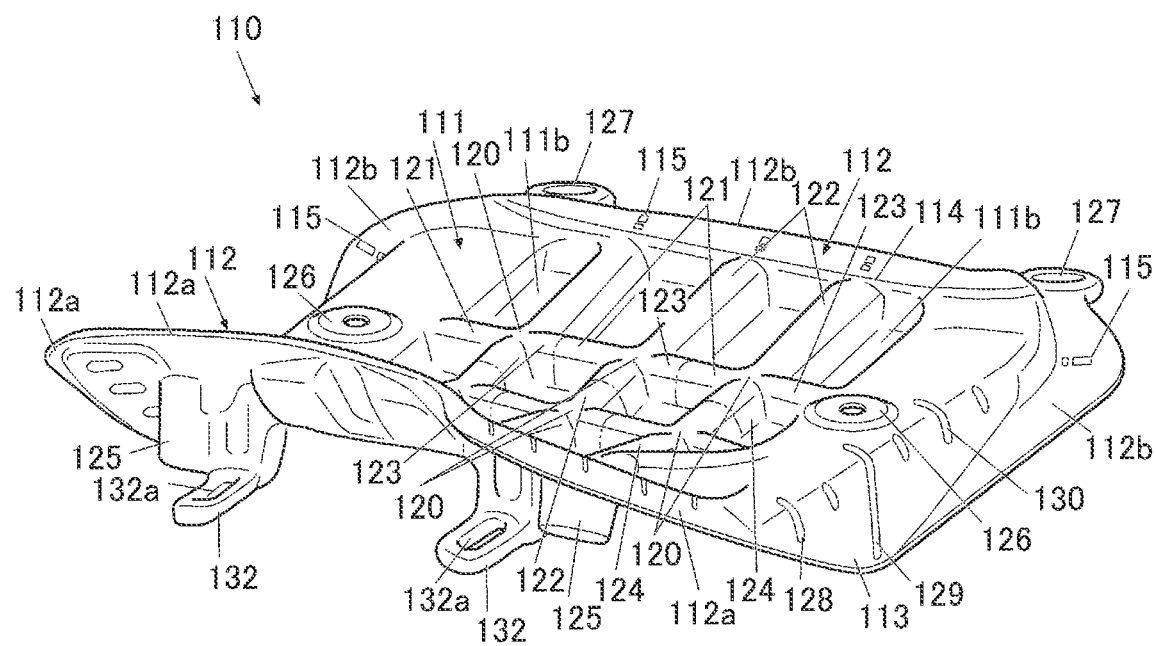
FIG. 2 is a perspective view illustrating the cushion support member.
Figure 3:
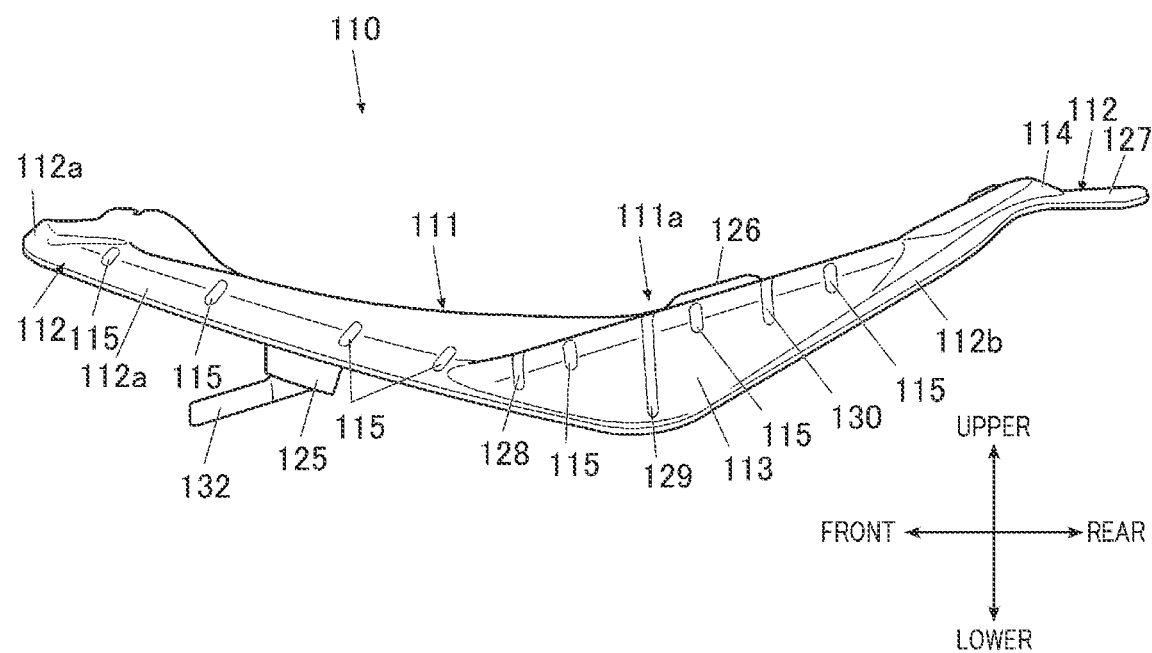
FIG. 3 is a side view illustrating the cushion support member.

In the body plate 111, a part on which an occupant is to sit, is formed so as to be lower than other parts in a side view, as illustrated in FIGS. 1 to 3. The vicinity of the part that is thus formed so as to be lower than other parts is a part corresponding to a position of the ischium of an occupant who drives a motorcycle. This part is defined as a maximum load-receiving part 11a that receives a load from the occupant (occupant load) most in the seat.

The body plate 111 has a peripheral reinforcement 112 that is provided along the periphery of the body plate 111. That is, rigidity of the periphery of the body plate 111 can be improved by using such a peripheral reinforcement 112.

The peripheral reinforcement 112 is a part that is integrally formed with the periphery of the body plate 111 so as to protrude outward in a flange shape. The peripheral reinforcement 112 includes a front peripheral reinforcement 112a and a rear peripheral reinforcement 112b that are respectively on front and rear sides across the vicinity of the maximum load-receiving part 111a.

The front peripheral reinforcement 112a reinforces a front side of the periphery of the body plate 111. The rear peripheral reinforcement 112b reinforces a rear side of the periphery of the body plate 111.

The body plate 111 also has a side wall 113 that is provided along the periphery of the body plate 111. In more detail, the side wall 113 is a side wall that extends downward from each of right and left circumferential edges of the upper surface of the body plate 111. The side wall 113 has ends in the front-rear direction that are integrally formed with the front peripheral reinforcement 112a and the rear peripheral reinforcement 112b.

The body plate 111 also has a rear wall 114 that is provided along the periphery of the body plate 111. In more detail, the rear wall 114 is a rear wall that extends downward from a rear edge of the upper surface of the body plate 111, and it is integrally formed with the rear peripheral reinforcement 112b.

The peripheral reinforcement 112 and the side walls 113 are formed with a plurality of engaging holes 115 that are to be engaged with engaging members provided to the end of the cover material.

The cushion support member 110 includes joints 120, pluralities of reinforcements 121 to 124, pluralities of load-receiving parts 125 to 127, pluralities of beads 128 to 130, and a plurality of protrusions 132, as parts that are integrally formed to the body plate 111.

Each of the pluralities of reinforcements 121 to 124 is a ridge-like (semicircular) part having a curved surface, and they are formed at a center area of the body plate 111 to reinforce the cushion support member 110.

The joint 120 is a part at which the plurality of reinforcements 121 to 124 intersect with each other and are joined together.

In the center area of the body plate 111, these pluralities of reinforcements 121 to 124 and the joints 120 are protruded upward, and other parts are recessed downward as recesses 111b, accordingly.

The plurality of reinforcements 121 to 124 include a first reinforcement 121 that extends in a first direction (toward the right side), a second reinforcement 122 that extends in a second direction adjacent to the first direction (toward the rear side), a third reinforcement 123 that extends in a third direction adjacent to the second direction (toward the left side), and a fourth reinforcement 124 that extends in a fourth direction adjacent to the first and the third directions (toward the front side).

Figure 4:
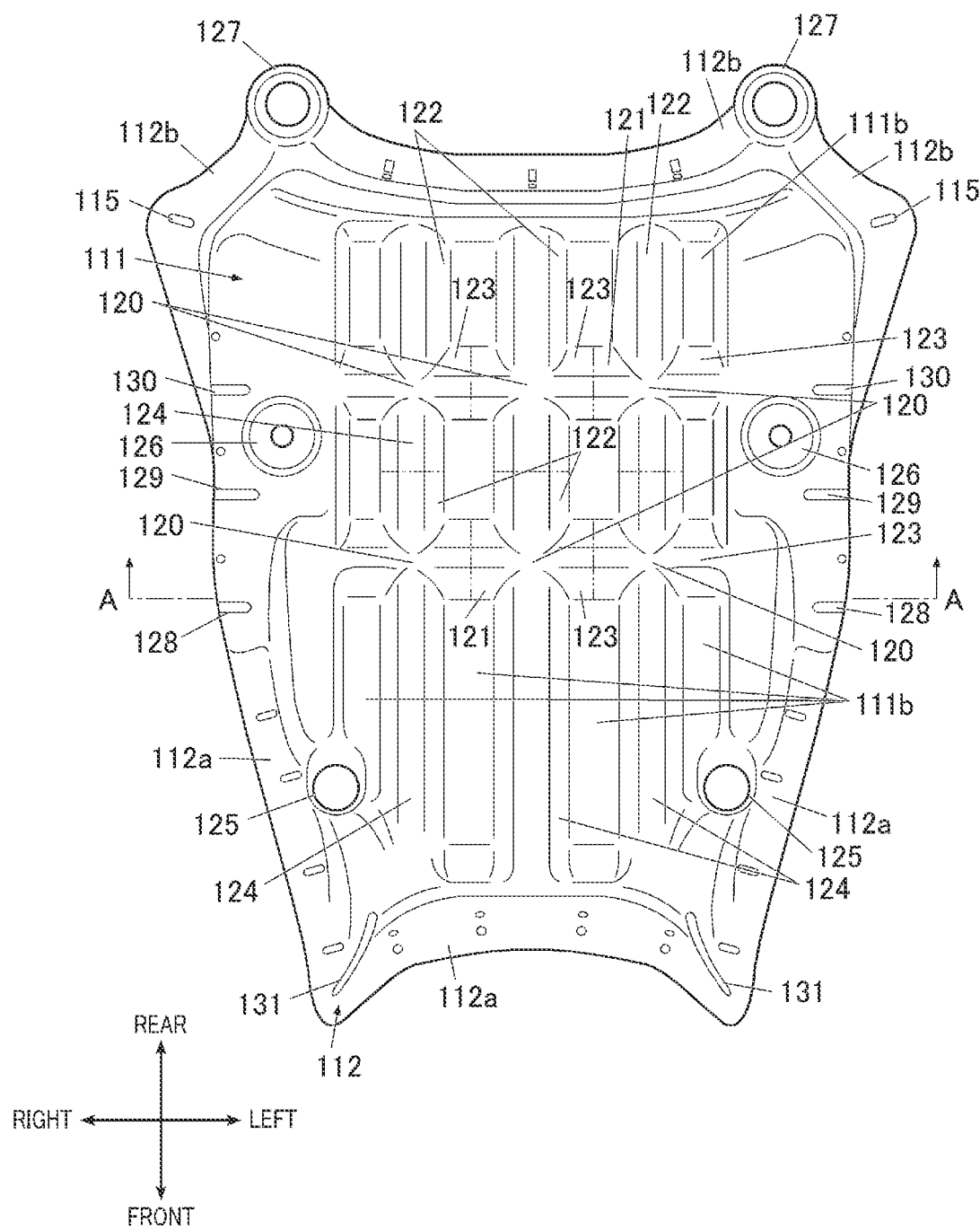
FIG. 4 is a top view illustrating the cushion support member.

In other words, as illustrated in FIG. 4, the plurality of reinforcements 121 to 124 of this embodiment are arranged in a cross shape (at front, rear, right, and left positions) in a top view and are orthogonal to each other in the right-left direction and in the front-rear direction.

The joint 120 is the part at which the plurality of reinforcements 121 to 124 intersect with each other and are joined together, as described above, and it is also a base end from which the plurality of reinforcements 121 to 124 extend respective directions.

A plurality of such joints 120 are provided to the body plate 111. These plurality of joints 120 are arranged at intervals in the front-rear direction and at intervals in the right-left direction, and six joints 120 are provided in this embodiment. Thus, the plurality of reinforcements 121 to 124 are provided so as to extend from each of the six joints 120.

The pluralities of reinforcements 121 to 124 between adjacent joints 120 are integrally formed with one another in this embodiment.

Specifically, the first reinforcement 121, which extends toward the right side in the first direction, and the third reinforcement 123, which extends toward the left side in the third direction, are integrally formed together between right and left adjacent joints 120. On the other hand, the second reinforcement 122, which extends toward the rear side in the second direction, and the fourth reinforcement 124, which extends toward the front side in the fourth direction, are integrally formed together between front and rear adjacent joints 120.

However, the structure is not limited thereto, and the pluralities of reinforcements 121 to 124 that are arranged between adjacent joints 120 may not be integrally formed and may be separated from one another.

Figure 5:
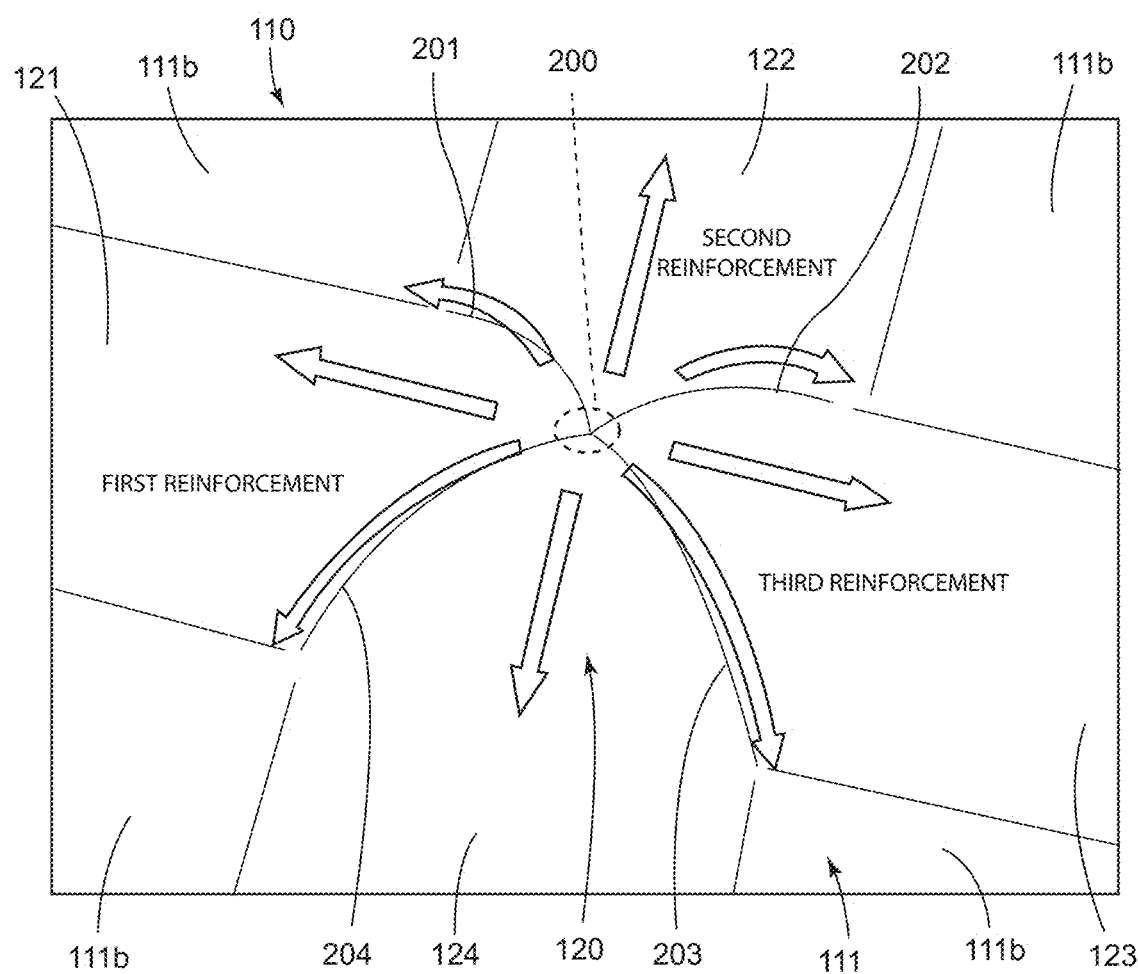
FIG. 5 is a perspective view illustrating an important part of the cushion support member.

As illustrated in FIG. 5, the surface of the joint 120 shows a first join line 201, a second join line 202, a third join line 203, and a fourth join line 204. The first join line 201 indicates a joined part of the first reinforcement 121 and the second reinforcement 122. The second join line 202 indicates a joined part of the second reinforcement 122 and the third reinforcement 123. The third join line 203 indicates a joined part of the third reinforcement 123 and the fourth reinforcement 124. The fourth join line 204 indicates a joined part of the fourth reinforcement 124 and the first reinforcement 121.

The first join line 201, the second join line 202, the third join line 203, and the fourth join line 204 are formed of curved lines that curve from one side to the other side in the thickness direction of the cushion support member 110 (joint 120), due to the plurality of reinforcements 121 to 124 formed into a ridge (semicircular) shape, as described above.

Note that the first join line 201, the second join line 202, the third join line 203, and the fourth join line 204 are illustrated in FIG. 5 and in other drawings by distinct solid lines for convenience of explanation, but distinct solid lines may not appear in an actual article.

An end of the first join line 201, an end of the second join line 202, an end of the third join line 203, and an end of the fourth join line 204 meet at the same position on the one side in the thickness direction of the cushion support member 110 (joint 120).

The same position on the one side in the thickness direction is a part 200 at the uppermost position of the joint 120 (hereinafter, a top 200), because the plurality of reinforcements 121 to 124 are protruded upward, as described above. In addition, the body plate 111 has parts for constituting the recesses 111b, on the other side in the thickness direction.

That is, the end of the first join line 201, the end of the second join line 202, the end of the third join line 203, and the end of the fourth join line 204 meet at the top 200 of the joint 120.

The first join line 201, the second join line 202, the third join line 203, and the fourth join line 204 are orthogonal to each other in a top view.

The plurality of reinforcements 121 to 124 intersect with each other and are joined together at the joint 120, while each of the join lines 201 to 204 among the reinforcements 121 to 124 is formed of a curved line that curves from the top 200 of the joint 120 to the recess 111b. Thus, the surface of the joint 120 of the plurality of reinforcements 121 to 124 has a round shape and does not generate an angular part.

Figure 6:
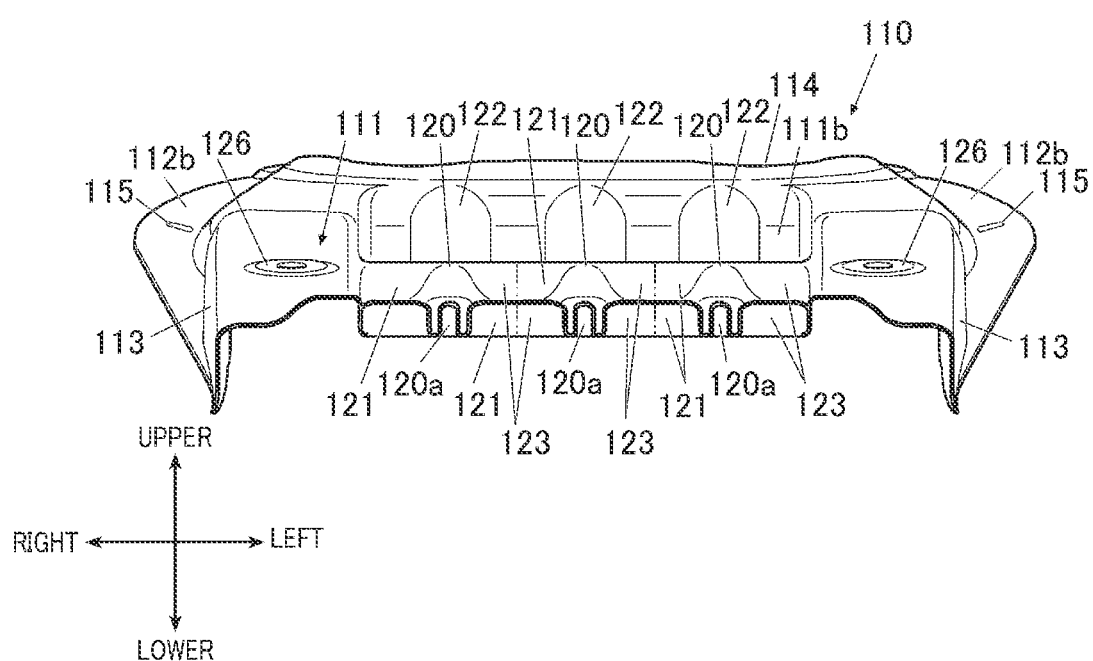
FIG. 6 is a sectional view taken along an A-A line in FIG. 4.
Figure 7:
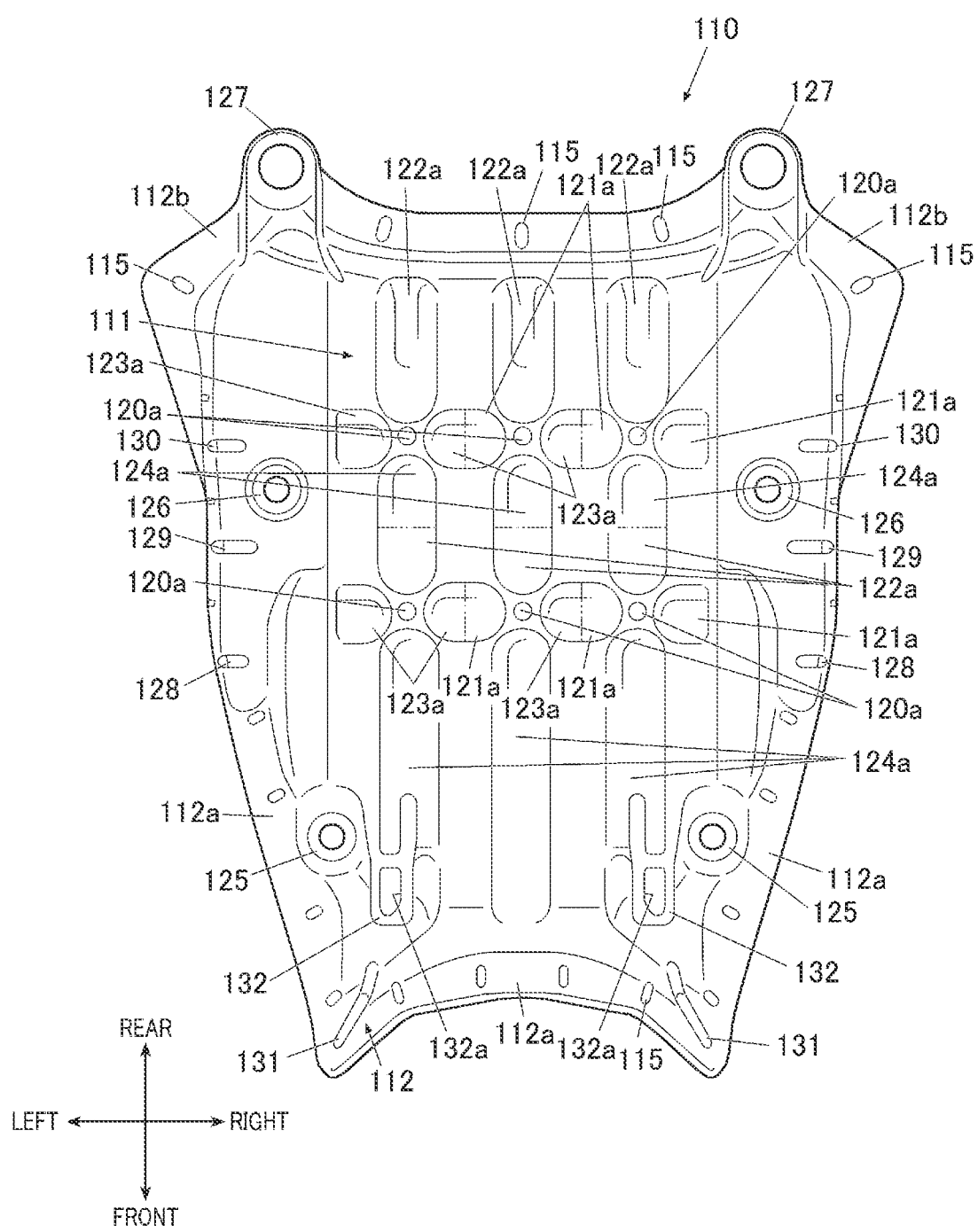
FIG. 7 is a bottom view illustrating the cushion support member.

The back surface of the joint 120 is formed with holes 120a, as illustrated in FIGS. 6 and 7. This hole 120a is formed into a perfect circle shape as well as a dome-like shape so as to not penetrate the joint 120.

The pluralities of reinforcements 121 to 124 are formed into recessed shapes on the back surface of the body plate 111, as illustrated in FIGS. 6 to 8B. Specifically, the pluralities of reinforcements 121 to 124 are also formed as holes that do not penetrate in the upper-lower direction (hereinafter, hollows 121a to 124a), in a bottom view.

Each of the hollows 121a to 124a of the pluralities of reinforcements 121 to 124 is formed so as to have a round end on a hole 120a side of the joint 120. The hollows 121a to 124a of the pluralities of reinforcements 121 to 124 are not combined with the holes 120a of the joints 120.

In more detail, the hollow 121a of the first reinforcement 121, which extends toward the right side in the first direction, and the hollow 123a of the third reinforcement 123, which extends toward the left side in the third direction, are integrally formed together between the holes 120a of right and left adjacent joints 120. On the other hand, the hollow 122a of the second reinforcement 122, which extends toward the rear side in the second direction, and the hollow 124a of the fourth reinforcement 124, which extends toward the front side in the fourth direction, are integrally formed together between front and rear adjacent joints 120.

Figure 8A:
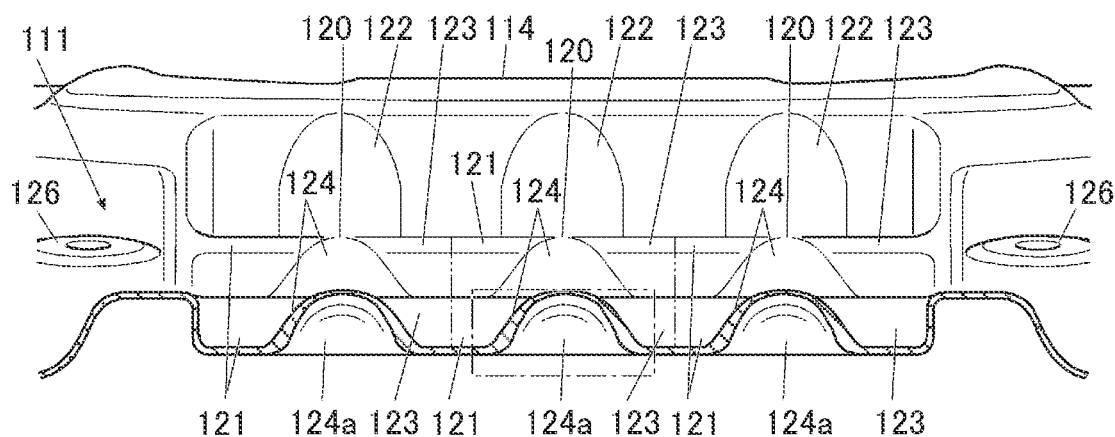
FIG. 8A is an enlarged sectional view for explaining the important part of the cushion support member.
Figure 8B:
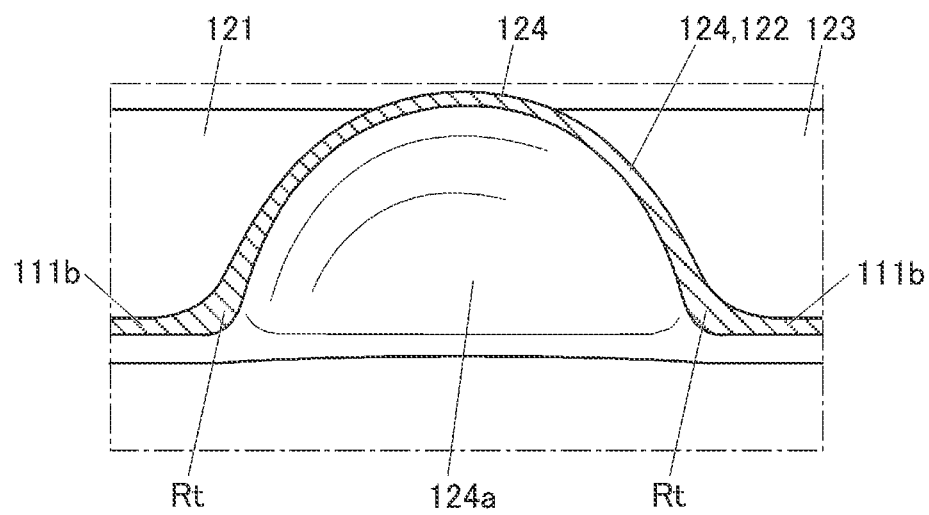
FIG. 8B is an enlarged sectional view for explaining the important part of the cushion support member.

The pluralities of reinforcements 121 to 124 are formed so as to have ridge-like (semicircular) surfaces and have recessed shapes on the back surface, as described above. As a result, these pluralities of reinforcements 121 to 124 have a cross section with such a shape as a semicircle, as illustrated in FIGS. 8A and 8B.

In the pluralities of reinforcements 121 to 124 thus formed into a semicircular shape, a root part Rt on a side of the part constituting the recess 111b is thick. In short, the root part Rt is formed so as to be thicker than other parts. The root part Rt tends to be applied with an occupant load, among the reinforcements 121 to 124. In consideration of this, the root part Rt is thus made thick. This reinforces a part that tends to be applied with an occupant load, which consequently makes it easy to distribute the occupant load.

Although the plurality of reinforcements 121 to 124 in this embodiment are set to have cross sections having the same size, the size is not limited thereto, and the cross section may be varied for each of the reinforcements 121 to 124.

Although the four kinds of reinforcements 121 to 124 are used in this embodiment, the number of the kinds of reinforcements is not limited thereto, and three, or five or more kinds of reinforcements may be used.

In the case of using three kinds of reinforcements, they intersect with each other in a T-shape or a Y-shape. The number of joints may be one or more.

Also, in the case of using five or more kinds of reinforcements, one joint or a plurality of joints may be used. In the condition in which a plurality of joints are used, the numbers of reinforcements that intersect with each other at respective joints may not necessarily be the same.

Next, the pluralities of load-receiving parts 125 to 127 are parts that are to be positioned between the cushion support member 110 and a vehicle body so as to receive an occupant load. As illustrated in FIGS. 1 to 4 and FIGS. 6 to 8B, they are disposed on both outer sides in the right-left direction of the plurality of joints 120.

The pluralities of load-receiving parts 125 to 127 include first load-receiving parts 125 positioned on a front side, second load-receiving parts 126 positioned on a center side, and third load-receiving parts 127 positioned on a rear side.

Herein, the load-receiving parts 125 to 127 are parts that are to be directly fixed to a vehicle body, and each of them also includes an elastic member such as a rubber, which is mounted to the corresponding part, and an element to which the elastic member is attached. This elastic member is softer than the cushion support member 110 and is fixed to the lower surface of the cushion support member 110, for example, by welding. Alternatively, insertion holes may be formed in the cushion support member 110, whereas inserting pieces to be inserted into the insertion holes may be formed to the elastic members of the load-receiving parts 125 to 127. Under these conditions, the inserting pieces may be inserted and fitted into the insertion holes, whereby the elastic members of the load-receiving parts 125 to 127 may be fixed to the cushion support member 110.

Among the pluralities of load-receiving parts 125 to 127, the second load-receiving parts 126, which are positioned on the center side, are disposed in the vicinity of the maximum load-receiving part 111a of the body plate 111. Thus, the second load-receiving part 126 tends to receive an occupant load greater than that applied to each of the first load-receiving part 125 and the third load-receiving part 127.

The second load-receiving part 126 is disposed in the middle in the front-rear direction of the plurality of joints 120, in a projection view from the side surface of the cushion support member 110. In more detail, the second load-receiving part 126 is disposed in the middle between two of the plurality of joints 120, which are arranged at intervals in the front-rear direction, in a projection view from the side surface of the cushion support member 110.

The first load-receiving part 125 is integrally formed with the front peripheral reinforcement 112a of the peripheral reinforcement 112 of the body plate 111 and with the recess 111b, which is positioned on each of front right and left sides of the body plate 111.

The third load-receiving part 127 is integrally formed with the rear peripheral reinforcement 112b of the peripheral reinforcement 112 of the body plate 111.

The plurality of load-receiving parts 125 to 127 each have a bolt hole in proximity to the center thereof, and the cushion support member 110 can be fixed to a vehicle body by bolts that are inserted from these bolt holes.

Next, the pluralities of beads 128 to 130 have shapes for reinforcing the cushion support member 110 and are arranged on outer sides in the right-left direction of the plurality of joints 120, as illustrated in FIGS. 1 to 4 and FIG. 7.

The plurality of beads 128 to 130 include a first bead 128 positioned on the front side, a second bead 129 positioned on the center side, and a third bead 130 positioned on the rear side.

These plurality of beads 128 to 130 are disposed in the vicinity of the maximum load-receiving part 111a of the body plate 111 and are formed to bend from the upper surface to the side wall 113 of the body plate 111. In other words, the vicinity of the maximum load-receiving part 111a, which tends to be applied with an occupant load most in the cushion support member 110, is reinforced by the plurality of beads 128 to 130.

The second bead 129, which is disposed forward of and closest to the second load-receiving part 126, is positioned most proximate to the maximum load-receiving part 111a among the plurality of beads 128 to 130, and it is formed so that the length from an upper end to a lower end will be longer than those of the other beads 128 and 130.

The second bead 129 is disposed in the middle in the front-rear direction of the plurality of reinforcements (the first reinforcements 121 or the third reinforcements 123) extending in the right-left direction respectively from the plurality of joints 120, in a projection view from the side surface of the cushion support member 110. In more detail, the second bead 129 is disposed in the middle between two of the plurality of joints 120, which are arranged at intervals in the front-rear direction, in a projection view from the side surface of the cushion support member 110.

The first bead 128, which is positioned on the front side, is disposed forward of the joint 120 that is positioned on the front side among the plurality of joints 120, in a projection view from the side surface of the cushion support member 110.

On the other hand, the third bead 130, which is positioned on the rear side, is disposed at a position overlapping the joint 120 that is positioned on the rear side among the plurality of joints 120, in a projection view from the side surface of the cushion support member 110.

In addition, a fourth bead 131 for reinforcing the front peripheral reinforcement 112a is formed on the front peripheral reinforcement 112a of the peripheral reinforcement 112.

Next, the plurality of protrusions 132 are parts to be fixed to a vehicle body, and they are disposed on the front side of the cushion support member 110 and protrude forward from the back surface of the cushion support member 110, as illustrated in FIGS. 2 and 7. These plurality of protrusions 132 are disposed adjacent to inner sides in the right-left direction of the first load-receiving parts 125, which are provided to both sides in the right-left direction of the cushion support member 110.

In addition, each of the protrusions 132 is formed with a through hole 132a that penetrates therethrough in the upper-lower direction.

At least one bead is provided between these plurality of protrusions 132 and the second load-receiving parts 126, which are provided on both sides in the right-left direction of the cushion support member 110, in a projection view from the side surface of the cushion support member 110.

In this embodiment, the first bead 128 and the second bead 129 are provided between the plurality of protrusions 132 and the second load-receiving parts 126, in a projection view from the side surface of the cushion support member 110.

Moreover, inner side edges on inner sides in the right-left direction of the plurality of protrusions 132 are provided at the centers in the right-left direction of the fourth reinforcements 124. The protrusions 132 are integrally formed with the hollows 124a of the fourth reinforcements 124.

In the first embodiment as described above, the surface of the joint 120 shows at least the first join line 201, which indicates the joined part of the first reinforcement 121 and the second reinforcement 122, and the second join line 202, which indicates the joined part of the second reinforcement 122 and the third reinforcement 123. The first join line 201 and the second join line 202 are formed of curved lines that curve from the one side (top 200) to the other side (part constituting the recess 111b) in the thickness direction of the cushion support member 110. The end of the first join line 201 and the end of the second join line 202 meet at the same position on the one side in the thickness direction (top 200). With this structure, it is easy to distribute a load along the first join line 201 and the second join line 202 that are formed of curved lines. Thus, while a load is prevented from concentrating at the joint 120, at which the plurality of reinforcements 121 to 123 intersect with each other, the cushion support member 110 is easily reinforced by using the pluralities of reinforcements 121 to 124.

In addition, the hole 120a is formed on the back surface of the joint 120. This prevents an increase in thickness of the joint 120 and can contribute to reducing the weight of the cushion support member 110. If the joint 120 is thick, heat is not easily dissipated at the manufacturing stage. On the other hand, such a low heat dissipation state is easily prevented by this structure.

In addition, the hole 120a is formed into a perfect circle shape as well as a dome-like shape so as to not penetrate the joint 120. This makes it easy to distribute pressure, when it is applied to the joint 120.

The second load-receiving parts 126 are disposed on outer sides in the right-left direction of the seat, from the plurality of joints 120, while being disposed in the middle in the front-rear direction of the plurality of joints 120, in a projection view from the side surface of the cushion support member 110. Thus, the plurality of joints 120 are disposed in the front-rear direction of the second load-receiving parts 126, in a projection view from the side surface of the cushion support member 110. Thus, rigidity of the cushion support member 110 can be improved.

The second beads 129 are disposed on outer sides in the right-left direction of the seat, from the plurality of joints 120, while being disposed at intervals from the second load-receiving parts 126 in the front-rear direction, in a projection view from the side surface of the cushion support member 110. Thus, the second beads 129 are disposed at intervals in the front-rear direction from the second load-receiving parts 126, in a projection view from the side surface of the cushion support member 110. Thus, rigidity of the cushion support member 110 can be improved.

In many cases, a flat surface part of a cushion support member 110 is set to have an area larger in the seat on the front side of the second load-receiving part 126 than in the seat on the rear side of the second load-receiving part 126. In such a state, the seat on the front side of the second load-receiving part 126 tends to be decreased in rigidity, in the cushion support member 110.

In consideration of this, the second bead 129 is formed longer than the other beads 128 and 130 and is closest to the second load-receiving part. In a projection view from the side surface of the cushion support member 110, the second bead 129 is disposed in the middle in the front-rear direction of the pluralities of reinforcements 122 and 124, which extend in the right-left direction of the seat from each of the plurality of joints 120. Thus, rigidity of the cushion support member 110 can be improved.

Second Embodiment

The following describes details of a second embodiment of a cushion support member 140.

The cushion support member 140 of this embodiment constitutes a seat of a motorcycle.

For convenience of explanation, the same parts as those of the first embodiment are denoted by the same reference signs, and the descriptions focus on structural parts different from those of the first embodiment.

The cushion support member 140 of this embodiment is a resin molded article, as described above. Thus, almost all parts are integrally formed into one body, and attachments are mounted as necessary. In other words, the cushion support member 140 is composed mainly of a body plate 111, and parts having respective functions are integrally formed to the body plate 111, as illustrated in FIGS. 9 to 14.

Figure 9:
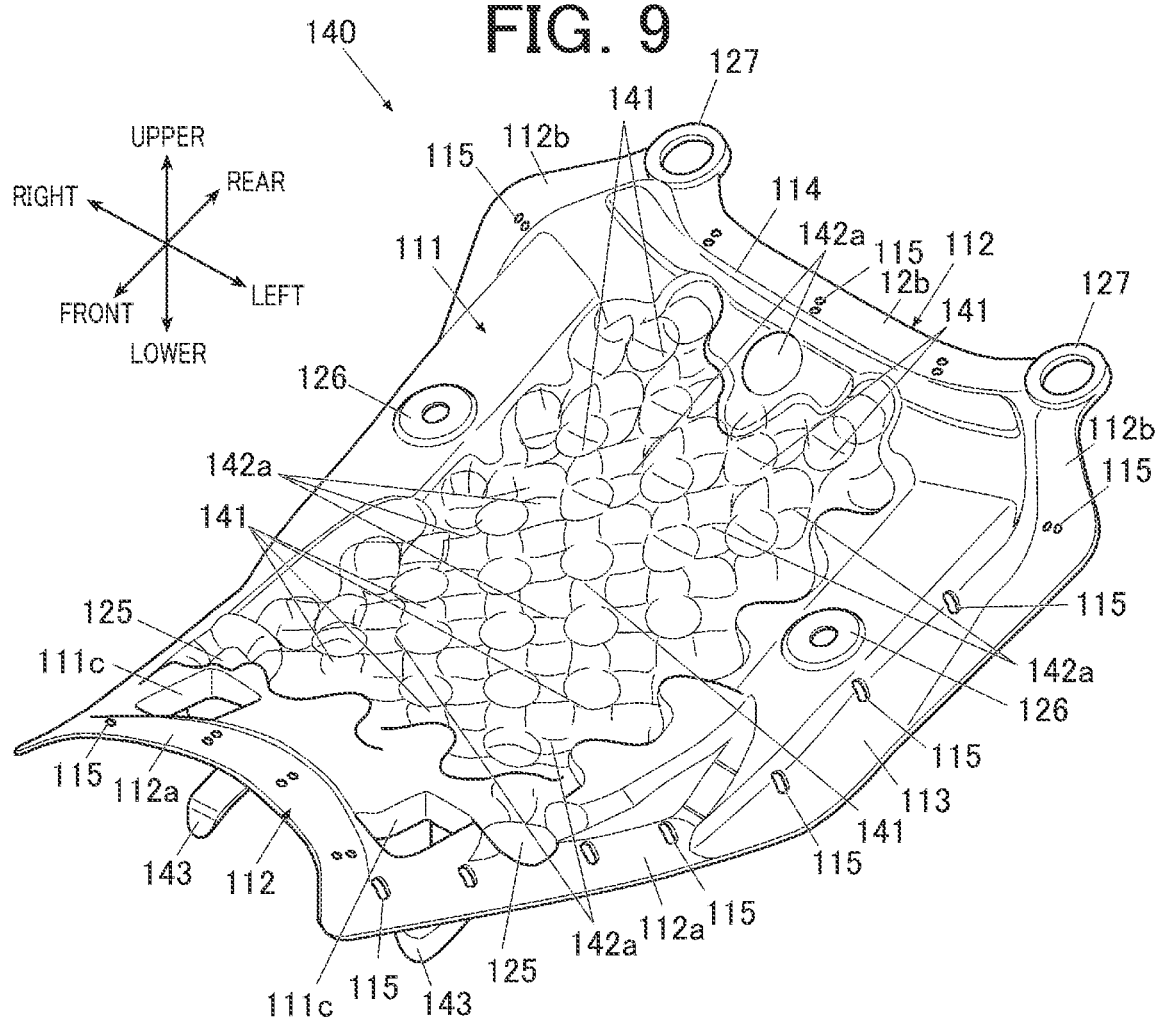
FIG. 9 is a perspective view illustrating a second embodiment of the cushion support member.
Figure 10:
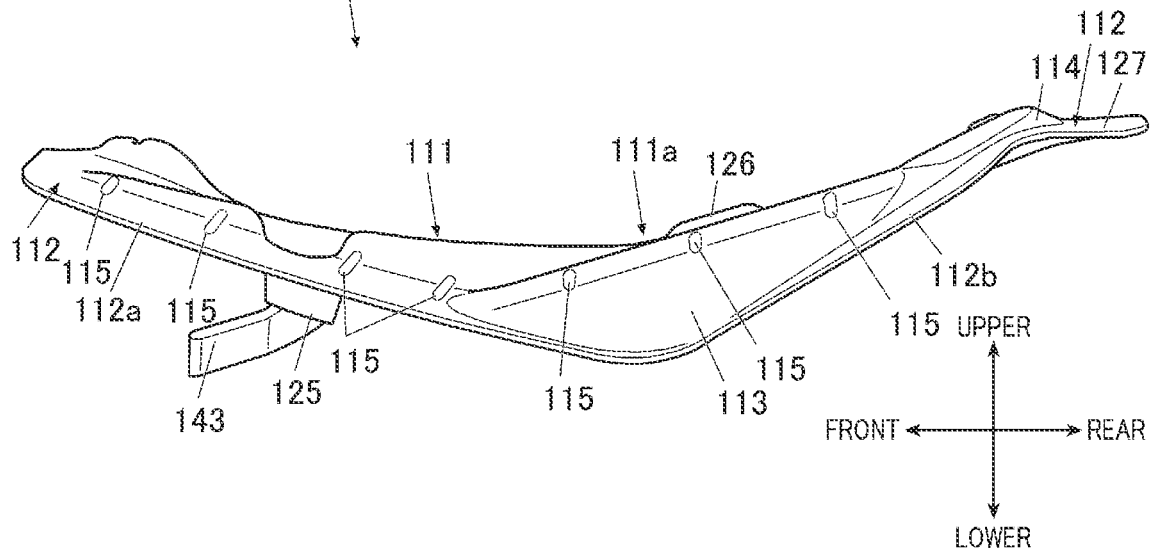
FIG. 10 is a side view illustrating the cushion support member.
Figure 11:
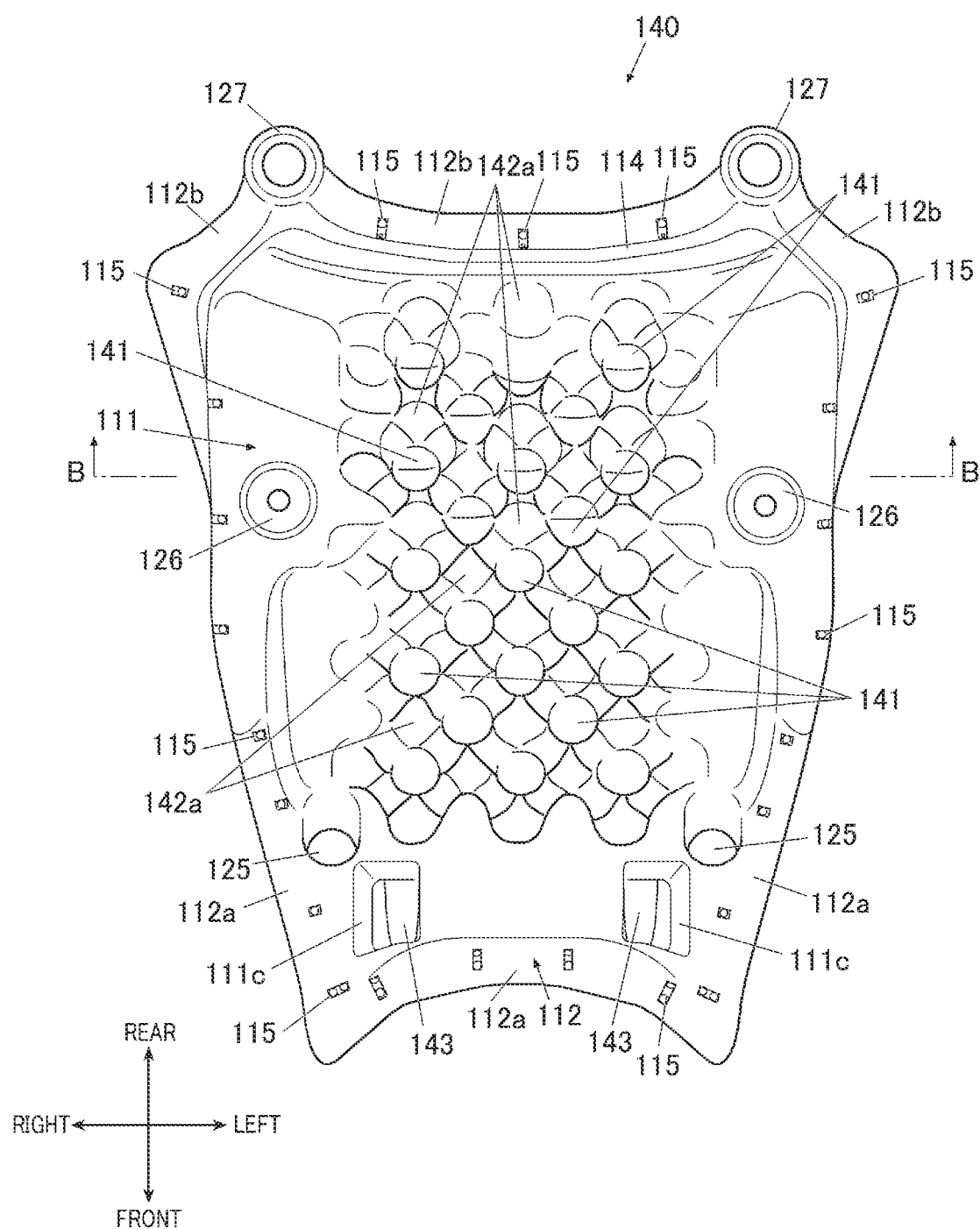
FIG. 11 is a top view illustrating the cushion support member.
Figure 12:
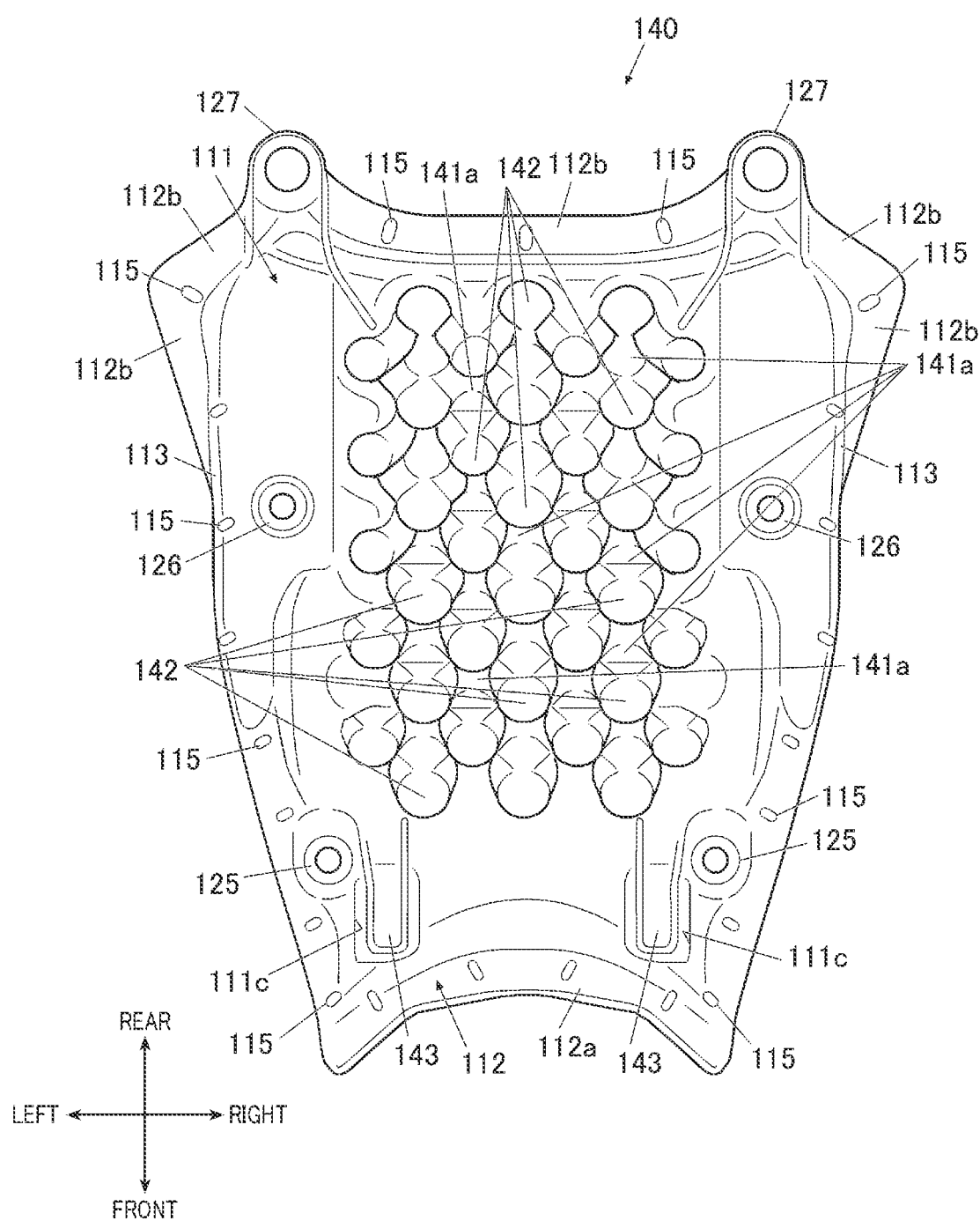
FIG. 12 is a bottom view illustrating the cushion support member.

In the body plate 111, as illustrated in FIGS. 9 and 10, a part on which an occupant is to sit, is formed so as to be lower than other parts in a side view and is defined as a maximum load-receiving part 111a.

The body plate 111 has a peripheral reinforcement 112 that is provided along the periphery of the body plate 111. The peripheral reinforcement 112 includes a front peripheral reinforcement 112a and a rear peripheral reinforcement 112b that are respectively on front and rear sides across the vicinity of the maximum load-receiving part 111a.

The body plate 111 has a side wall 113 that is provided along the periphery of the body plate 111. The side wall 113 has ends in the front-rear direction that are integrally formed with the front peripheral reinforcement 112a and the rear peripheral reinforcement 112b.

The body plate 111 also has a rear wall 114 that is provided along the periphery of the body plate 111.

The peripheral reinforcement 112 and the side walls 113 are formed with a plurality of engaging holes 115 that are to be engaged with engaging members provided to the end of the cover material.

Moreover, through holes 111c are formed in a front end part of the body plate 111, at positions above a plurality of protrusions 143, which will be described later.

As illustrated in FIGS. 9 to 14, the cushion support member 140 includes pluralities of reinforcements 141 and 142, pluralities of load-receiving parts 125 to 127, and a plurality of protrusions 143, as parts that are integrally formed to the body plate 111.

The pluralities of load-receiving parts 125 to 127 are disposed on both outer sides in the right-left direction of the body plate 111. The pluralities of load-receiving parts 125 to 127 include first load-receiving parts 125 positioned on the front side, second load-receiving parts 126 positioned on the center side, and third load-receiving parts 127 positioned on the rear side.

Among the pluralities of load-receiving parts 125 to 127, the second load-receiving parts 126, which are positioned on the center side, are disposed in the vicinity of the maximum load-receiving part 111a of the body plate 111.

The pluralities of reinforcements 141 and 142 are formed at the center area of the body plate 111 to reinforce the cushion support member 110.

Such pluralities of reinforcements 141 and 142 include a plurality of first reinforcements 141, which are convex to the upper surface side, and a plurality of second reinforcements 142, which are convex to the lower surface side.

Each of the plurality of first reinforcements 141 has a curved surface at a part closest to the cushion material and is circularly shaped in a top view.

Each of the plurality of second reinforcements 142 has a curved surface at a part most distant from the cushion material and is circularly shaped in a bottom view.

These pluralities of reinforcements 141 and 142, in which the protruded parts have curved surfaces and are circularly shaped, are seen as if they are spheres or hemispheres in a top view and a bottom view, respectively.

Figure 13:
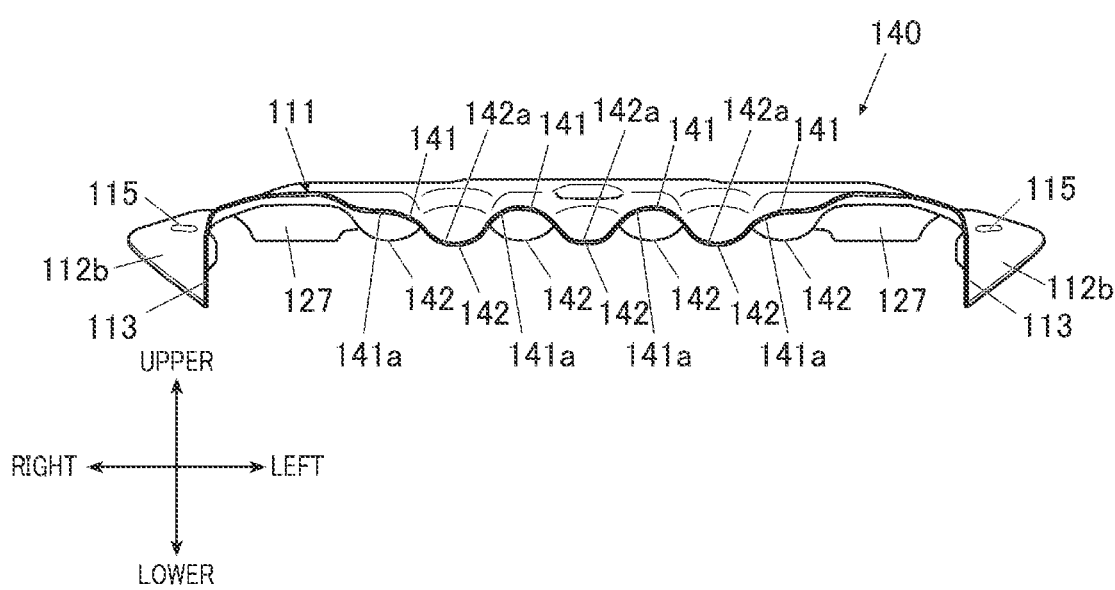
FIG. 13 is a sectional view taken along a B-B line in FIG. 11.

In addition, the plurality of first reinforcements 141 are formed into recessed shapes on the back surface of the body plate 111, as illustrated in FIG. 13. Specifically, the plurality of first reinforcements 141 are formed upward as holes that do not penetrate (hereinafter, hollows 141a), in a bottom view.

On the other hand, the plurality of second reinforcements 142 are formed into recessed shapes on the back surface of the body plate 111. Specifically, the plurality of second reinforcements 142 are formed downward as holes that do not penetrate (hereinafter, hollows 142a), in a top view.

The hollows 141a and 142a are formed into dome shapes in a top view and a bottom view, respectively.

The plurality of first reinforcements 141, which are convex to the upper surface side, and the plurality of second reinforcements 142, which are convex to the lower surface side, are arranged at mutually different positions, in a projection view in the upper-lower direction of the cushion support member 140.

In more detail, the pluralities of reinforcements 141 and 142 are arranged in alternating positional relationships, in terms of plane positional relationships of the body plate 111 and of position adjustment in the upper-lower direction. More specifically, the plurality of first reinforcements 141 are staggered, while the plurality of second reinforcements 142 are staggered in positional relationships for avoiding the staggered array of the plurality of first reinforcements 141.

Next, the plurality of protrusions 143 are parts to be fixed to a vehicle body, and they are disposed on the front side of the cushion support member 140 and protrude forward from the back surface of the cushion support member 140, as illustrated in FIGS. 9 to 12. These plurality of protrusions 143 are disposed adjacent to inner sides in the right-left direction of the first load-receiving parts 125, which are provided to both sides in the right-left direction of the cushion support member 140.

In the second embodiment as described above, the cushion support member 140 includes the plurality of first reinforcements 141 that are convex to the upper surface side so as to reinforce the cushion support member 140. Each of the plurality of first reinforcements 141 has the curved surface at the part closest to the cushion material and is circularly shaped in a top view. Thus, the cushion support member 140 hardly has angular parts on the upper surface, whereby a load is easily distributed along the first reinforcements 141, which are formed into curved surfaces. This structure prevents concentration of load, whereby the cushion support member 140 is easily reinforced by using the plurality of first reinforcements 141.

In addition, the cushion support member 140 also includes the plurality of second reinforcements 142 that are convex to the lower surface side so as to reinforce the cushion support member 140. Each of the plurality of second reinforcements 142 has the curved surface at the part most distant from the cushion material and is circularly shaped in a bottom view. Thus, the cushion support member 140 hardly has angular parts on the lower surface, whereby a load is easily distributed along the second reinforcements 142, which are formed into curved surfaces. This structure prevents concentration of load, whereby the cushion support member 140 is easily reinforced by using the plurality of second reinforcements 142.

Moreover, the plurality of first reinforcements 141, which are convex to the upper surface side, and the plurality of second reinforcements 142, which are convex to the lower surface side, are arranged at mutually different positions, in a projection view in the upper-lower direction of the cushion support member 140. Thus, it is possible to prevent an increase in thickness of the cushion support member 140 and to reduce the weight of the cushion support member 140.

MODIFICATION EXAMPLES

Embodiments in which the present invention can be used are not limited to the embodiments described above and can be modified or altered within a range not departing from the gist of the present invention as appropriate. The following describes modification examples. The modification examples described below can be used together, if appropriate.

In addition, elements of each of the following modification examples that are the same as those of the above-described embodiments are denoted by the same reference signs, and descriptions thereof are omitted or simplified.

First Modification Example

A cushion support member 150 of this modification example constitutes a seat cushion of a seat of a passenger car. In more detail, the seat cushion is formed as follows: The cushion support member 150 is mounted on a cushion frame, a cushion material is provided on an upper surface of the cushion support member 150, and the cushion frame, the cushion support member 150, and the cushion are covered with a cover material.

The cushion support member 150, which constitutes a seat of a passenger car, can also be called a "support plate" or a "pressure-receiving member."

Although not illustrated, the cushion frame includes paired right and left side frames, a bar-shaped front frame that connects front ends of the paired right and left side frames to each other, a bar-shaped rear frame that connects rear ends of the paired right and left side frames to each other, and a pan frame that is coupled to the front ends of the paired right and left side frames.

The cushion support member 150 is laid between the bar-shaped front frame and the bar-shaped rear frame of the cushion frame.

Figure 15:
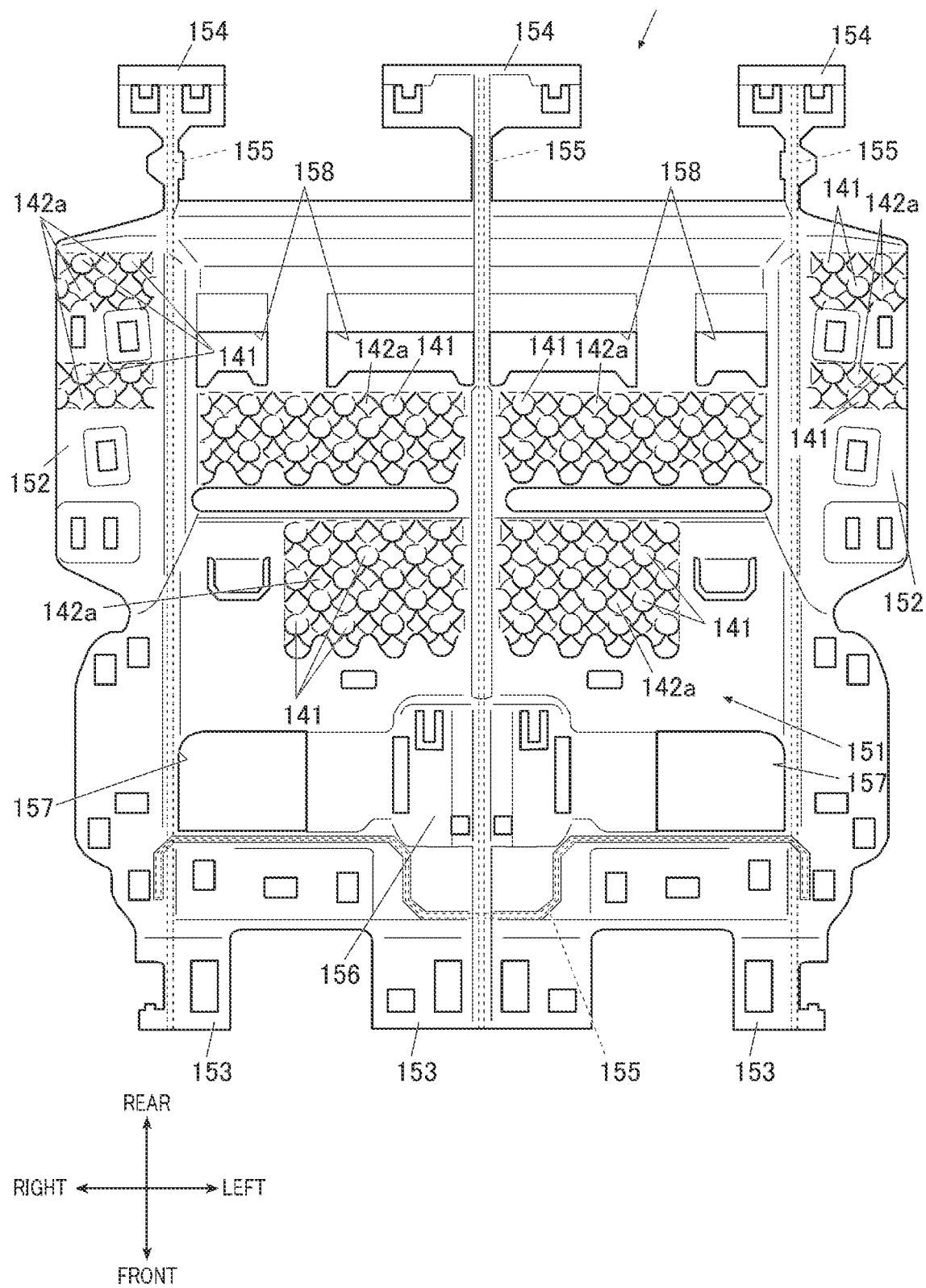
FIG. 15 is a top view illustrating a first modification example of the cushion support member.
Figure 16:
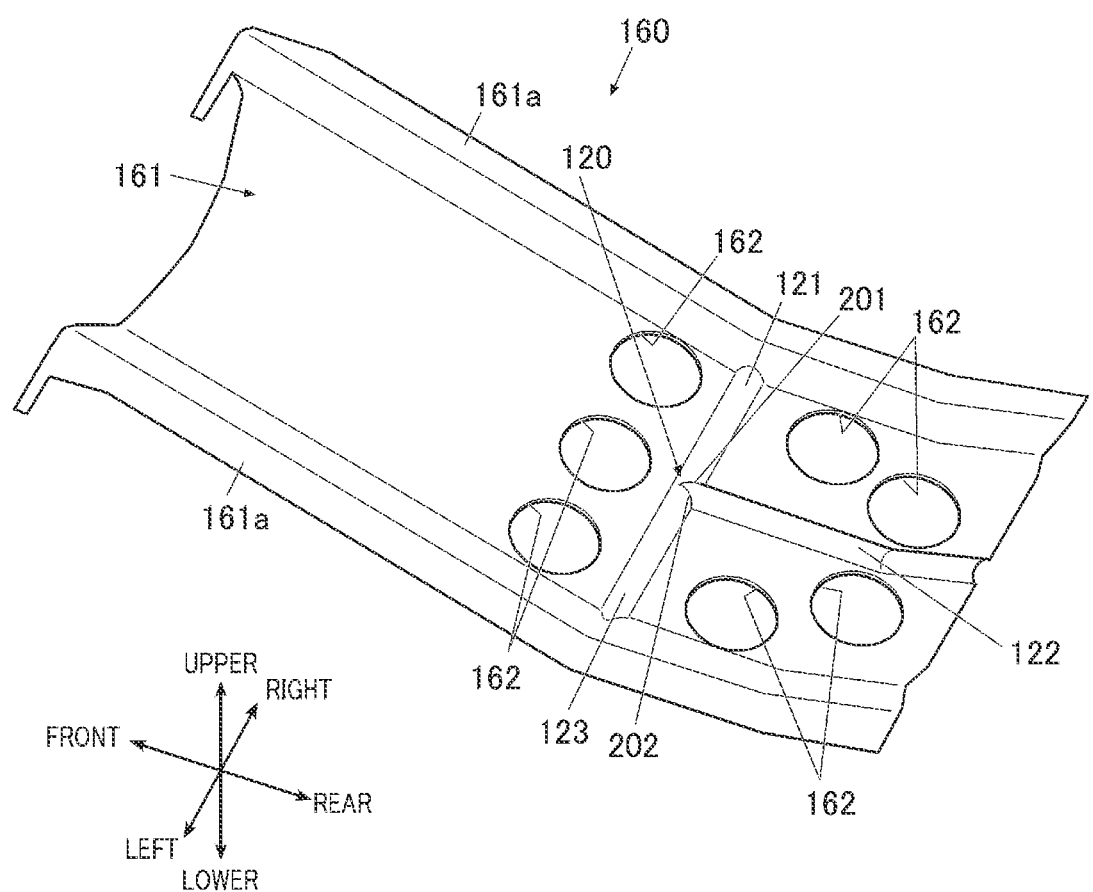
FIG. 16 is a perspective view illustrating a second modification example of the cushion support member.
Figure 17:
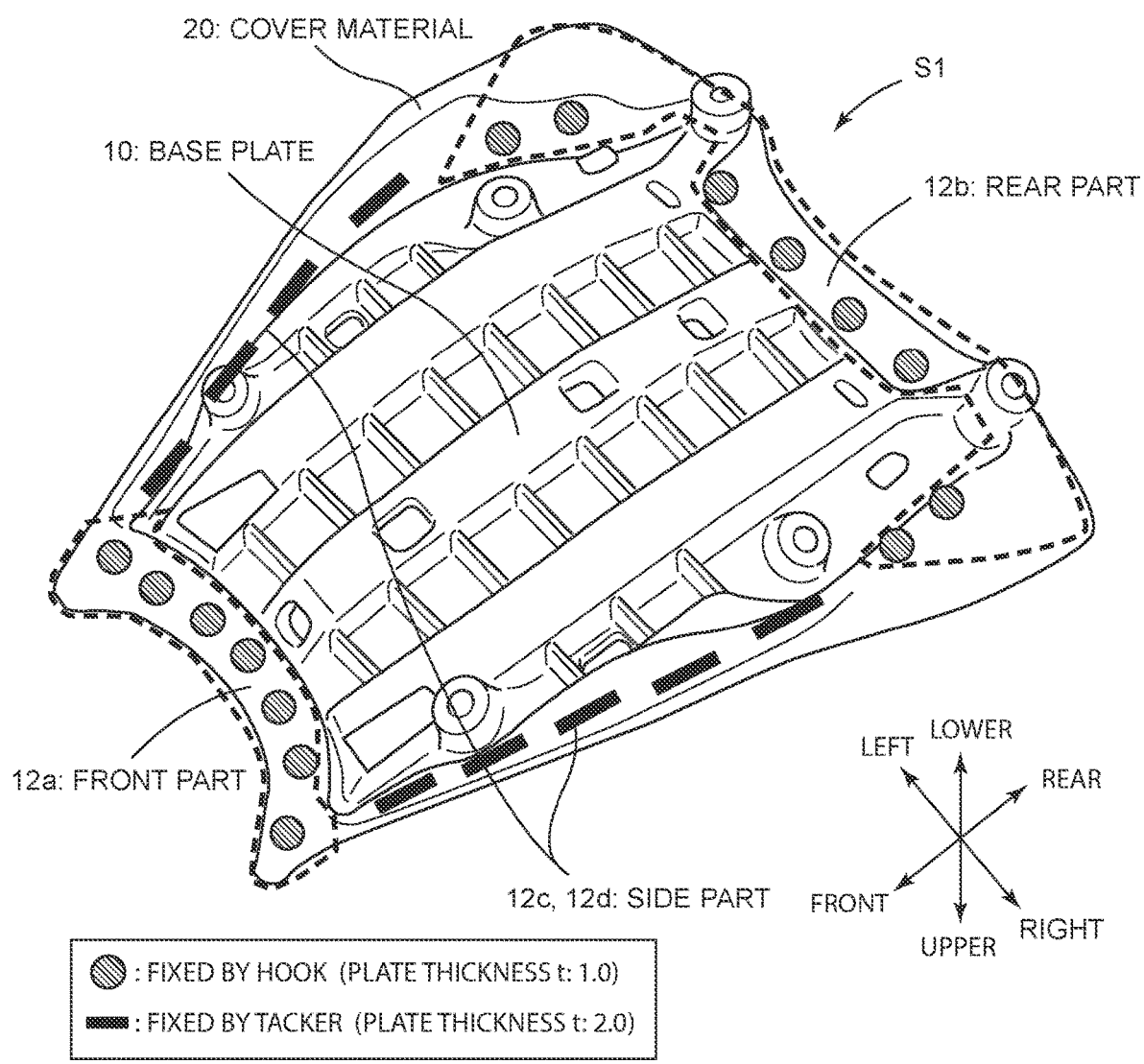
FIG. 17 is a perspective view illustrating a back surface of a vehicle seat of a third embodiment.
Figure 18:
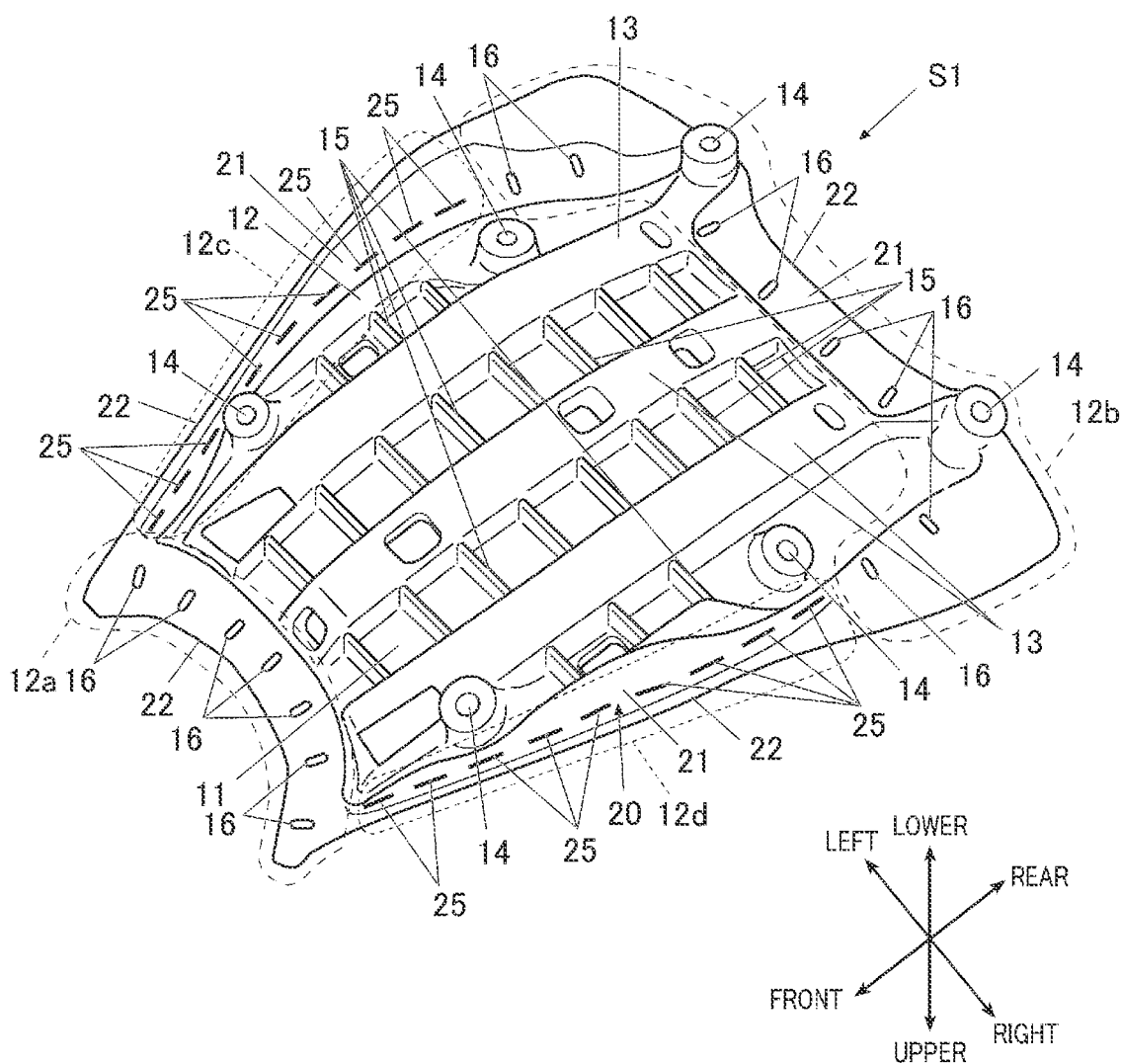
FIG. 18 is a perspective view for explaining more details of the vehicle seat in FIG. 17.

As illustrated in FIG. 15, the cushion support member 150 includes a body plate 151, oblique parts 152, front mounting parts 153, and rear mounting parts 154. The body plate 151 extends approximately parallel to the cushion frame. The oblique parts 152 extend obliquely outward to an upper surface side (upper side) from right and left side edges at a rear part of the body plate 151. The front mounting parts 153 extend forward from a front edge of the body plate 151 and engage with the front frame. The rear mounting parts 154 obliquely extend upward to the rear side, from a rear edge of the body plate 151.

Moreover, the cushion support member 150 is formed of resin into which metal wires 155 (linear members) are insert-molded, and it can be bent under the weight of an occupant and to elastically support the occupant.

A sensor-mounting area 156 on which a pressure sensor that is not illustrated is to be mounted, is formed on the upper surface at the center in the right-left direction of the front part of the body plate 151.

The pressure sensor detects a pressure that is applied to the seat cushion, in order to determine whether an occupant sits on the seat. The pressure that is applied at the time of seating is low at the rear part of the body plate 151 due to the oblique parts 152 distributing the load of an occupant. In view of this, the pressure sensor is disposed at a position offset forward from the oblique parts 152, in order to avoid the effects for distributing pressure by the oblique parts 152.

In addition, the body plate 151 is formed with openings 157 and 158 that are necessary for ventilation or attaching members, as appropriate. These openings 157 and 158 also have functions for distributing an occupant load. The wires 155 are arranged so as to avoid these openings 157 and 158.

The cushion support member 150 includes pluralities of reinforcements 141 and 142 for reinforcing the cushion support member 150. These pluralities of reinforcements 141 and 142 are integrally formed to the body plate 151.

The pluralities of reinforcements 141 and 142 are arranged so as to avoid the wires 155, the sensor-mounting area 156, and the openings 157 and 158 of the body plate 151. More specifically, the pluralities of reinforcements 141 and 142 are integrally formed to the center of the body plate 151 and to the right and left oblique parts 152.

This modification example employs a plurality of first reinforcements 141, which are convex to the upper surface side, and a plurality of second reinforcements 142, which are convex to the lower surface side, as the pluralities of reinforcements 141 and 142. However, the reinforcements are not limited thereto and may employ first reinforcements 121 extending in a first direction, second reinforcements 122 extending in a second direction, and third reinforcements 123 extending in a third direction.

In order to ensure accuracy of a pressure sensor to be mounted on the sensor-mounting area 156, the pluralities of reinforcements 141 and 142 are arranged so as to avoid also the vicinity of the sensor-mounting area 156.

In a case in which rigidity of the sensor-mounting area 156 and the vicinity thereof must be improved, a plurality of reinforcements are preferably integrally formed on a side opposite to the cushion material (lower surface side) of the body plate 151. This structure can reduce effects on the sensor.

In this modification example, parts that have relatively low strength without the wires 155 of the cushion support member 150 are reinforced by the pluralities of reinforcements 141 and 142, whereby rigidity of the cushion support member 150 can be improved.

Moreover, while rigidity of the cushion support member 150 is improved by the pluralities of reinforcements 141 and 142, the cushion support member 150 can be reduced in weight by the openings 157 and 158, which function as load distribution holes.

Second Modification Example

A cushion support member 160 of this modification example constitutes a seat of a motorcycle. A cushion material is provided on an upper surface of the cushion support member 160, and the cushion material and the cushion support member 160 are covered with a cover material.

Such a cushion support member 160 has a body plate 161 and a plurality of load distribution holes 162 for distributing an occupant load.

The body plate 161 has right and left side edges that are integrally formed with upwardly-protruding ribs 161*a*, which improve rigidity of the body plate 161.

The plurality of load distribution holes 162 are disposed between the right and left ribs 161*a* of the body plate 161 and are formed to penetrate through the body plate 161.

These plurality of load distribution holes 162 are formed in the body plate 161 in consideration of opening areas and positions of the ischium and the coccyx, so as to effectively distribute an occupant load.

This structure can effectively distribute an occupant load in this manner, but the body plate 161 should be reinforced due to the plurality of holes formed in the body plate 161.

In view of this, in this modification example, a plurality of reinforcements 121, 122, and 123 are integrally formed to the body plate 161 and are arranged so as to avoid the plurality of load distribution holes 162.

The surface of a joint 120 at which the plurality of reinforcements 121, 122, and 123 intersect with each other and are joined together, shows a first join line 201 and a second join line 202 that are formed of curved lines.

In this modification example, the weight of the cushion support member 160 can be reduced by the plurality of load distribution holes 162 while improving rigidity of the cushion support member 160 by the pluralities of reinforcements 121, 122, and 123.

[Supplementary Notes of First and Second Embodiments]

It can be understood from the above-described contents about the first and the second embodiments that they include implications of various technical ideas in addition to the inventions described in the following supplementary notes.

[Supplementary Note 1]

A structure of a cushion support member that constitutes a seat on which an occupant is to sit, the cushion support member supporting a cushion material that is provided on an upper surface of the cushion support member, the cushion support member comprising:
a plurality of reinforcements for reinforcing the cushion support member; and
a joint at which the plurality of reinforcements intersect with each other and are joined together,
the plurality of reinforcements including a first reinforcement that extends in a first direction, a second reinforcement that extends in a second direction adjacent to the first direction, and a third reinforcement that extends in a third direction adjacent to the second direction,
the joint having a surface showing a first join line and a second join line, the first join line indicating a joined part of the first reinforcement and the second reinforcement, the second join line indicating a joined part of the second reinforcement and the third reinforcement,
the first join line and the second join line being formed of curved lines that curve from one side to the other side in the thickness direction of the cushion support member,
an end of the first join line and an end of the second join line meeting at the same position on the one side in the thickness direction.

[Supplementary Note 2]

The structure of the cushion support member according to Supplementary Note 1,
wherein the joint has a back surface formed with a hole.

[Supplementary Note 3]

The structure of the cushion support member according to Supplementary Note 2,
wherein the hole is formed into a perfect circle shape as well as a dome-like shape so as to not penetrate the joint.

[Supplementary Note 4]

The structure of the cushion support member according to any one of Supplementary Notes 1 to 3,
wherein the cushion support member further comprises a load-receiving part for receiving an occupant load,
a plurality of the joints are provided in a front-rear direction of the seat, and
the load-receiving part is disposed on an outer side in a right-left direction of the seat, from the plurality of joints, while being disposed in the middle in the front-rear direction of the plurality of joints, in a projection view from a side surface of the cushion support member.

[Supplementary Note 5]

The structure of the cushion support member according to Supplementary Note 4,
wherein the cushion support member further comprises a bead for reinforcing the cushion support member, and
the bead is disposed on an outer side in the right-left direction of the seat, from the plurality of joints, while being disposed at an interval from the load-receiving part in the front-rear direction, in a projection view from the side surface of the cushion support member.

[Supplementary Note 6]

The structure of the cushion support member according to Supplementary Note 5,
wherein the cushion support member further comprises the plurality of reinforcements that extend in the right-left direction of the seat from each of the plurality of joints,
a plurality of the beads are provided,
one of the plurality of beads is disposed forward of and closest to the load-receiving part, the one bead is formed longer than the other beads, and
the one bead that is closest to the load-receiving part is disposed in a middle in the front-rear direction of the plurality of reinforcements that extend in the right-left direction of the seat from each of the plurality of joints, in a projection view from the side surface of the cushion support member.

[Supplementary Note 7]

A structure of a cushion support member that constitutes a seat on which an occupant is to sit, the cushion support member supporting a cushion material that is provided on an upper surface of the cushion support member, the cushion support member comprising a plurality of reinforcements that are convex to an upper surface side so as to reinforce the cushion support member, each of the plurality of reinforcements having a curved surface at a part closest to the cushion material and being circularly shaped in a top view.

[Supplementary Note 8]

The structure of the cushion support member according to Supplementary Note 7,
wherein the cushion support member further comprises a plurality of reinforcements that are convex to a lower surface side so as to reinforce the cushion support member, each of the plurality of reinforcements has a curved surface at a part most distant from the cushion material and is circularly shaped in a bottom view, and
the plurality of reinforcements, which are convex to the upper surface side, and the plurality of reinforcements, which are convex to the lower surface side, are arranged at mutually different positions, in a projection view in an upper-lower direction.

[Supplementary Note 9]

The structure of the cushion support member according to any one of Supplementary Notes 1 to 8,
wherein the cushion support member further comprises a linear member for reinforcing the cushion support member, and
the plurality of reinforcements are arranged so as to avoid the linear member.

[Supplementary Note 10]

The structure of the cushion support member according to any one of Supplementary Notes 1 to 9,
wherein the cushion support member further comprises a plurality of load distribution holes for distributing an occupant load, and
the plurality of reinforcements are arranged so as to avoid the plurality of load distribution holes.

<Embodiments Related to Vehicle Seat>

Hereinafter, embodiments of the present invention will be described with reference to the drawings. Note that the embodiments described below are limited by various elements that are technically preferable for implementing the present invention, but the technical scope of the present invention should not be limited to the embodiments and the illustrated examples described below.

In addition, the vehicle seat that is described below includes seats of vehicles, such as ships, airplanes, snowmobiles, and personal watercrafts, but it is designed mainly to seats of wheeled vehicles. The wheeled vehicles include not only motorcycles of saddle type and non-saddle type and automobiles (passenger cars) but also bicycles, motorized bicycles, construction vehicles, military vehicles, industrial vehicles, and railway vehicles, and they moreover include agricultural vehicles, such as cultivators and tractors. The vehicle seat can be used by an occupant.

The following embodiments are described by using a vehicle seat for a saddle type motorcycle (what is called a "bike," a "motorbike," or a "motorcycle") as an example.

The vehicle seat includes a base plate to be fixed to a vehicle body, a cushion material provided to be supported on an upper surface of the base plate, and a cover material that covers the base plate and the cushion material. That is, the vehicle seat is constructed such that the base plate supports the cushion material and that the cover material covers them.

The base plate is a resin molded article that is formed of a resin material such as polypropylene or polyvinyl chloride. The base plate is formed into a shape corresponding to a vehicle body of a vehicle and is used by mounting it to the vehicle body. From this point of view, the base plate is made especially hard. The base plate may be attached with a metal fitting or the like that is necessary to fix it to a vehicle body or may be inserted with a metal material at the manufacturing stage.

The cushion material is formed of a soft foam material, for example, urethane foam, polypropylene foam, or polyethylene foam, and it is softer than the base plate. The cushion material, which is supported on the upper surface of the base plate, has a lower surface with a shape that easily fits to the shape of the upper surface of the base plate. This facilitates stably supporting the cushion material by the upper surface of the base plate.

The facing surfaces of the base plate and the cushion material, that is, the upper surface of the base plate and the lower surface of the cushion material are defined as reference surfaces, respectively.

The cover material constitutes a seating surface of the vehicle seat and is to be used in contact with an occupant. A resin cover material, a synthetic leather cover material, a fabric cover material, a real leather cover material, or the like, is used as the cover material as appropriate.

An end part of the cover material is folded under the back surface (lower surface) of the base plate and is fixed to the base plate. Note that the end part of the cover material represents the entire periphery of the cover material. Thus, the end part of the cover material is fixed over the entire periphery of the base plate.

Third Embodiment

Hereinafter, a vehicle seat S1 of a third embodiment will be described in detail with reference to FIGS. 17 to 21.

The vehicle seat S1 in this embodiment includes a base plate 10, a cushion material (not illustrated), and a cover material 20.

The base plate 10 can also be called a "bottom plate" or a "cushion support member" and is a resin molded article, as described above. Thus, almost all parts are integrally formed into one body, and attachments are mounted as necessary. In other words, the base plate 10 is composed mainly of a body plate 11, and parts having respective functions are integrally formed to the body plate 11.

In the body plate 11, a part on which an occupant is to sit, is formed so as to be lower than other parts in a side view. The vicinity of the part that is thus formed so as to be lower than other parts is a part corresponding to a position of the ischium of an occupant who drives a motorcycle. This part is defined as a maximum load-receiving part that receives a load from the occupant (occupant load) most in the seat.

Such a body plate 11 includes a flange 12 that is provided along the periphery of the body plate 11, and rigidity of the periphery of the body plate 11 can be improved by the flange 12.

The flange 12 is a part that is integrally formed with the periphery of the body plate 11 so as to protrude outward in a flange shape.

Such a flange 12 is roughly divided into areas of a front part 12a, a rear part 12b, and left and right side parts 12c and 12d. The front part 12a is positioned on a front edge of the body plate 11 to reinforce the vicinity of the front edge. The rear part 12b is positioned on a rear edge of the body plate 11 to reinforce the vicinity of the rear edge. The left and right side parts 12c and 12d are positioned on left and right edges of the body plate to reinforce the vicinities of the side edges.

The flange 12 is formed so as to extend obliquely downward as well as protrude outward from the body plate 11.

In the flange 12 having such a shape, a surface that is used on a vehicle body side is a back surface, whereas a surface that is used on a side opposite to a vehicle body is an upper surface. The upper surface is provided with the cushion material, as described above.

The base plate 10 includes a plurality of reinforcements 13, a plurality of load-receiving parts 14, and a plurality of ribs 15, as parts that are integrally formed to the body plate 11.

The base plate 10 also includes a plurality of hooks 16 that are protruded from the back surface of the flange 12, as parts that are integrally formed with the flange 12.

The plurality of reinforcements 13 each are ridge-like parts extending in the front-rear direction and include a reinforcement 13, which is disposed at the center of the body plate 11, and right and left reinforcements 13, which are disposed so as to be laterally separated from the center reinforcement 13.

Although not illustrated, the upper surface of each of the reinforcements 13 is formed so as to be recessed from the above-described reference surface. In addition, the upper surface of each of the reinforcements 13 is provided with reinforcing ribs that are laid between side walls constituting the corresponding reinforcement 13. The position that is strengthened by the reinforcing rib may be formed with a through hole for weight reduction.

Next, the plurality of load-receiving parts 14 are parts that are to be positioned between the base plate 10 and a vehicle body so as to receive an occupant load. They are respectively disposed on outer sides in the right-left direction of the right and left reinforcements 13.

The plurality of load-receiving parts 14, which are respectively disposed on the outer sides in the right-left direction, include load-receiving parts 14 positioned on the front side, load-receiving parts 14 positioned on the center side, and load-receiving parts 14 positioned on the rear side.

Herein, the load-receiving parts 14 are parts that are to be directly fixed to a vehicle body, and each of them also includes an elastic member such as a rubber, which is mounted to the corresponding part, and an element to which the elastic member is attached. This elastic member is softer than the base plate 10 and is fixed to the lower surface of the base plate 10, for example, by welding. Alternatively, insertion holes may be formed in the base plate 10, whereas inserting pieces to be inserted into the insertion holes may be formed to the elastic members of the load-receiving parts 14. Under these conditions, the inserting pieces may be inserted and fitted into the insertion holes, whereby the elastic members of the load-receiving parts 14 may be fixed to the base plate 10.

Among the plurality of load-receiving parts 14, the load-receiving parts 14, which are positioned on the center side, are disposed in the vicinity of the maximum load-receiving part of the body plate 11. In other words, the maximum load-receiving part is positioned between the center load-receiving parts 14, which are disposed on the right and left sides of the base plate 10. Thus, the center load-receiving parts 14 tend to be applied with an occupant load greater than that applied to the front and rear load-receiving parts 14.

The front load-receiving parts 14 are respectively positioned between a front part of the side part 12c of the flange 12 and the left reinforcement 13 and between a front part of the side part 12d of the flange 12 and the right reinforcement 13, and they are integrally formed to the body plate 11.

The rear load-receiving parts 14 are integrally formed to the body plate 11 at the rear part 12b of the flange 12.

These plurality of load-receiving parts 14 each have a bolt hole in proximity to the center thereof, and the base plate 10 can be fixed to a vehicle body by bolts that are inserted from these bolt holes.

Next, the plurality of ribs 15 have shapes for reinforcing the base plate 10 and are disposed so as to extend in the right-left direction from the side walls of the plurality of reinforcements 13. Moreover, the plurality of ribs 15 are arranged at intervals in the front-rear direction of the body plate 11.

In more detail, the plurality of ribs 15 include those laid between the side walls of the plurality of reinforcements 13 and those further extending laterally from the side walls of the right and left reinforcements 13. Both the plurality of ribs 15, which are laid between the side walls of the plurality of reinforcements 13, and the plurality of ribs 15, which further extend laterally from the side walls of the right and left reinforcements 13, are arranged at intervals in the front-rear direction of the body plate 11.

Next, the plurality of hooks 16 are passed through holes 23 (described later), which are formed in an end part 21 of the cover material 20, to hook the end part 21. The plurality of hooks 16 are formed at each of the front part 12a and the rear part 12b of the flange 12 of the base plate 10.

The number of the hooks 16 is not specifically limited, but in this embodiment, seven hooks 16 and eight hooks 16 are provided at the front part 12a and the rear part 12b, respectively. Among the hooks 16 that are provided at the rear part 12b, four hooks 16 are positioned between the rear load-receiving parts 14, and two hooks 16 are provided on each of the outer sides in the right-left direction of the rear load-receiving parts 14.

Figure 19A:
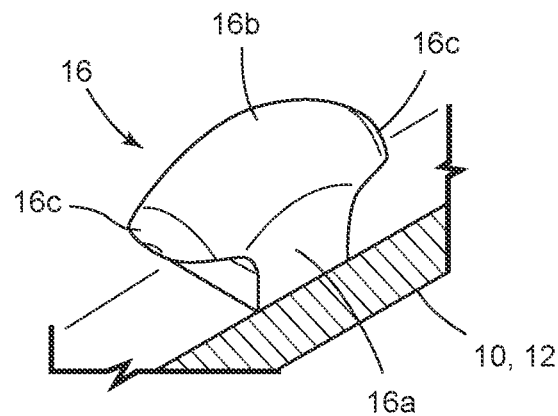
FIG. 19A illustrates a structure of a hook.

As illustrated in FIG. 19A, the hook 16 has a stem 16a, which protrudes from the back surface of the flange 12, and a head 16b, which is positioned at an end in a protruding direction of the stem 16a. The head 16b has tip ends 16c that protrude from side surfaces of the stem 16a.

In more detail, the head 16b of the hook 16 has a shape with a short side and a long side in a back view of the base plate 10.

The length of the short side is set to be the same width as the side surface of the stem 16a, whereas the length of the long side is set to be longer than the side surface of the stem 16a. Thus, the tip end 16c in the longitudinal direction of the head 16b protrudes to the side from the side surface of the stem 16a.

In addition, the tip end 16c that protrudes from the side surface of the stem 16a is formed at each side end in the longitudinal direction of the head 16b of this embodiment. That is, the hook 16 is formed into an approximately T-shape in a side view.

Figure 19B:
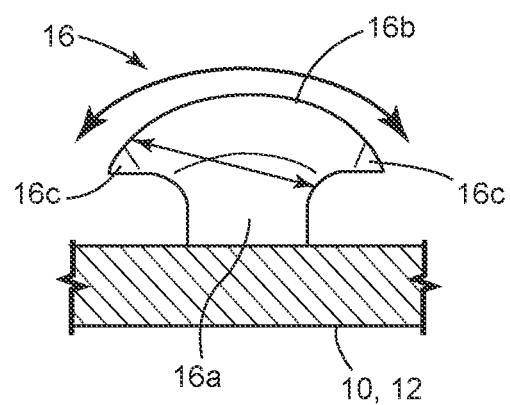
FIG. 19B illustrates the structure of the hook.
Figure 19C:
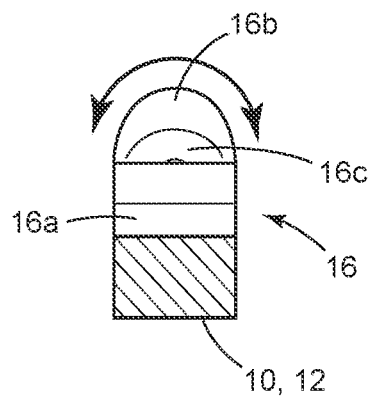
FIG. 19C illustrates the structure of the hook.

The head 16b of the hook 16 has an upper surface with a curved shape, as illustrated in FIGS. 19B and 19C. Specifically, the head 16b has a curved shape in the short side direction and also has a curved shape in the long side direction.

A lower surface of the tip end 16c of the head 16b does not have a curved shape but is formed flat.

The base plate 10 at the part that is provided with the hooks 16 is increased in strength due to the provided hooks 16 and can thereby be decreased in thickness. That is, in this embodiment, the thickness of each of the front part 12a and the rear part 12b of the flange 12 of the base plate 10 can be decreased. Reducing the thickness is preferable because this contributes to reduction in weight of the whole vehicle seat 31, even if the reduction is partially performed.

The thickness of each of the front part 12a and the rear part 12b of the flange 12 in this embodiment is set to, for example, 1.0 mm.

Next, the cover material 20 will be described.

The cover material 20 includes a body cover part (not illustrated) for covering the cushion material and the upper surface of the base plate 10 and also includes an end part 21 that is folded under the back surface of the base plate 10.

Figure 21:
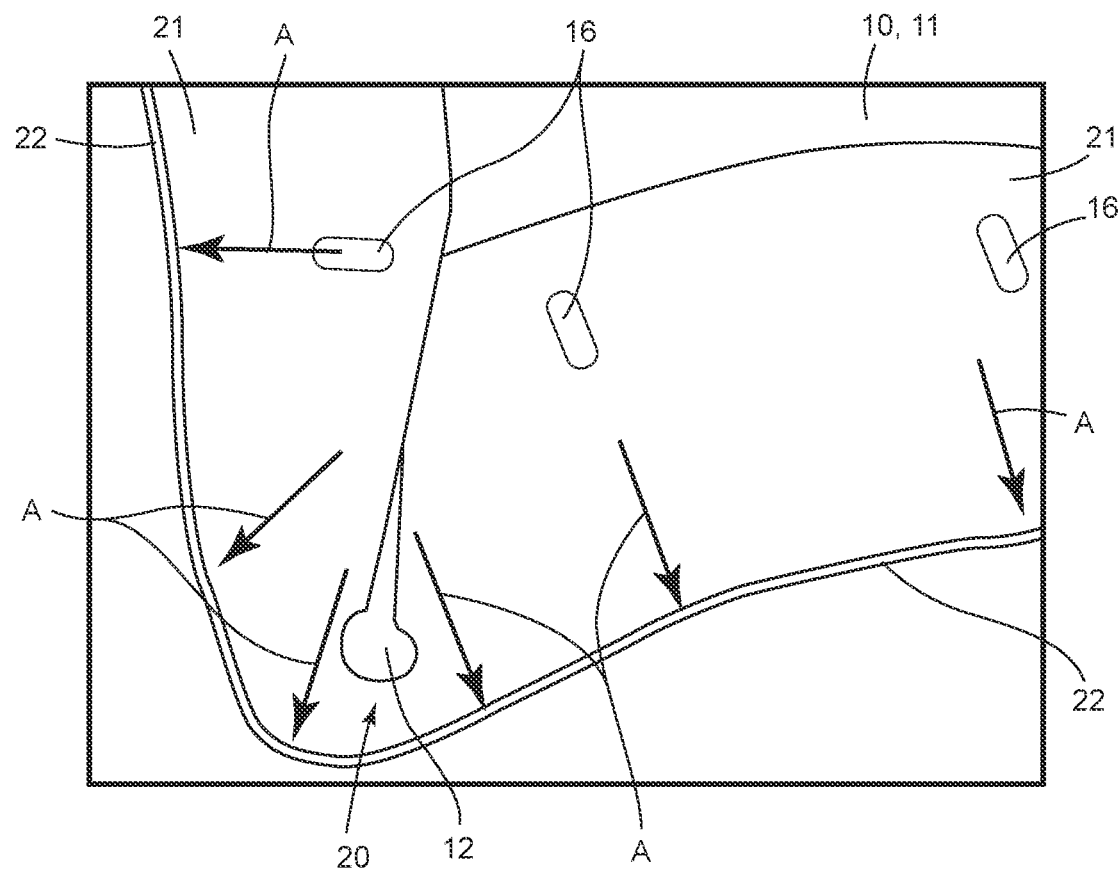
FIG. 21 illustrates directions of heads of the hooks.

The cover material 20 at a part 22 that is folded from the upper surface to the back surface of the base plate 10 (hereinafter, a "folded part 22") is along the edge of the base plate 10, as illustrated in FIG. 21.

In other words, the boundary between the body cover part, which covers the cushion material and the upper surface of the base plate 10, and the end part 21, which is folded under the back surface of the base plate 10, is bent at every part of the boundary. The bent part surrounds the edge (boundary between the upper surface and the back surface) of the base plate 10 and is thus along the edge of the base plate 10. Such a part is called a "folded part 22," hereinafter.

The end part 21 is formed with holes 23 for use in fixing to the base plate 10. The hook 16, which protrudes from the back surface of the flange 12 of the base plate 10, is passed through the hole 23 to hook at the edge of the hole 23. Thus, the number of the holes 23 is set to be equal to or greater than the number of the hooks 16. In other words, the hooks 16 are formed so that the number of the hooks 16 will correspond at least to the number of the holes 23 and will not be greater than the number of the holes 23.

In addition, the holes 23 are formed in the end part 21, at parts corresponding to the front part 12a and the rear part 12b of the flange 12 of the base plate 10.

The hole 23 of this embodiment may be formed into a circular hole shape or may be formed into a long hole shape or an elliptical shape in accordance with the shape of the head 16b of the hook 16. Alternatively, the hole 23 may be formed into a rectangular hole shape in accordance with the cross-sectional shape of the stem 16a. In short, the shape of the hole 23 can be changed as appropriate. However, the maximum diameter of the hole 23 is preferably smaller than the length of the long side of the head 16b, because if the maximum diameter of the hole 23 is larger than the length of the long side of the head 16b of the hook 16, the hook 16 easily comes out of the hole 23.

Although not illustrated, the circumference of the hole 23 of the end part 21 is decreased in strength, and therefore, it is provided with a reinforcement as appropriate. This reinforcement may be provided by, for example, attaching a bead-like element, affixing a tape having a high tear strength, or performing processing of generating a rugged shape.

Such an end part 21 of the cover material 20 is fixed to the base plate 10 in the state in which the end part 21 is hooked by passing the hooks 16 through the holes 23, while fixing materials 25 are driven into the base plate 10 via the end part 21. That is, the end part 21 of the cover material 20 is fixed to the base plate 10 by a first means of passing the hooks 16 through the holes 23 to hook the end part 21 and by a second means using the fixing materials 25.

In order to perform such fixation, the hooks 16 and the fixing materials 25 are disposed so as to not overlap each other in a direction in which the end part 21 of the cover material 20 is pulled.

This embodiment employs a staple that is driven by using a tool such as a tacker, as the fixing material 25. However, the fixing material 25 is not limited thereto and may employ a nail, a screw, or other fixing material, and an adhesive agent may be used together.

The thickness is increased at a part that is required to have a high strength in the base plate 10 (in this embodiment, the left and right side parts 12c and 12d of the flange 12 of the base plate 10, with which the legs of an occupant may come into contact). The part having a large thickness is suitable as an area into which the fixing material 25 is driven.

The thickness of each of the left and right side parts 12c and 12d of the flange 12 in this embodiment is set to, for example, 2.0 mm. That is, the thickness of each of the left and right side parts 12c and 12d is set to be twice the thickness of each of the front part 12a and the rear part 12b.

Figure 20:
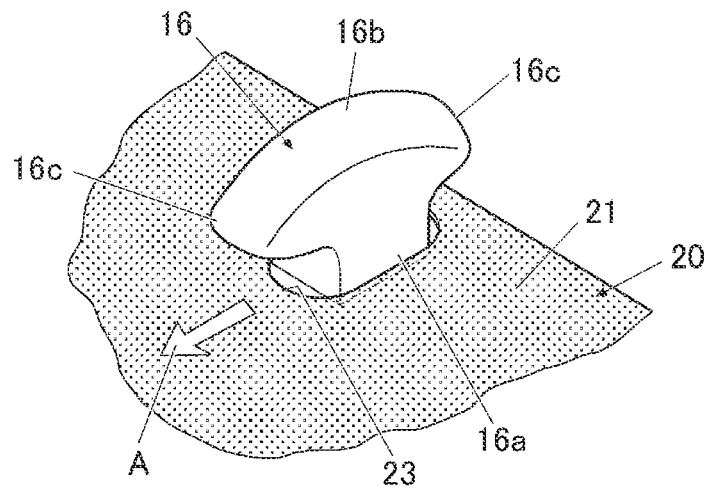
FIG. 20 is a perspective view illustrating the hook that is inserted into a hole of a cover material.

Herein, the direction in which the end part 21 of the cover material 20 is pulled is a direction indicated by the arrow "A" in FIGS. 20 and 21. In more detail, in the vehicle seat, the cushion material is deformed at the time an occupant takes the seat or an occupant shifts the occupant's weight, and the end part 21 is pulled toward the upper surface of the vehicle seat in accordance with deformation of the cushion material. More specifically, the body cover part of the cover material 20, with which an occupant is in contact, is pushed toward the upper surface of the base plate 10 in accordance with deformation of the cushion material. Meanwhile, the end part 21, which is bent at the folded part 22 to go to the back surface side of the base plate 10, is pulled toward the folded part 22.

The hooks 16 and the fixing materials 25 are disposed so as to not overlap each other in such a pulling direction.

As described above, the plurality of hooks 16 are formed at each of the front part 12a and the rear part 12b of the base plate 10. That is, the hooks 16 are not formed at the left and right side parts 12c and 12d of the base plate 10.

Thus, in this embodiment, the end part 21 of the cover material 20 is fixed to the base plate 10 as follows: The end part 21 is hooked by passing the hooks 16 through the holes 23 at the front part 12a and the rear part 12b of the flange 12 of the base plate 10, and the fixing materials 25 are driven into the base plate 10 via the end part 21 at the left and right side parts 12c and 12d of the flange 12 of the base plate 10.

In addition, the head 16b of the hook 16 is disposed so that the direction of the long side will be perpendicular to the folded part 22 of the cover material 20 in a back view of the base plate 10, as illustrated in FIGS. 20 and 21. In other words, the direction (arrow "A") in which the end part 21 of the cover material 20 can be pulled, and the long side direction of the hook 16, are the same or similar to each other.

In this embodiment, the end part 21 of the cover material 20 is fixed by the hooks 16 at the front part 12a and the rear part 12b of the flange 12 of the base plate 10 and by the fixing materials 25 at the left and right side parts 12c and 12d. However, the positions of the hooks 16 and the fixing materials 25 are not limited thereto. Specifically, in the condition that the hooks 16 and the fixing materials 25 are disposed so as to not overlap each other in the direction in which the end part 21 of the cover material 20 is pulled, for example, the hooks 16 and the fixing materials 25 may be arranged in such a manner as to be lined up in the circumferential direction of the end part 21.

In manufacturing the vehicle seat S1 in this embodiment, the fixing materials 25 are driven into the base plate 10 after the hooks 16 of the flange 12 of the base plate 10 are passed through the holes 23, which are formed at the end part 21 of the cover material 20.

The hooks 16 that are positioned at rightmost and leftmost ends among the plurality of hooks 16 provided at the front part 12a of the flange 12, and the hooks 16 that are positioned on outer sides in the right-left direction of the load-receiving parts 14 among the hooks 16 provided at the rear part 12b of the flange 12, are on extensions of the lined-up directions of the plurality of fixing materials 25 in the side parts 12c and 12d of the flange 12. With this structure, in manufacturing the vehicle seat S1, hooking the end part 21 of the cover material 20 to each of the hooks 16 on the outer sides in the right-left direction at the front part 12a and the rear part 12b prevents the end part 21 of the cover material 20 from being dislocated, resulting in easy driving work of the fixing materials 25.

In the embodiment as described above, the end part 21 of the cover material 20 is formed with the holes 23 for use in fixing to the base plate 10, and the base plate 10 has the hooks 16 that are protruded from the back surface of the base plate 10. The hooks 16 are passed through the holes 23 of the cover material 20 to hook the end part 21. The end part 21 of the cover material 20 is fixed to the base plate 10 in the state in which the end part 21 is hooked by passing the hooks 16 through the holes 23 while the fixing materials 25 are driven into the base plate 10 via the end part 21. The hooks 16 and the fixing materials 25 are disposed so as to not overlap each other in the direction in which the end part 21 of the cover material 20 is pulled. Thus, the hooks 16 and the fixing materials 25 are not arranged in line in the direction (arrow "A") in which the end part 21 of the cover material 20 can be pulled toward the upper surface. With this structure, it is possible to obtain spaces for mounting both of the hooks 16 and the fixing materials 25 while preventing an increase in size of the structure in the direction in which the cover material 20 can be pulled toward the upper surface.

In addition, the plurality of hooks 16 are formed at each of the front part 12a and the rear part 12b of the flange 12 of the base plate 10. The end part 21 of the cover material 20 is fixed to the base plate 10 in the state in which the end part 21 is hooked by passing the hooks 16 through the holes 23 at the front part 12a and the rear part 12b of the base plate 10 while the fixing materials 25 are driven into the base plate 10 via the end part 21 at the left and right side parts 12c and 12d of the base plate 10. Thus, the base plate 10 at the part that is provided with the hook 16 is increased in strength due to the provided hook 16. This part can thereby be made thinner than the part into which the fixing material 25 is driven. That is, parts can be used in different manners as follows: A part that is required to have a high strength is increased in thickness, and the cover material 20 is fixed by driving the fixing materials 25 into this part. Another part in which a high strength is not relatively required, is decreased in thickness for the purpose of weight reduction, and the cover material 20 is fixed to this part by the hooks 16. The left and right side parts 12c and 12d of the base plate 10, with which the legs of an occupant who takes the seat may come into contact, are used as the parts into which the fixing materials 25 are driven. Thus, the left and right side parts 12c and 12d of the base plate 10 can be improved in strength.

The hook 16 has the head 16b, which is positioned at the end in the direction protruding from the back surface of the base plate 10, and the head 16b has a curved shape. This enables fixing the cover material 20 more smoothly than, for example, an angular-shaped head 16b, resulting in an improvement in workability.

The end part 21 of the cover material 20 is folded from the upper surface to the back surface of the base plate 10 to be fixed. The folded part 22 of the cover material 20, which is folded from the upper surface to the back surface of the base plate 10, is along the edge of the base plate 10. The hook 16 has the head 16b, which is positioned at the end in the direction protruding from the back surface of the base plate 10. The head 16b has the shape with a short side and a long side in a back view of the base plate 10 and is disposed so that the direction of the long side will be perpendicular to the folded part 22 of the cover material 20 in a back view of the base plate 10. With this structure, the cover material 20 hardly comes off from the hook 16. That is, at the time the end part 21 of the cover material 20 is pulled toward the upper surface, a force toward the folded part 22 is applied to the cover material 20. However, the arrangement in which the direction of the long side of the head 16b of the hook 16 is perpendicular to the folded part 22 of the cover material 20, makes the cover material 20 hardly come off from the hook 16.

Third Modification Example

Embodiments in which the present invention can be used are not limited to the embodiments described above and can be modified or altered within a range not departing from the gist of the present invention as appropriate. Herein, a modification example will be described. In this modification example, elements that are the same as those of the above-described embodiments are denoted by the same reference signs, and descriptions thereof are omitted or simplified.

Figure 22A:
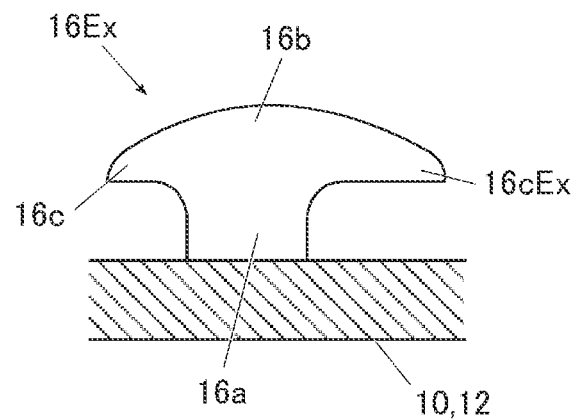
FIG. 22A illustrates a modification example of the hook.
Figure 22B:
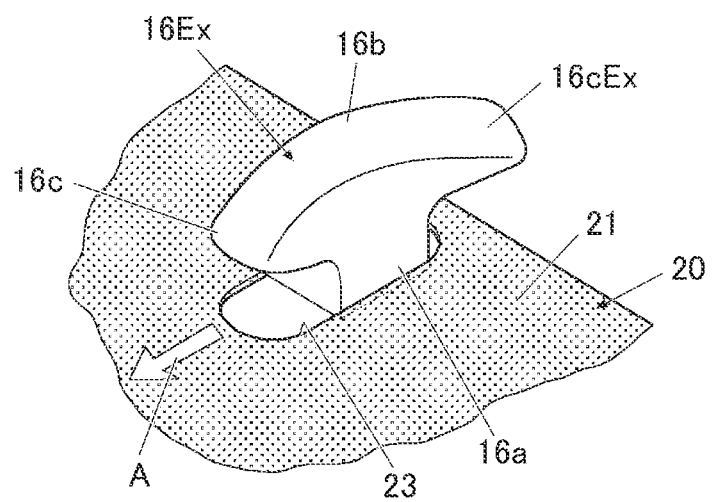
FIG. 22B illustrates the modification example of the hook.

In the case of the hook 16 of the above-described embodiment, the tip ends 16c at both ends in the long-side direction of the head 16b have the same protruding dimension from the respective side surfaces of the stem 16a. On the other hand, in the case of a hook 16Ex of this modification example, as illustrated in FIGS. 22A and 22B, a tip end 16cEx, which is one of the tip ends 16c, is formed longer than the other tip end 16c.

The one tip end 16cEx is disposed on the edge (which is an end positioned on a side opposite to the folded part 22) side of the end part 21 of the cover material 20, whereas the other tip end 16c is positioned on the folded part 22 side of the cover material 20.

In this modification example having such a structure, the one tip end 16cEx of the hook 16Ex is easily hooked by the vicinity of the hole 23 of the end part 21 of the cover material 20, whereby the end part 21 of the cover material 20 can be prevented from coming off from the hook 16Ex.

Fourth Embodiment

Figure 23:
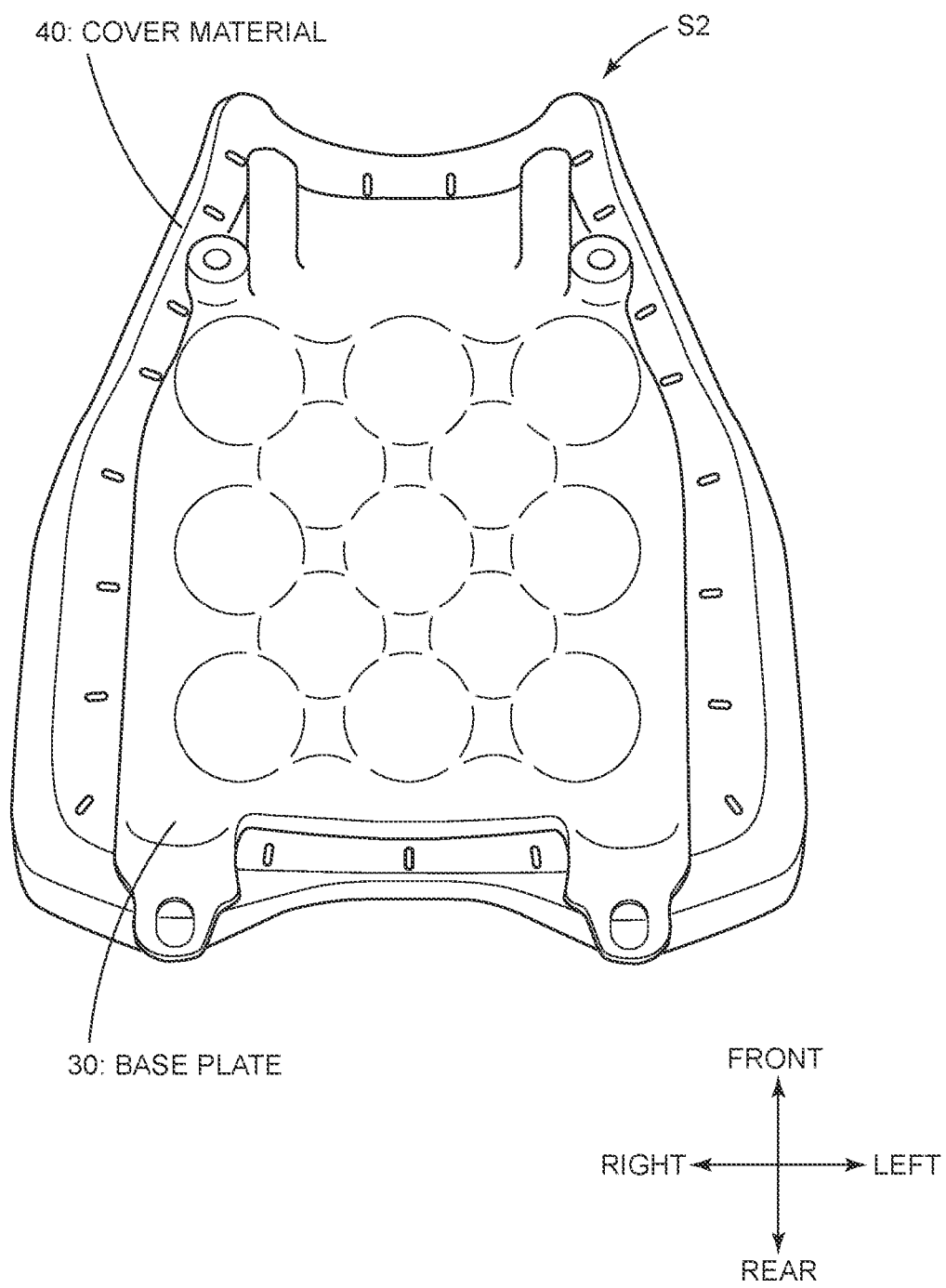
FIG. 23 is a perspective view illustrating a back surface of the vehicle seat of a fourth embodiment.
Figure 24:
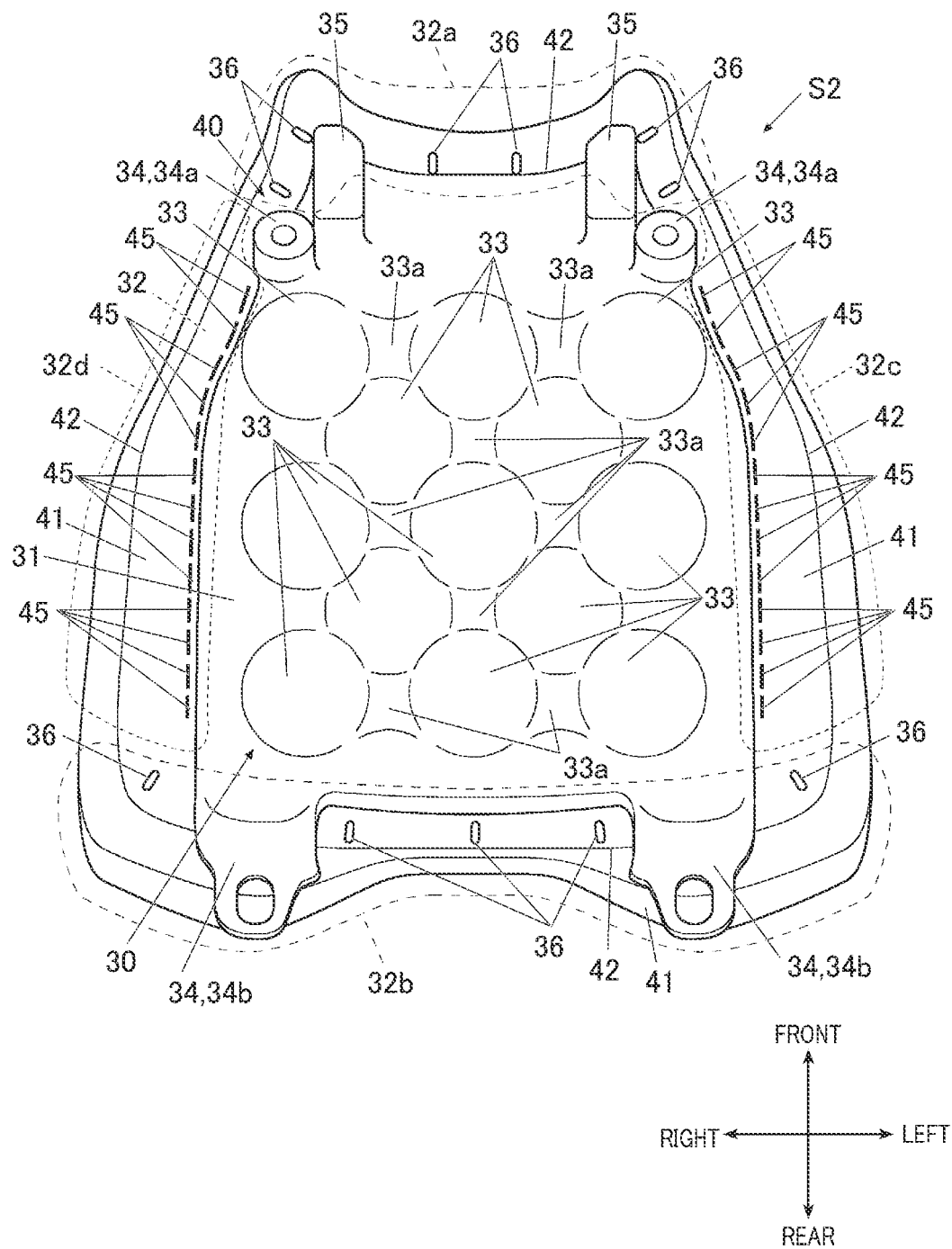
FIG. 24 is a perspective view for explaining more details of the vehicle seat in FIG. 23.

Hereinafter, a vehicle seat S2 of a fourth embodiment will be described in detail with reference to FIGS. 23 to 25. Note that descriptions of elements that are the same as those of the above-described embodiments are omitted or simplified as appropriate.

The vehicle seat S2 in this embodiment includes a base plate 30, a cushion material (not illustrated), and a cover material 40.

The base plate 30 of this embodiment is a resin molded article, as described above. Thus, almost all parts are integrally formed into one body, and attachments are mounted as necessary. In other words, the base plate 30 is composed mainly of a body plate 31, and parts having respective functions are integrally formed to the body plate 31.

Such a body plate 31 includes a flange 32 that is provided along the periphery of the body plate 31, and rigidity of the periphery of the body plate 31 can be improved by the flange 32.

The flange 32 is a part that is integrally formed with the periphery of the body plate 31 so as to protrude outward in a flange shape.

As in the case of the flange 12 of the third embodiment, such a flange 32 is roughly divided into areas of a front part 32*a*, a rear part 32*b*, and left and right side parts 32*c* and 32*d*.

The base plate 30 includes a plurality of reinforcements 33, a plurality of load-receiving parts 34, and a plurality of protrusions 35, as parts that are integrally formed to the body plate 31.

The base plate 30 also includes a plurality of hooks 36 that are protruded from the back surface of the flange 32, as parts that are integrally formed with the flange 32.

The plurality of reinforcements 33 are formed at the center area of the back surface (lower surface) of the body plate 31 to reinforce the base plate 10. Such a plurality of reinforcements 33 are convex to the lower surface side. Each of the plurality of reinforcements 33 has a curved surface at a part most distant from the cushion material and is circularly shaped in a bottom view.

These plurality of reinforcements 33, in which the protruded parts have curved surfaces and are circularly shaped, are seen as if they are spheres or hemispheres in a top view or a bottom view.

In contrast, the plurality of reinforcements 33 are formed into recessed shapes on the upper surface of the body plate 11. Specifically, the plurality of reinforcements 33 are formed downward as hollows that do not penetrate, in a top view. The hollows are formed into dome shapes in a top view.

The plurality of reinforcements 33 are staggered in a bottom view. The part that is positioned between the plurality of reinforcements 33 is a hollow 33*a* surrounded by these plurality of reinforcements 33.

Although not illustrated, a plurality of reinforcements having shapes that are the same as or similar to those of the plurality of reinforcements 33 may be formed at the center area of the surface (upper surface) of the body plate 31. In this case, the plurality of reinforcements 33 on the lower surface and the plurality of reinforcements on the upper surface are arranged at mutually different positions, in a projection view in the upper-lower direction of the base plate 30.

In more detail, the plurality of reinforcements 33 on the lower surface and the plurality of reinforcements on the upper surface are arranged in alternating positional relationships, in terms of plane positional relationships of the body plate 11 and of positional relationships in the upper-lower direction. More specifically, the plurality of reinforcements 33 on the lower surface are staggered, as described above, while the plurality of reinforcements on the upper surface are staggered in positional relationships for avoiding the staggered array of the plurality of reinforcements 33 on the lower surface.

The plurality of load-receiving parts 34 are disposed on both outer sides in the right-left direction of the body plate 31. In addition, the plurality of load-receiving parts 34 include load-receiving parts 34*a* positioned on the front side and load-receiving parts 34*b* positioned on the rear side.

Next, the plurality of protrusions 35 are parts to be fixed to a vehicle body, and they are disposed on the front side of the base plate 30 and protrude forward from the back surface of the base plate 30.

These plurality of protrusions 35 are disposed adjacent to inner sides in the right-left direction of the front load-receiving parts 34, which are provided to both sides in the right-left direction of the base plate 30.

Next, the plurality of hooks 36 are passed through holes 43 (described later), which are formed in an end part 41 of the cover material 40, to hook the end part 41. The plurality of hooks 36 are formed at each of the front part 32*a* and the rear part 32*b* of the flange 32 of the base plate 30.

The structure of the hook 36 of this embodiment is the same as or similar to that of the hook 16 of the third embodiment, and therefore, descriptions thereof are omitted.

Next, the cover material 40 will be described.

The cover material 40 includes a body cover part (not illustrated) for covering the cushion material and the upper surface of the base plate 30 and also includes an end part 41 that is folded under the back surface of the base plate 30.

The cover material 40 at a part 42 that is folded from the upper surface to the back surface of the base plate 30 (hereinafter, a "folded part 42") is along the edge of the base plate 30.

Figure 26:
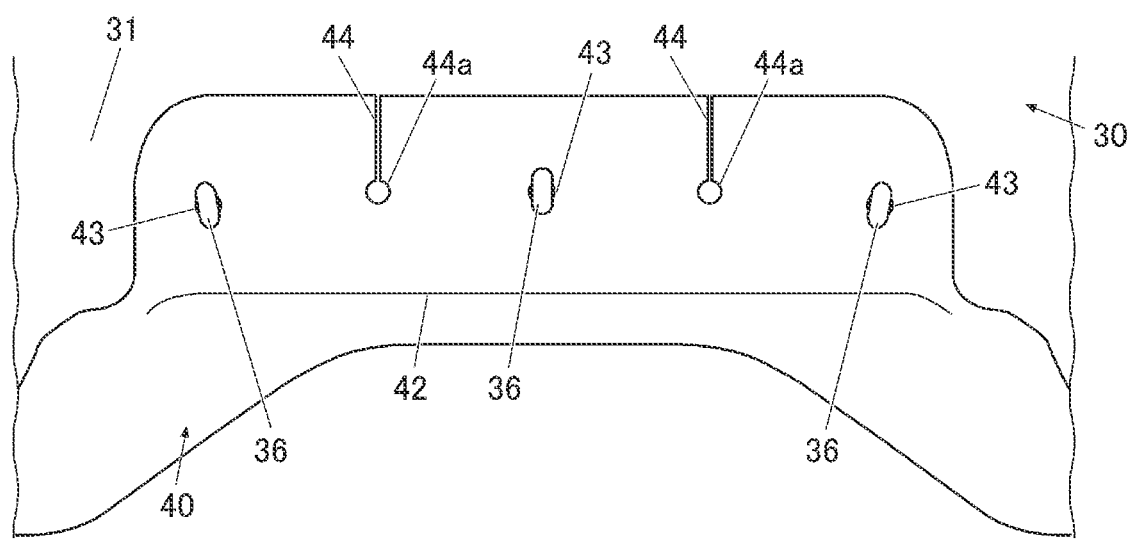
FIG. 26 illustrates a modification example of the end part of the cover material.

The end part 41 is formed with holes 43 for use in fixing to the base plate 30 (refer to FIG. 26). The hook 36, which protrudes from the back surface of the flange 32 of the base plate 30, is passed through the hole 43 to hook at the edge of the hole 43.

In addition, the holes 43 are formed in the end part 41, at parts corresponding to the front part 32*a* and the rear part 32*b* of the flange 32 of the base plate 30.

Such an end part 41 of the cover material 40 is fixed to the base plate 30 in the state in which the end part 41 is hooked by passing the hooks 36 through the holes 43, while fixing materials 45 are driven into the base plate 30 via the end part 41. That is, the end part 41 of the cover material 40 is fixed to the base plate 30 by a first means of passing the hooks 36 through the holes 43 to hook the end part 41 and by a second means using the fixing materials 45.

In order to perform such fixation, the hooks 36 and the fixing materials 45 are disposed so as to not overlap each other in the direction in which the end part 41 of the cover material 40 is pulled.

This embodiment employs a staple that is driven by using a tool such as a tacker, as the fixing material 45.

As described above, the plurality of hooks 36 are formed at each of the front part 32*a* and the rear part 32*b* of the base plate 30. That is, the hooks 36 are not formed at the left and right side parts 32*c* and 32*d* of the base plate 30.

Thus, in this embodiment, the end part 41 of the cover material 40 is fixed to the base plate 30 as follows: The end part 41 is hooked by passing the hooks 36 through the holes 43 at the front part 32*a* and the rear part 32*b* of the flange 32 of the base plate 30, and the fixing materials 45 are driven into the base plate 30 via the end part 41 at the left and right side parts 32*c* and 32*d* of the flange 32 of the base plate 30.

In manufacturing the vehicle seat S2 in this embodiment, the fixing materials 45 are driven into the base plate 30 after the hooks 36 of the flange 32 of the base plate 30 are passed through the holes 43, which are formed at the end part 41 of the cover material 40.

The hooks 36 that are positioned at rightmost and leftmost ends among the plurality of hooks 36 provided at the front part 32*a* of the flange 32, and the hooks 36 that are positioned on outer sides in the right-left direction of the load-receiving parts 34 among the hooks 36 provided at the rear part 32*b* of the flange 32, are disposed close to the side parts 32*c* and 32*d* of the flange 32. With this structure, in manufacturing the vehicle seat S2, hooking the end part 41 of the cover material 40 to each of the hooks 36 on the outer sides in the right-left direction at the front part 32*a* and the rear part 32*b* prevents the end part 41 of the cover material 40 from being dislocated, resulting in easy driving work of the fixing materials 45.

In the embodiment as described above, the end part 41 of the cover material 40 is formed with the holes 43 for use in fixing to the base plate 30, and the base plate 30 has the hooks 36 that are protruded from the back surface of the base plate 30. The hooks 36 are passed through the holes 43 of the cover material 40 to hook the end part 41. The end part 41 of the cover material 40 is fixed to the base plate 30 in the state in which the end part 41 is hooked by passing the hooks 36 through the holes 43 while the fixing materials 45 are driven into the base plate 30 via the end part 41. The hooks 36 and the fixing materials 45 are disposed so as to not overlap each other in the direction in which the end part 41 of the cover material 40 is pulled. Thus, the hooks 36 and the fixing materials 45 are not arranged in line in the direction in which the end part 41 of the cover material 40 can be pulled toward the upper surface. With this structure, it is possible to obtain spaces for mounting both of the hooks 36 and the fixing materials 45 while preventing an increase in size of the structure in the direction in which the cover material 40 can be pulled toward the upper surface.

Fourth Modification Example

Embodiments in which the present invention can be used are not limited to the embodiments described above and can be modified or altered within a range not departing from the gist of the present invention as appropriate. Herein, a modification example will be described. In this modification example, elements that are the same as those of the above-described embodiments are denoted by the same reference signs, and descriptions thereof are omitted or simplified.

Figure 25:
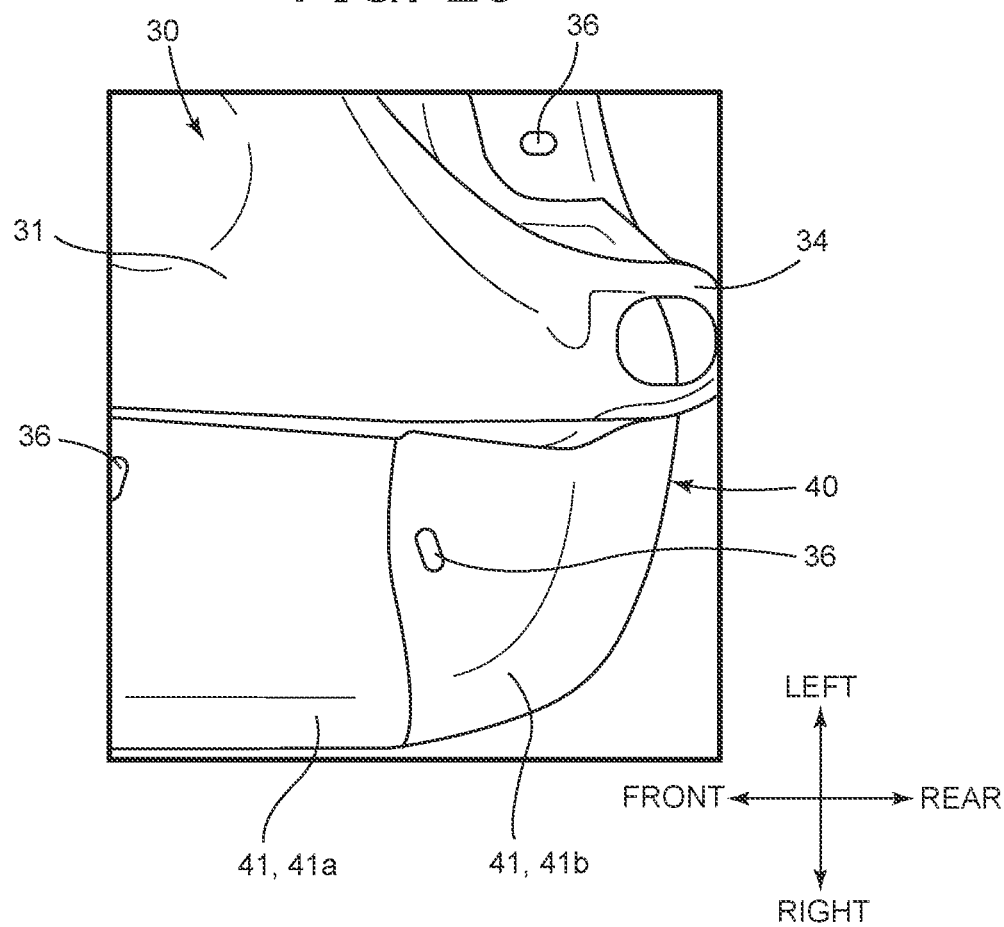
FIG. 25 illustrates a fixed state of overlapped areas of an end part of a cover material.

In this modification example, as illustrated in FIG. 25, a part 41a at which one of adjacent holes 43 is positioned, and a part 41b at which the other one of adjacent holes 43 is positioned, overlap each other in the end part 41 of the cover material 40. In this state, one hook 36 of the base plate 30 is passed through the one hole 43 and the other hole 43 to hook.

In more detail, the base plate 30 basically has a three-dimensional shape and may include rounded corners. For this reason, the cover material 40 is manufactured by sewing a plurality of sheets of materials together so as to correspond to the shape of the base plate 30, in most cases. However, forming the body cover part so as to correspond to the shape of the base plate 30 in this manner causes a surplus of the materials at the end part 41, which may not be appropriately folded under the back surface of the flange 32. In order to prevent such a situation, a material on one side and a material on the other side, which are sewn together in the body cover part, may not be sewn in the end part 41 but may be overlapped and fitted to the back surface of the flange 32.

In this case, a part 41a at which one of adjacent holes 43 is positioned, and a part 41b at which the other one of adjacent holes 43 is positioned, are overlapped each other, and they are fixed by hooking the two holes 43 with the use of one hook 36.

In this modification example, in the end part 41 of the cover material 40, the part 41a at which the one of the adjacent holes 43 is positioned, and the part 41b at which the other one of the adjacent holes 43 is positioned, are fixed by one hook 36, whereby it is possible to contribute to reduction in the number of parts.

In addition, the materials can be adjusted at (can be finally appropriately fitted to) the end part 41 in this manner, and accordingly, the body cover part can be manufactured so as to correspond to the shape of the base plate 30 having a complicated shape.

Fifth Modification Example

The flange 32 of the base plate 30 does not have a straight line shape but has a three-dimensional shape with protrusions and recesses, or round parts. For this reason, if the end part 41 of the cover material 40 has low stretchability, the end part 41 that is hooked by the hook 36 may have an undesirable appearance as follows: For example, sewing lines between the body cover part and the end part 41 rise and can be seen, although they should be folded and hidden under the back surface of the flange 32. In addition, wrinkles, twists, and so on are generated in the body cover part. Moreover, the end part 41 may be forcibly hooked by the hook 36, causing the hole 43 of the end part 41 to be laterally extended or causing dislocation.

In order to avoid such defects, the end part 41 of the cover material 40 of this modification example is formed with a plurality of slits 44, as illustrated in FIG. 26.

The slit 44 is formed so as to extend toward the folded part 42 from the edge (which is an end positioned on a side opposite to the folded part 42) of the end part 41. An end on a folded part 42 side of the slit 44 is a circular hole 44a that is set to have a diameter larger than the slit width.

In addition, the slit 44 is formed at the center between the plurality of holes 43. That is, the plurality of holes 43 and the slits 44 are arranged at equal intervals.

The circular hole 44a prevents twists from occurring when parts that are positioned on one side and the other side across the slit 44 of the end part 41 are brought close to each other.

Forming the slits 44 at the end part 41 in this manner enables easily making the parts that are positioned on one side and the other side across the slit 44 of the end part 41 be apart from or close to each other.

Thus, even if there is a positional error between adjacent hooks 36 in the state in which the end part 41 of the cover material 40 is hooked and fixed by the hooks 36, the positions of the holes 43 can be adjusted by widening or narrowing the slit 44. This eliminates, for example, the need to forcibly hook the end part 41 of the cover material 40 to the hooks 36.

As a result, it is possible to prevent sewing lines from rising and being visible and prevent generation of wrinkles, twists, and so on in the body cover part, whereby design quality is ensured. Moreover, expansion and dislocation of the holes 43 of the end part 41 can be suppressed and be used properly.

Fifth Embodiment

Hereinafter, a vehicle seat S3 of a fifth embodiment will be described in detail with reference to FIGS. 27 and 28. Note that descriptions of elements that are the same as those of the above-described embodiments are omitted or simplified as appropriate.

The vehicle seat S3 in this embodiment includes a base plate 50, a cushion material (not illustrated), and a cover material (not illustrated).

In the base plate 50, almost all parts are integrally formed into one body, and attachments are mounted as necessary. In other words, the base plate 50 is composed mainly of a body plate 51, and parts having respective functions are integrally formed to the body plate 51.

Such a body plate 51 includes a flange 52 that is provided along the periphery of the body plate 51, and rigidity of the periphery of the body plate 51 can be improved by the flange 52.

The flange 52 is a part that is integrally formed with the periphery of the body plate 51 so as to protrude outward in a flange shape.

As in the case of the flange 12 of the third embodiment, such a flange 52 is roughly divided into areas of a front part 52a, a rear part 52b, and left and right side parts 52c and 52d.

The base plate 50 includes a plurality of reinforcements 53, a plurality of load-receiving parts 54, and a plurality of protrusions 55, as parts that are integrally formed to the body plate 51.

The base plate 50 also includes a plurality of hooks 56 that are protruded from the back surface of the flange 52, as parts that are integrally formed with the flange 52.

The plurality of reinforcements 53 each are ridge-like parts extending in the front-rear direction and are disposed at the center of the body plate 51, as a pair.

The parts that are positioned on both right and left sides of these paired reinforcements 53 are formed into recessed shapes. That is, the pair of the reinforcements 53 and the recesses on both sides thereof form recessed and protruded shapes on the body plate 51 and improve the whole rigidity. Additionally, a plurality of ribs 53a are formed at side walls constituting the pair of the reinforcements 53, at intervals in the front-rear direction.

The plurality of load-receiving parts 54 are disposed on both outer sides in the right-left direction of the body plate 51. In addition, the plurality of load-receiving parts 54 include load-receiving parts 54a positioned on the front side and load-receiving parts 54b positioned on the rear side.

Next, the plurality of protrusions 55 are parts to be fixed to a vehicle body, and they are disposed on the front side of the base plate 50 and protrude forward from the back surface of the base plate 50.

Next, the plurality of hooks 56 are passed through holes, which are formed in an end part of the cover material, to hook the end part. The plurality of hooks 56 are formed at each of the front part 52a and the rear part 52b of the flange 52 of the base plate 50.

The structure of the hook 56 of this embodiment is the same as or similar to that of the hook 16 of the third embodiment, and therefore, descriptions thereof are omitted.

Such a base plate 50 is formed with a plurality of through holes 50a that penetrate through the base plate 50 in the thickness direction. These plurality of through holes 50a are formed mainly in the body plate 51 but are also partially formed in the flange 52.

Forming the plurality of through holes 50a in the base plate 50 in this manner can contribute to reduction in weight of the whole vehicle seat S3 and can also improve drain property and ventilation; in particular, it is possible to discharge heat by releasing air in the cushion material.

Figure 27:
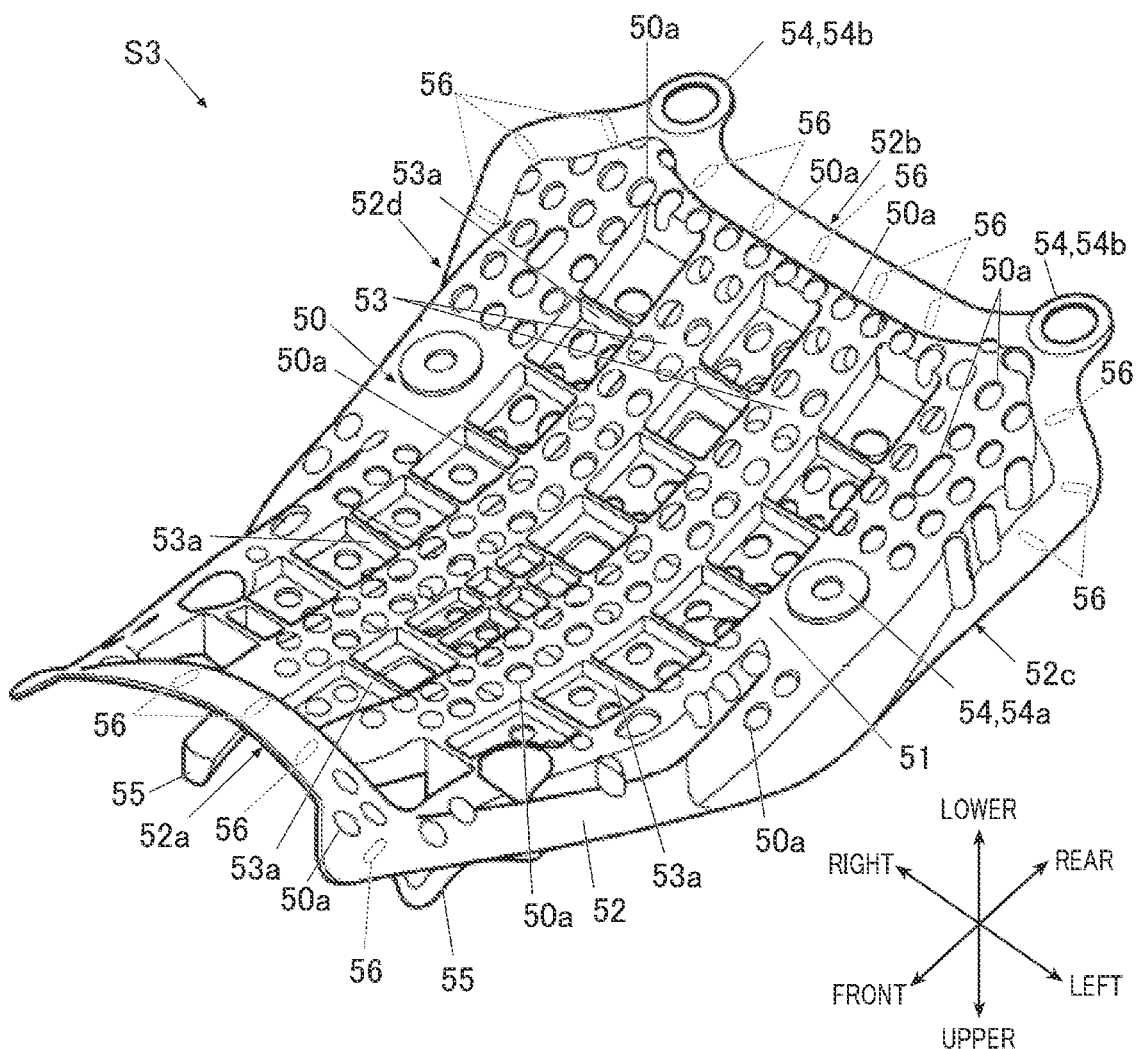
FIG. 27 is a perspective view illustrating an upper surface of the vehicle seat of a fifth embodiment.

In this embodiment, as illustrated in FIG. 27, the hooks 56 and the plurality of through holes 50a are disposed so as to not overlap each other in the front-rear direction of the base plate 50.

A plurality of hooks 56 are provided, and a lot of through holes 50a are formed, in this embodiment. For this reason, not all of the hooks 16 and the through holes 50a are necessarily disposed in such a positional relationship, and some of them may have this positional relationship.

The structure of the cover material, which is not illustrated, is the same as or similar to that of the cover material 20 of the third embodiment, and therefore, descriptions thereof are omitted.

An end part of such a cover material is fixed to the base plate 50 in the state in which the end part is hooked by passing the hooks 56 through the holes, while fixing materials (not illustrated) are driven into the base plate 50 via the end part. That is, the end part of the cover material is fixed to the base plate 50 by a first means of passing the hooks 56 through the holes to hook the end part and by a second means using the fixing materials.

In order to perform such fixation, the hooks 56 and the fixing materials are disposed so as to not overlap each other in the direction in which the end part of the cover material is pulled.

In the embodiment as described above, the end part of the cover material is formed with the holes for use in fixing to the base plate 50, and the base plate 50 has the hooks 56 that are protruded from the back surface of the base plate 50. The hooks 56 are passed through the holes of the cover material to hook the end part. The end part of the cover material is fixed to the base plate 50 in the state in which the end part is hooked by passing the hooks 56 through the holes while the fixing materials are driven into the base plate 50 via the end part. The hooks 56 and the fixing materials are disposed so as to not overlap each other in the direction in which the end part of the cover material is pulled. Thus, the hooks 56 and the fixing materials are not arranged in line in the direction in which the end part of the cover material can be pulled toward the upper surface. With this structure, it is possible to obtain spaces for mounting both of the hooks 56 and the fixing materials while preventing an increase in size of the structure in the direction in which the cover material can be pulled toward the upper surface.

In addition, the plurality of through holes 50a, which penetrate through the base plate 50 in the thickness direction, are formed in the base plate 50. Forming the plurality of through holes in the base plate can contribute to reduction in weight of the whole vehicle seat S3 and can also improve drain property and ventilation. In particular, it is possible to discharge heat by releasing air in the cushion material, whereby an uncomfortable feeling during seating can be reduced.

The hooks 56 and the plurality of through holes 50a are disposed so as to not overlap each other in the front-rear direction of the base plate 50, and thus, the hooks 56 can be disposed at positions having a relatively high strength. This enables maintaining the fixed state of the cover material in a good condition, compared with, for example, a case of fixing the cover material by hooking it to the hooks 56 that are disposed so as to overlap the through holes 50a in the front-rear direction.

Sixth Embodiment

Hereinafter, a vehicle seat S4 of a sixth embodiment will be described in detail with reference to FIG. 29. Note that descriptions of elements that are the same as those of the above-described embodiments are omitted or simplified as appropriate.

The vehicle seat S4 in this embodiment includes a base plate 60, a cushion material (not illustrated), and a cover material 70.

In the base plate 60, almost all parts are integrally formed into one body, and attachments are mounted as necessary. In other words, the base plate 60 is composed mainly of a body plate 61, and parts having respective functions are integrally formed to the body plate 61.

Such a body plate 61 includes a flange 62 that is provided along the periphery of the body plate 61, and rigidity of the periphery of the body plate 61 can be improved by the flange 62.

The flange 62 is a part that is integrally formed with the periphery of the body plate 51 so as to protrude outward in a flange shape.

As in the case of the flange 12 of the third embodiment, such a flange 62 is roughly divided into areas of a front part (not illustrated), a rear part 62b, and left and right side parts 62c and 62d.

The base plate 60 includes a plurality of reinforcements 63, a plurality of load-receiving parts 64, and a plurality of protrusions 65, as parts that are integrally formed to the body plate 61.

The base plate 60 also includes a plurality of hooks 66 that are protruded from the back surface of the flange 62, as parts that are integrally formed with the flange 62.

The plurality of reinforcements 63 each are ridge-like parts extending in the front-rear direction and include a reinforcement 63, which is disposed at the center of the body plate 61, and right and left reinforcements 63, which are disposed so as to be laterally separated from the center reinforcement 63.

In addition, grid-shaped ribs 63a for reinforcement are integrally formed between the plurality of reinforcements 63 and on outer sides in the right-left direction of the right and left reinforcements 63.

The plurality of load-receiving parts 64 are disposed on both outer sides in the right-left direction of the body plate 61.

The plurality of protrusions 65 are parts to be fixed to a vehicle body, and they are disposed on the rear side of the base plate 60 and protrude rearward from the back surface of the base plate 60.

The plurality of hooks 66 are passed through holes (not illustrated), which are formed in an end part 71 of the cover material 70, to hook the end part 71. The plurality of hooks 66 are formed at each of the front part and the rear part 62b of the flange 62 of the base plate 60.

The structure of the hook 66 of this embodiment is the same as or similar to that of the hook 16 of the third embodiment, and therefore, descriptions thereof are omitted.

Next, the cover material 70 will be described.

The cover material 70 includes a body cover part (not illustrated) for covering the cushion material and the upper surface of the base plate 60 and also includes an end part 71 that is folded under the back surface of the base plate 60.

The cover material 70 at a part 72 that is folded from the upper surface to the back surface of the base plate 60 (hereinafter, a "folded part 72") is along the edge of the base plate 60.

The end part 71 is formed with holes (not illustrated) for use in fixing to the base plate 60. The hook 66, which protrudes from the back surface of the flange 62 of the base plate 60, is passed through the hole to hook at the edge of the hole.

In addition, the holes are formed in the end part 71, at parts corresponding to the front part and the rear part 62b of the flange 62 of the base plate 60.

The end part 71 of the cover material 70 includes a stretchable part 71a that expands and contracts at least in the direction in which the end part 71 can be pulled (refer to the arrow "A" in FIG. 21) and in a direction opposite to this direction.

The stretchable part 71a is made of a flat sheet material being stretchable, such as mesh rubber, plain woven elastic, or stretchable material.

The stretchable part 71a is provided to the end part 71 of the cover material 70 at a part to be fixed by fixing materials 75 but not at a part to be hooked to the hooks 66. That is, in the end part 71 of the cover material 70, the part having the holes to be hooked to the hooks 66 is made of a material that is the same as or similar to that of the body cover part, whereas the part to be fixed by the fixing materials 75 is made of a flat sheet material being stretchable as described above.

Such an end part 71 of the cover material 70 is fixed to the base plate 60 in the state in which the end part 71 is hooked by passing the hooks 66 through the holes while the fixing materials 75 are driven into the base plate 60 via the stretchable parts 71a of the end part 71. That is, the end part 71 of the cover material 70 is fixed to the base plate 60 by a first means of passing the hooks 66 through the holes to hook the end part 71 and by a second means using the fixing materials 75.

In order to perform such fixation, the hooks 66 and the fixing materials 75 are disposed so as to not overlap each other in the direction in which the end part 71 of the cover material 70 is pulled.

This embodiment employs a staple that is driven by using a tool such as a tacker, as the fixing material 75.

As described above, the plurality of hooks 66 are formed at each of the front part and the rear part 62b of the base plate 60. That is, the hooks 66 are not formed at the left and right side parts 62c and 62d of the base plate 60.

Thus, in this embodiment, the end part 71 of the cover material 70 is fixed to the base plate 60 as follows: The end part 71 is hooked by passing the hooks 66 through the holes at the front part and the rear part 62b of the flange 62 of the base plate 60, and the fixing materials 75 are driven into the base plate 60 via the stretchable parts 71a of the end part 71 at the left and right side parts 62c and 62d of the flange 62 of the base plate 60.

In the embodiment as described above, the end part 71 of the cover material 70 is formed with the holes for use in fixing to the base plate 60, and the base plate 60 has the hooks 66 that are protruded from the back surface of the base plate 60. The hooks 66 are passed through the holes of the cover material 70 to hook the end part 71. The end part 71 of the cover material 70 is fixed to the base plate 60 in the state in which the end part 71 is hooked by passing the hooks 66 through the holes while the fixing materials 75 are driven into the base plate 60 via the end part 71. The hooks 66 and the fixing materials 75 are disposed so as to not overlap each other in the direction in which the end part 71 of the cover material 70 is pulled. Thus, the hooks 66 and the fixing materials 75 are not arranged in line in the direction in which the end part 71 of the cover material 70 can be pulled toward the upper surface. With this structure, it is possible to obtain spaces for mounting both of the hooks 66 and the fixing materials 75 while preventing an increase in size of the structure in the direction in which the cover material 70 can be pulled toward the upper surface.

The end part 71 of the cover material 70 includes the stretchable part 71a that expands and contracts at least in the direction in which the end part 71 can be pulled and in a direction opposite to this direction. The stretchable part 71a is provided to the part to be fixed by the fixing materials 75, of the end part 71 of the cover material 70. Thus, fixing using the fixing materials 75 are easily performed.

The stretchable part 71a is not provided to the part that is hooked to the hooks 66, and therefore, the hooks 66 hook the parts without the stretchable part 71a, in the end part 71 of the cover material 70. This makes it easy to prevent the cover material 70 from coming off, compared with, for example, a case in which the part having the stretchable part 71a is hooked. Moreover, not providing the stretchable part 71a can reduce cost.

Seventh Embodiment

Figure 30:
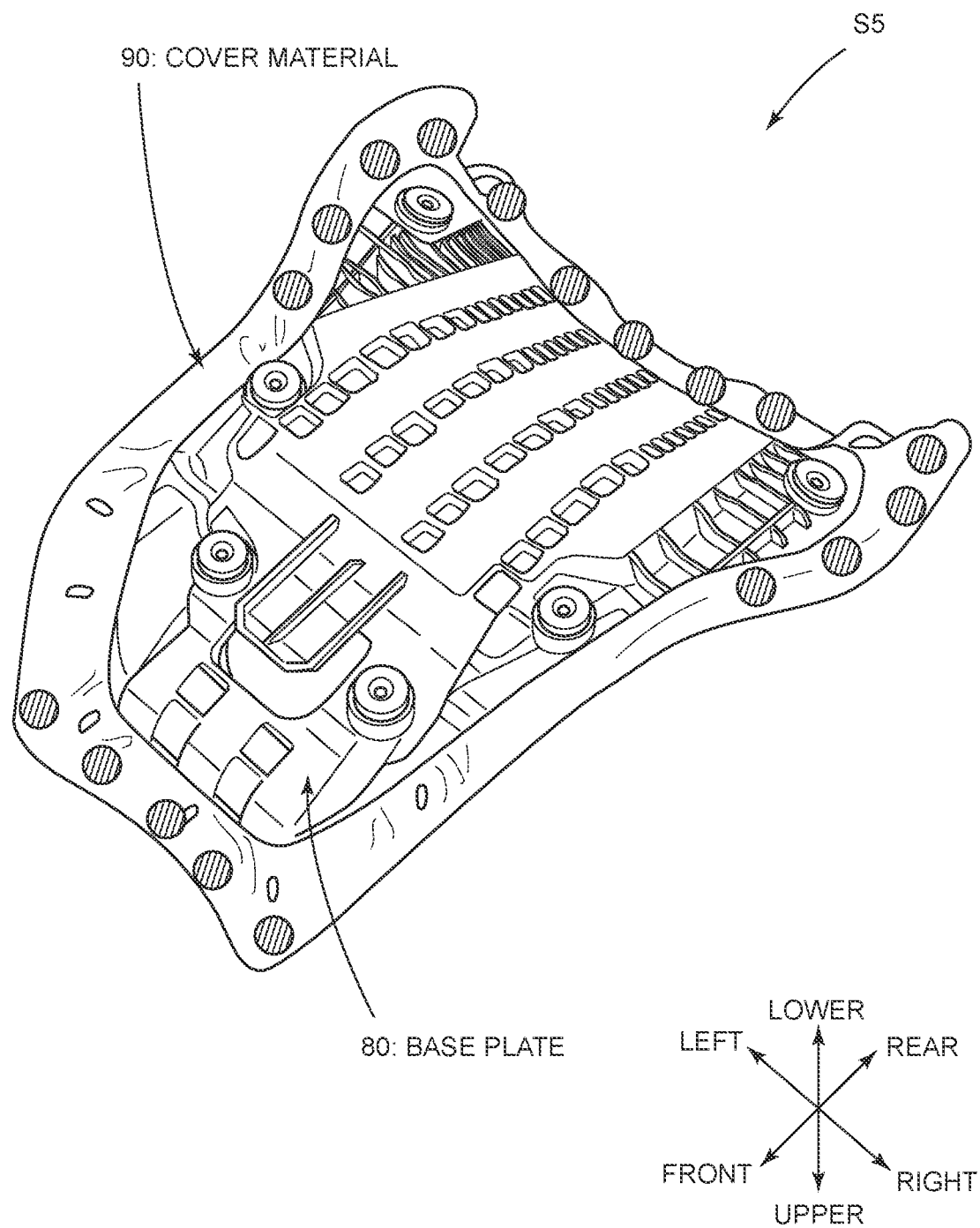
FIG. 30 is a perspective view illustrating a back surface of the vehicle seat of a seventh embodiment.
Figure 31:
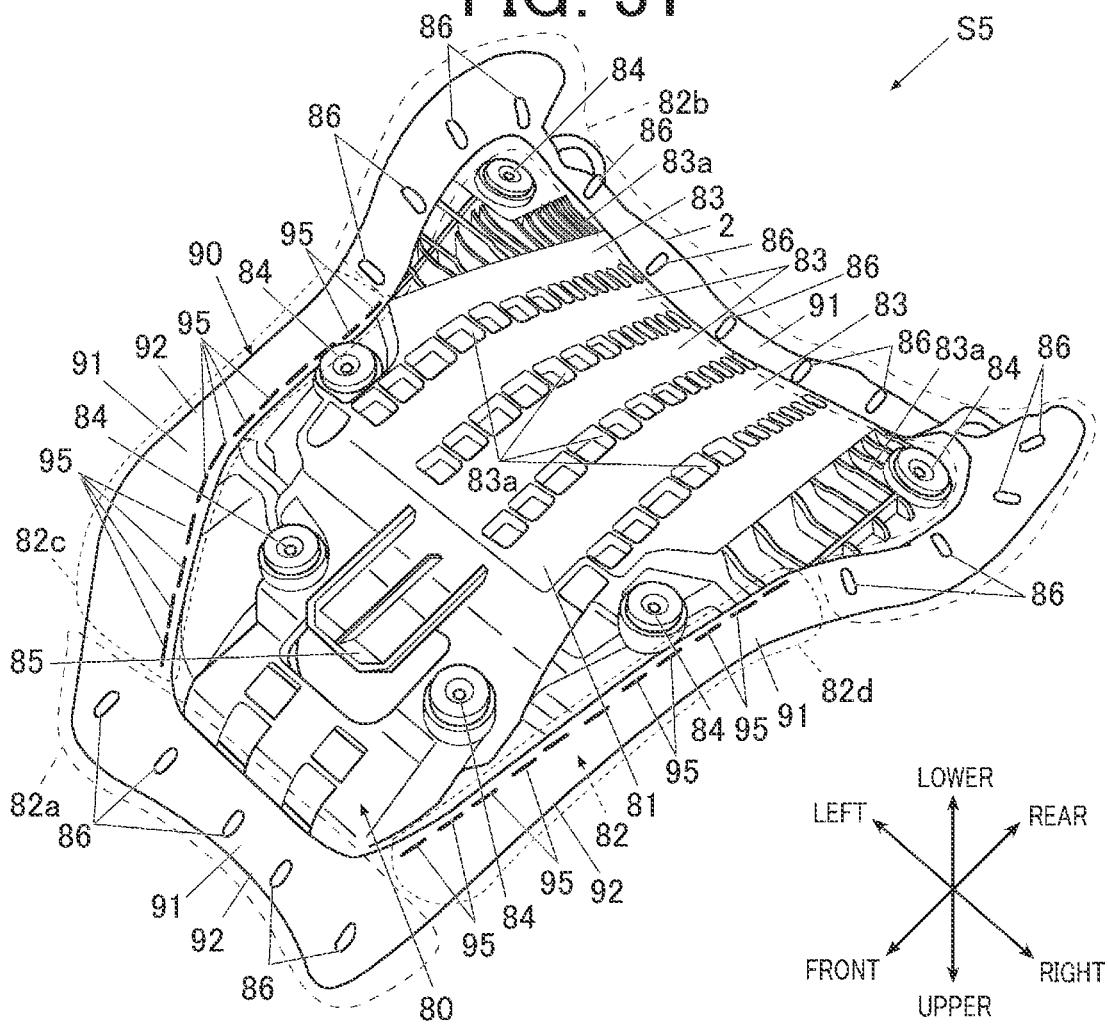
FIG. 31 is a perspective view for explaining more details of the vehicle seat in FIG. 30.

Hereinafter, a vehicle seat S5 of a seventh embodiment will be described in detail with reference to FIGS. 30 and 31.

Note that descriptions of elements that are the same as those of the above-described embodiments are omitted or simplified as appropriate.

The vehicle seat S5 in this embodiment includes a base plate 80, a cushion material (not illustrated), and a cover material 90.

The base plate 80 can also be called a "bottom plate" or a "cushion support member" and is a resin molded article, as described above. Thus, almost all parts are integrally formed into one body, and attachments are mounted as necessary. In other words, the base plate 80 is composed mainly of a body plate 81, and parts having respective functions are integrally formed to the body plate 81.

Such a body plate 81 includes a flange 82 that is provided along the periphery of the body plate 81, and rigidity of the periphery of the body plate 81 can be improved by the flange 82.

As in the case of the flange 12 of the third embodiment, such a flange 82 is roughly divided into areas of a front part 82a, a rear part 82b, and left and right side parts 82c and 82d.

The base plate 80 includes a plurality of reinforcements 83, a plurality of load-receiving parts 84, and protrusions 85, as parts that are integrally formed to the body plate 81.

The base plate 80 also includes a plurality of hooks 86 that are protruded from the back surface of the flange 82, as parts that are integrally formed with the flange 82.

The plurality of reinforcements 83 each are ridge-like parts extending in the front-rear direction and include three reinforcements 83, which are disposed separately from each other at the center of the body plate 81, and right and left reinforcements 83, which are disposed so as to be laterally separated from the three center reinforcements 83.

In addition, ribs 83a for reinforcement are integrally formed between the three center reinforcements 83 and are also integrally formed on outer sides in the right-left direction of the right and left reinforcements 83.

The plurality of load-receiving parts 84 are disposed on both outer sides in the right-left direction of the body plate 81. The plurality of load-receiving parts 84, which are respectively disposed on the outer sides in the right-left direction, include load-receiving parts 84 positioned on the front side, load-receiving parts 84 positioned on the center side, and load-receiving parts 84 positioned on the rear side.

The plurality of protrusions 85 are parts to be fixed to a vehicle body, and they are disposed on the front side of the base plate 80 and protrude forward from the back surface of the base plate 80.

The plurality of hooks 86 are passed through holes (not illustrated), which are formed in an end part 91 of the cover material 90, to hook the end part 91. The plurality of hooks 86 are formed at each of the front part 82a and the rear part 82b of the flange 82 of the base plate 80.

The structure of the hook 86 of this embodiment is the same as or similar to that of the hook 16 of the third embodiment, and therefore, descriptions thereof are omitted.

Next, the cover material 90 will be described.

The cover material 90 includes a body cover part (not illustrated) for covering the cushion material and the upper surface of the base plate 80 and also includes an end part 91 that is folded under the back surface of the base plate 80.

The cover material 90 at a part 92 that is folded from the upper surface to the back surface of the base plate 80 (hereinafter, a "folded part 92") is along the edge of the base plate 80.

The end part 91 is formed with holes (not illustrated) for use in fixing to the base plate 80. The hook 86, which protrudes from the back surface of the flange 82 of the base plate 80, is passed through the hole to hook at the edge of the hole.

In addition, the holes are formed in the end part 91, at parts corresponding to the front part 82a and the rear part 82b of the flange 82 of the base plate 80.

Such an end part 91 of the cover material 90 is fixed to the base plate 80 in the state in which the end part 91 is hooked by passing the hooks 86 through the holes, while fixing materials 95 are driven into the base plate 80 via the end part 91. That is, the end part 91 of the cover material 90 is fixed to the base plate 80 by a first means of passing the hooks 86 through the holes to hook the end part 91 and by a second means using the fixing materials 95.

In order to perform such fixation, the hooks 86 and the fixing materials 95 are disposed so as to not overlap each other in the direction in which the end part 91 of the cover material 90 is pulled.

This embodiment employs a staple that is driven by using a tool such as a tacker, as the fixing material 95.

As described above, the plurality of hooks 86 are formed at each of the front part 82a and the rear part 82b of the base plate 80. That is, the hooks 86 are not formed at the left and right side parts 82c and 82d of the base plate 80.

Thus, in this embodiment, the end part 91 of the cover material 90 is fixed to the base plate 80 as follows: The end part 91 is hooked by passing the hooks 86 through the holes at the front part 82a and the rear part 82b of the flange 82 of the base plate 80, and the fixing materials 95 are driven into the base plate 80 via the end part 91 at the left and right side parts 82c and 82d of the flange 82 of the base plate 80.

In the embodiment as described above, the end part 91 of the cover material 90 is formed with the holes for use in fixing to the base plate 80, and the base plate 80 has the hooks 86 that are protruded from the back surface of the base plate 80. The hooks 86 are passed through the holes of the cover material 90 to hook the end part 91. The end part 91 of the cover material 90 is fixed to the base plate 80 in the state in which the end part 91 is hooked by passing the hooks 86 through the holes while the fixing materials 95 are driven into the base plate 80 via the end part 91. The hooks 86 and the fixing materials 95 are disposed so as to not overlap each other in the direction in which the end part 91 of the cover material 90 is pulled. Thus, the hooks 86 and the fixing materials 95 are not arranged in line in the direction in which the end part 91 of the cover material 90 can be pulled toward the upper surface. With this structure, it is possible to obtain spaces for mounting both of the hooks 86 and the fixing materials 95 while preventing an increase in size of the structure in the direction in which the cover material 90 can be pulled toward the upper surface.

Sixth Modification Example

Embodiments in which the present invention can be used are not limited to the embodiments described above and can be modified or altered within a range not departing from the gist of the present invention as appropriate. Herein, a modification example will be described. In this modification example, elements that are the same as those of the above-described embodiments are denoted by the same reference signs, and descriptions thereof are omitted or simplified.

As described above, the hooks 86 in the above-described embodiment are not formed at the left and right side parts 82c and 82d of the base plate 80, into which the fixing materials 95 are driven.

Figure 32:
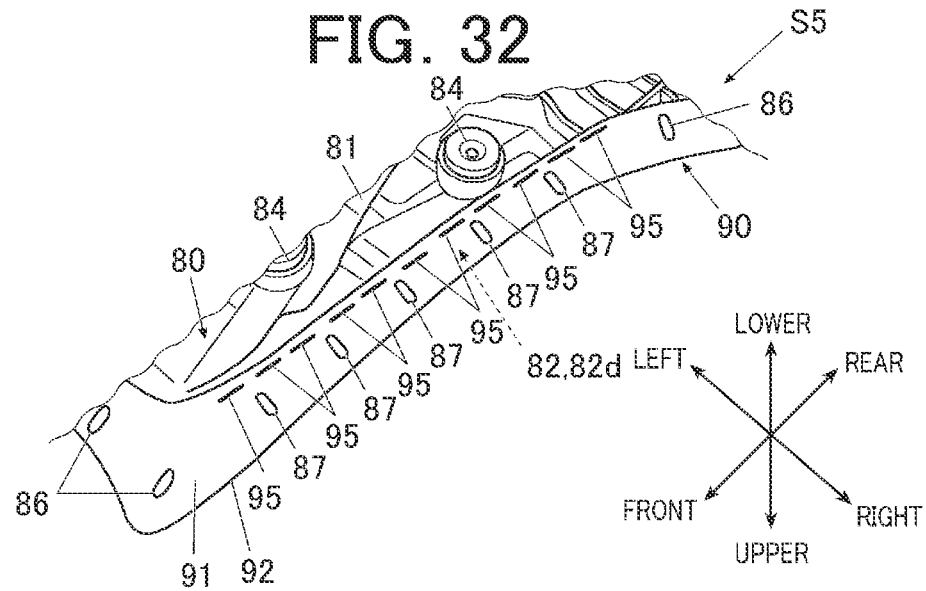
FIG. 32 illustrates a state in which a part of the end part of the cover material, which is to be fixed by fixing materials, is temporarily fixed to a base plate.

On the other hand, in this modification example, a plurality of temporary fixing hooks 87 are formed at the left and right side parts 82c and 82d of the base plate 80, into which the fixing materials 95 are driven, as illustrated in FIG. 32.

The structures of these plurality of temporary fixing hooks 87 are the same as or similar to those of the plurality of hooks 86 that are formed at the front part 82a and the rear part 82b of the base plate 80, and therefore, descriptions thereof are omitted.

In addition, the end part 91 of the cover material 90 at the part to be fixed by the fixing materials 95, is formed with a plurality of temporary fixing holes (not illustrated) for use in temporary fixing to the base plate 80. The temporary fixing hooks 87 are passed through these plurality of temporary fixing holes to hook at the edges of the temporary fixing holes. Thus, the number of the temporary fixing holes is set to be the same as the number of the temporary fixing hooks 87. In other words, the temporary fixing hooks 87 are formed at the left and right side parts 82c and 82d of the base plate 80 so that the number of the temporary fixing hooks 87 will correspond to the number of the temporary fixing holes of the cover material 90.

The end part 91 of the cover material 90 at the parts corresponding to the left and right side parts 82c and 82d of the flange 82 of the base plate 80 are fixed by the fixing materials 95 as follows: First, the temporary fixing hooks 87 of the flange 12 of the base plate 10 are passed through the temporary fixing holes, which are formed in the end part 91 of the cover material 90. The fixing materials 95 are then driven into the base plate 80.

In passing the temporary fixing hooks 87 through the temporary fixing holes formed in the end part 91 of the cover material 90, the hooks 86 at the front part 12a and the rear part 12b of the flange 82 of the base plate 80 are also passed through the holes that are formed in the end part 91 on the front side and the rear side of the cover material 90, at the same time. Thus, the entire periphery of the cover material 90 is fixed to the entire periphery of the base plate 80. Under these conditions, driving work of the fixing materials 95 is more easily performed.

The temporary fixing hooks 87 and the fixing materials 95 are disposed so as to not overlap each other in the direction in which the end part 91 of the cover material 90 is pulled. Specifically, in this modification example, the temporary fixing hooks 87 and the plurality of fixing materials 95 are disposed so as to not overlap each other in the right-left direction of the base plate 80.

In this modification example having such a structure, the part to be fixed by the fixing materials 95, of the end part 91 of the cover material 90, is formed with the temporary fixing holes (not illustrated) for use in temporary fixing to the base plate 80, and the base plate 80 includes the temporary fixing hooks 87 that protrude from the back surface of the base plate 80. The temporary fixing hooks 87 are passed through the temporary fixing holes of the cover material 90, and the number of the formed temporary fixing hooks 87 corresponds to the number of the temporary fixing holes. The temporary fixing hooks 87 of the base plate 80 are passed through the temporary fixing holes of the end part 91 of the cover material 90 in order to temporary fixing the end part 91. Thus, the part to be fixed by the fixing materials 95, of the end part 91 of the cover material 90, is easily fixed by the fixing materials 95.

[Supplementary Notes of Third to Seventh Embodiments]

It can be understood from the above-described contents about the third to the seventh embodiments that they include indications of various technical ideas in addition to the inventions described in the following supplementary notes.

[Supplementary Note 1]

A vehicle seat comprising:
- a base plate that supports a cushion material provided on an upper surface of the base plate; and
- a cover material that covers the cushion material and is fixed to the base plate at an end part,
- the end part of the cover material being formed with holes for use in fixing to the base plate,
- the base plate having hooks that are protruded from a back surface of the base plate, the hooks being passed through the holes of the cover material to hook the cover material,
- the end part of the cover material being fixed to the base plate in the state in which the end part is hooked by passing the hooks through the holes, while fixing materials are driven into the base plate via the end part,
- the hooks and the fixing materials being disposed so as to not overlap each other in a direction in which the end part of the cover material is pulled.

[Supplementary Note 2]

The vehicle seat according to Supplementary Note 1,
- wherein a plurality of the hooks are formed at each of a front part and a rear part of the base plate, and
- the end part of the cover material is fixed to the base plate in the state in which the end part is hooked by passing the hooks through the holes at the front part and the rear part of the base plate, while the fixing materials are driven into the base plate at right and left side parts of the base plate via the end part.

[Supplementary Note 3]

The vehicle seat according to Supplementary Note 1 or 2,
- wherein the hook has a head that is positioned at an end in a direction protruding from the back surface of the base plate, and the head has a curved shape.

[Supplementary Note 4]

The vehicle seat according to any one of Supplementary Notes 1 to 3,
- wherein the end part of the cover material is folded from the upper surface to the back surface of the base plate and is fixed, the cover material at the folded part that is folded from the upper surface to the back surface of the base plate is along an edge of the base plate,
- the head of the hook, which is positioned at the end in the direction protruding from the back surface of the base plate, has a shape with a short side and a long side in a back view of the base plate, and
- the head is disposed so that the direction of the long side will be perpendicular to the folded part of the cover material in a back view of the base plate.

[Supplementary Note 5]

The vehicle seat according to any one of Supplementary Notes 1 to 4,
- wherein a part at which one of the holes adjacent to each other is positioned, and a part at which the other one of the holes adjacent to each other is positioned, overlap each other in the end part of the cover material, and
- the one hole and the other hole are hooked by passing one of the hooks of the base plate through the one hole and the other hole.

[Supplementary Note 6]

The vehicle seat according to any one of Supplementary Notes 1 to 5, wherein the end part of the cover material at a part to be fixed by the fixing materials is formed with temporary fixing holes for use in temporary fixing to the base plate, the base plate includes temporary fixing hooks that protrude from the back surface of the base plate, the temporary fixing hooks are configured to be passed through the temporary fixing holes of the cover material, and the number of the formed temporary fixing hooks corresponds to the number of the temporary fixing holes.

[Supplementary Note 7]

The vehicle seat according to any one of Supplementary Notes 1 to 6, wherein the base plate is formed with a plurality of through holes that penetrate through the base plate in the thickness direction, and the hooks and the plurality of through holes are disposed so as to not overlap each other in a front-rear direction of the base plate.

[Supplementary Note 8]

The vehicle seat according to any one of Supplementary Notes 1 to 7, wherein the end part of the cover material includes a stretchable part that expands and contracts at least in a direction in which the end part can be pulled and in a direction opposite to this direction, the stretchable part is provided to the end part of the cover material at a part to be fixed by the fixing materials but not at a part to be hooked to the hooks.

INDUSTRIAL APPLICABILITY

The cushion support member of the present invention can reduce concentration of load and can be easily reinforced by the plurality of reinforcements, and therefore, it is highly applicable to industrial practice.

In the vehicle seat of the present invention, it is possible to obtain spaces for mounting both the hooks and the fixing materials while preventing an increase in size of the structure in the direction in which the cover material can be pulled toward the upper surface. Thus, the vehicle seat of the present invention is highly applicable to industrial practice.

REFERENCE SIGNS LIST 110 cushion support member
111 body plate
11a maximum load-receiving part
111b recess
120 joint
120a hole
200 top
201 first join line
202 second join line
203 third join line
204 fourth join line
121 first reinforcement
121a hollow
122 second reinforcement
122a hollow
123 third reinforcement
123a hollow
124 fourth reinforcement
124a hollow
Rt root part
125 first load-receiving part
126 second load-receiving part
127 third load-receiving part
128 first bead
129 second bead
130 third bead
131 fourth bead
132 protrusion
132a through hole
140 cushion support member
141 first reinforcement
141a hollow
142 second reinforcement
142a hollow
143 protrusion
S1 vehicle seat
S2 vehicle seat
S3 vehicle seat
S4 vehicle seat
S5 vehicle seat
10 base plate
12 flange
12a front part
12b rear part
12c side part
12d side part
16 hook
16a stem
16b head
16c tip end
20 cover material
21 end part
22 folded part
23 hole
25 fixing material

The invention claimed is:

1. A structure of a cushion support member that constitutes a seat on which an occupant is to sit, and supports a cushion material which is provided on an upper surface of the cushion support member, wherein the cushion support member comprises:

a plurality of reinforcements for reinforcing the cushion support member; and a joint at which the plurality of reinforcements intersect with each other and are joined together, the plurality of reinforcements include a first reinforcement that extends in a first direction, a second reinforcement that extends in a second direction adjacent to the first direction, and a third reinforcement that extends in a third direction adjacent to the second direction, the joint has a surface showing a first join line and a second join line, the first join line indicating a joined part of the first reinforcement and the second reinforcement, the second join line indicating a joined part of the second reinforcement and the third reinforcement, the first join line and the second join line are formed of curved lines, each curved line of the curved lines curving from one end of the curved line to another end of the curved line in a thickness direction of the cushion support member, and an end of the first join line and an end of the second join line meet at a same position on the one side in the thickness direction, wherein the joint has a back surface formed with a hole, the hole being formed into a perfect circle shape as well as a dome-like shape so as to not penetrate the joint.

2. The structure of the cushion support member according to claim 1,
wherein the cushion support member further comprises a load-receiving part for receiving an occupant load,
a plurality of joints are provided in a front-rear direction of the seat, each of the joints being the joint, and
the load-receiving part is disposed on an outer side in a right-left direction of the seat, from the plurality of joints, while being disposed in a middle in the front-rear direction of the plurality of joints, in a projection view from a side surface of the cushion support member.

3. The structure of the cushion support member according to claim 2,
wherein the cushion support member further comprises a bead for reinforcing the cushion support member, and
the bead is disposed on an outer side in the right-left direction of the seat, from the plurality of joints, while being disposed at an interval from the load-receiving part in the front-rear direction, in a projection view from the side surface of the cushion support member.

4. The structure of the cushion support member according to claim 3,
wherein the cushion support member further comprises the plurality of reinforcements that extend in the right-left direction of the seat from each of the plurality of joints,
a plurality of beads are provided, each of the beads being the bead,
one bead that is one of the plurality of beads is disposed forward of and closest to the load-receiving part, the one bead is formed longer than the other beads, and
the one bead that is closest to the load-receiving part is disposed in a middle in the front-rear direction of the plurality of reinforcements that extend in the right-left direction of the seat from each of the plurality of joints, in a projection view from the side surface of the cushion support member.

5. A structure of a cushion support member that constitutes a seat on which an occupant is to sit, and supports a cushion material which is provided on an upper surface of the cushion support member, wherein
the cushion support member comprises:
a plurality of reinforcements for reinforcing the cushion support member, the plurality of reinforcements including a first reinforcement that extends in a first direction, a second reinforcement that extends in a second direction adjacent to the first direction, and a third reinforcement that extends in a third direction adjacent to the second direction;
a plurality of joints provided in a front-rear direction of the seat at which the plurality of reinforcements intersect with each other and are joined together, each of the plurality of joints has a surface showing a first join line and a second join line, the first join line indicating a joined part of the first reinforcement and the second reinforcement, the second join line indicating a joined part of the second reinforcement and the third reinforcement, the first join line and the second join line are formed of curved lines, each curved line of the curved lines curving from one end of the curved line to another end of the curved line in a thickness direction of the cushion support member, an end of the first join line and an end of the second join line meeting at a same position on the one side in the thickness direction;
a load-receiving part for receiving an occupant load, the load-receiving part being disposed on an outer side in a right-left direction of the seat, from the plurality of joints, while being disposed in a middle in the front-rear direction of the plurality of joints, in a projection view from a side surface of the cushion support member; and
a bead for reinforcing the cushion support member, the bead being disposed on an outer side in the right-left direction of the seat, from the plurality of joints, while being disposed at an interval from the load-receiving part in the front-rear direction, in a projection view from the side surface of the cushion support member.

* * * * *